(12) United States Patent
Oyama et al.

(10) Patent No.: US 6,936,990 B2
(45) Date of Patent: Aug. 30, 2005

(54) METHOD FOR CONTROLLING ELECTRIC MOTOR AND APPARATUS FOR CONTROLLING THE SAME

(75) Inventors: Ichiro Oyama, Osaka (JP); Tomokuni Iijima, Osaka (JP); Toru Tazawa, Ibaraki (JP); Kazushige Narazaki, Katano (JP); Kenichi Suzuki, Daito (JP); Masaru Nishizono, Kadoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 213 days.

(21) Appl. No.: 10/401,318

(22) Filed: Mar. 27, 2003

(65) Prior Publication Data

US 2003/0184251 A1 Oct. 2, 2003

(30) Foreign Application Priority Data

Mar. 29, 2002 (JP) ........................... 2002-096445

(51) Int. Cl.[7] ........................................... G05D 23/275
(52) U.S. Cl. ................... 318/632; 318/432; 318/629; 318/638; 318/615
(58) Field of Search ............................... 318/623, 632, 318/432, 629, 638, 615

(56) References Cited

U.S. PATENT DOCUMENTS

| 4,419,897 A | * | 12/1983 | Matsuoka | ..................... | 73/660 |
| 4,986,150 A | * | 1/1991 | Okazaki | ....................... | 82/137 |
| 5,990,645 A | * | 11/1999 | Nakamura et al. | .......... | 318/432 |
| 6,144,181 A | * | 11/2000 | Rehm et al. | ................. | 318/629 |
| 6,240,246 B1 | * | 5/2001 | Evans | .......................... | 388/814 |
| 6,469,467 B1 | * | 10/2002 | Fujita | .......................... | 62/228.4 |
| 6,789,641 B2 | * | 9/2004 | McLaughlin | ................ | 180/446 |
| 6,828,749 B2 | * | 12/2004 | Zhang et al. | ................ | 318/611 |

FOREIGN PATENT DOCUMENTS

| JP | 6-28006 A | 2/1994 |
| JP | 10-149210 A | 6/1998 |

OTHER PUBLICATIONS

Makoto Iwasaki et al., "Torsional Vibration Suppression Control Of Reduction Gear", *1993 National Covention of IEEJ (The Institute of Electrical Engineers of Japan)*, No. 1759, pp. 13–94–13–95.

* cited by examiner

*Primary Examiner*—Rina Duda
(74) *Attorney, Agent, or Firm*—Akin Gump Strauss Hauer & Feld, LLP

(57) ABSTRACT

An apparatus and method for controlling an electric motor is disclosed. The apparatus includes an instruction inputting section for transmitting an instruction for an electric motor or a control object coupled to said electric motor and a prefilter section for outputting a follow-up instruction value by acting on the instruction. The prefilter section has a prefilter concurrently having characteristics of lowered gain at a prescribed frequency and frequencies in the vicinity thereof, and characteristics of limiting the gain in a high range. An instruction follow-up controlling section provides a controlling instruction follow-up so that a quantity of a state of said electric motor or control object follows the follow-up instruction value.

56 Claims, 33 Drawing Sheets

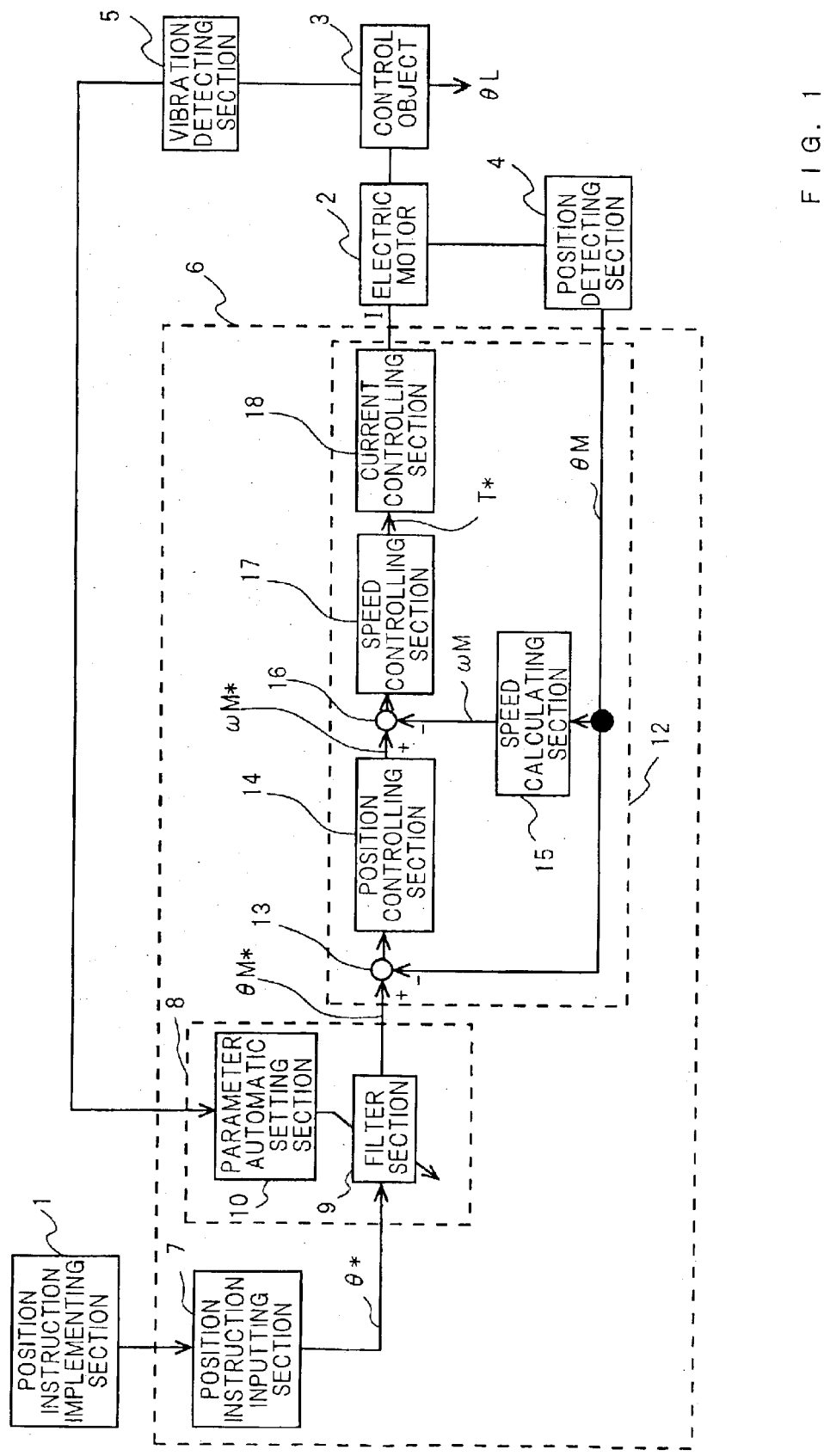
F I G. 1

$$\theta* \rightarrow \boxed{\dfrac{\left(\dfrac{1}{\omega a^2} - \dfrac{1}{\omega f^2}\right)s^2 - \dfrac{2\zeta}{\omega f}s}{\dfrac{1}{\omega f^2}s^2 + \dfrac{2\zeta}{\omega f}s + 1}} \rightarrow Xc$$

PRIOR ART

PRIOR ART

PRIOR ART

METHOD FOR CONTROLLING ELECTRIC MOTOR AND APPARATUS FOR CONTROLLING THE SAME

BACKGROUND OF THE INVENTION

The present invention relates to a method for controlling an electric motor and an apparatus for controlling the same, which method suppress vibrations of the electric motor or control object, resulting from a shortage in mechanical rigidity of a control object itself of the motor and a coupling shaft for connecting the motor and control object.

In positioning control which uses an electric motor, a digital servo control using a microcomputer has been conventionally employed. An apparatus for controlling an electric motor according to a prior art example, which has an object to suppress and prevent vibrations, has been disclosed in the Institute of Electrical Engineers National Convention No. 1759 "Vibration Suppression Control of Torsional Vibrations in Reduction Gears" in 1993.

A description is given of an apparatus for controlling an electric motor according to the prior art example. FIG. 26 is a configurational view of an apparatus for controlling an electric motor according to the prior art example. In FIG. 26, reference number 101 denotes a position instruction implementing section, 102 denotes an electric motor, 103 denotes a control object to be controlled, 104 denotes a position detecting section, and 105 denotes a servo controller. The servo controller 105 includes a position instruction inputting section 106, a prefilter section 107, and an instruction follow-up controlling section 108. The instruction follow-up controlling section 108 includes a position deviation calculating section (subtractor) 109, a position controlling section 110, a speed calculating section 111, a speed deviation calculating section (subtractor) 112, a speed controlling section 113, and a current controlling section 114. Reference symbol s denotes a Laplacian (Laplace operator).

The position instruction implementing section 101 prepares a position instruction and inputs it into the position instruction inputting portion 106 of the servo controller 105. The position instruction inputting portion 106 transmits a position instruction $\theta M^*$ to the instruction follow-up controlling section 108 via the prefilter section 107. The controlling apparatus according to the prior art example controls an electric motor 102 so that the position (hereinafter called "Control object position $\theta L$") of a control object (load) 103 to be controlled, which is coupled to the electric motor is made coincident with the position instruction $\theta^*$. In FIG. 26, no control object position $\theta L$ can be detected. The position detecting section 104 detects the position (hereinafter called "Electric motor position $\theta M$") of the electric motor 102. The servo controller 105 controls the electric motor 102 so that the electric motor position $\theta M$ is made coincident with the position instruction $\theta^*$, whereby the controlling apparatus according to the prior art example controls the electric motor 102 so that the control object position $\theta L$ is made coincident with the position instruction $\theta^*$. The electric motor position $\theta M$ and control object position $\theta L$ are controlled so as to quickly follow up with the position instruction $\theta^*$.

In a control system in which the rigidity of a control object 103 itself and of a coupling shaft for connecting the electric motor 102 and the control object 103 is high, the controlling apparatus according to the prior art example is able to control the electric motor 102 so that the control object position $\theta L$ becomes coincident with the position instruction $\theta^*$ at high accuracy.

In a control system in which the rigidity of a control object 103 itself and of a coupling shaft for connecting the electric motor 102 and the control object 103 is low (including a control system capable of controlling at high accuracy to such a degree that the torsion, etc. of the coupling shaft cannot be ignored), a phase arises between the control object position $\theta L$ and the electric motor position $\theta M$, torsional vibration of the coupling shaft is liable to occur. In a controlling apparatus that controls the electric motor 102 so that the electric motor position $\theta M$ is made coincident with the position instruction $\theta^*$, if vibration occurs due to torsion of the coupling shaft, the rate of the control object position $\theta L$ converging on the position instruction $\theta^*$ becomes slow.

In the prior art example, the prefilter section 107 inputs a pattern of the position instruction $\theta^*$ and varies it to a pattern $\theta M^*$ (electric motor position instruction) which does not cause vibrations of the control object position $\theta L$. The instruction follow-up controlling section 108 controls the electric motor 102 so that the electric motor position $\theta M$ is made coincident with the control object position $\theta L$. The prefilter section 107 suppresses vibration of the control object position $\theta L$ and speeds up the rate of convergence of the electric motor position $\theta M$ and control object position $\theta L$ on the position instruction $\theta^*$.

A description is given of a flow of basic calculations in the prior art controlling apparatus shown in FIG. 26. The position instruction inputting section 106 inputs a position instruction prepared by the position instruction implementing section 101. The position instruction inputting section 106 converts the inputted position instruction in units, and produces and outputs a position instruction $\theta^*$ in agreement with the unit system used in calculations in the servo controller 105.

The prefilter section 107 differentiates the position instruction $\theta^*$ in the second order and calculates a vibration suppression compensating value obtained by multiplying the output by a prescribed coefficient $1/(\omega a^2)$. The prefilter section 107 adds the position instruction $\theta^*$ and the calculated vibration suppression compensating value to each other, and generates and outputs an electric motor position instruction $\theta M^*$. Where it is assumed that the anti-resonance frequency is fr, which is included in a system from the torque outputted by the electric motor to the electric motor 102, preferably $\omega a=2\pi \cdot f$ (f is a frequency of fr or a frequency in the vicinity of fr) may be established. The principle for suppressing vibrations by the prefilter section 107 is described later.

A detailed description is given of a flow of internal calculations in the instruction follow-up controlling section 108. The position deviation calculating section (subtractor) 109 inputs the electric motor position instruction $\theta M^*$ and electric motor position $\theta M$, and calculates an electric motor position deviation $\Delta \theta M$ ($=\theta M^*-\theta M$). The position controlling section 110 outputs a speed instruction $\omega M^*$ ($=Kpp \cdot \theta M$) by using position proportional gain Kpp.

The speed calculating section 111 differentiates the electric motor position $\theta M$ and calculates the electric motor speed $\omega M(=\omega M \cdot s)$. The speed deviation calculating section (subtractor) 112 inputs a speed instruction $\omega M^*$ and an electric motor speed $\omega M$. And it calculates a speed deviation $\Delta \omega M$ ($=\omega M^*-\omega M$).

The speed controlling section 113 carries out a proportional integral calculation on the basis of the speed deviation $\Delta \omega M$, and outputs a torque instruction $T^*$. The current controlling section 114 controls a current value I flowing into the electric motor 102 so that the torque TM outputted by the electric motor 102 becomes T*.

A description is given of the principle of suppressing vibrations by the prefilter section 107. A system in which the electric motor 102 drives the control object 103 is expressed by using a two-inertia system (electric motor 102 and control object 103) as a model (FIG. 27). The model is generally used as a model of a resonance system. Actually, a system in which the torque TM drives the control object position θL may be expressed by a complicated mathematical expression model.

FIG. 28 is a block diagram expressing a system, in which the electric motor 102 shown in FIG. 27 drives the control object 103 via a coupling shaft having low rigidity, in terms of a mathematical expression model. In FIG. 28, the electric motor 102 generates an actual torque TM at a sufficiently quick response in accordance with the torque instruction T*. It is assumed that a transmission function from input of the torque instruction T* to generation of an actual torque TM is TM/T*=1. Reference symbol JM denotes inertia of the electric motor 102, JL denotes inertia of the control object 103, and Ks denotes a spring constant of the coupling shaft. Inertia of the coupling shaft is ignored since it is considered that it is sufficiently small in comparison with JM and JL.

If the transmission function θM/T* from the torque instruction T* to the electric motor position θM is obtained on the basis of the mathematical expression model shown in FIG. 28, Expression (1) can be brought about.

$$(JLs^2+Ks)/[\{JM \cdot JLs^2+Ks(JM+JL)\}s^2] \quad (1)$$

If the transmission function θL/θM from the electric motor position θM to the control object position θL is obtained on the basis of the mathematical expression model shown in FIG. 28, Expression (2) can be brought about.

$$Ks/(JLs^2+Ks) \quad (2)$$

FIG. 29 is a block diagram expressed by a Laplacian (Laplace operator) s equivalent to the configuration view of FIG. 26, using Expressions (1) and (2) obtained from the block diagram of FIG. 28. In FIG. 29, blocks having the same number as those of FIG. 26 have the same functions as those of FIG. 26.

In FIG. 29, where no prefilter section 107 is provided, the position instruction θ* is equal to θM* (that is, θ*=θM*). A description is given of a difference in response between the case where no prefilter section 107 is provided and the case where the prefilter section is provided, by comparing the transmission function from the electric motor position instruction θM* to the control object position θL with the transmission function from the position instruction θ* to the control object position θL in FIG. 29.

A description is given of the frequency characteristics where no prefilter section 107 is provided, that is, those of the transmission function from the electric motor position instruction θM* to the control object position θL in FIG. 29. The frequency characteristics of the transmission function from the torque instruction T* to the electric motor position θM in FIG. 29 become as in FIG. 30(a) on the basis of Expression (1). In FIG. 30(a), the abscissa indicates frequency while the ordinate indicates gain and phase. The abscissa is expressed in terms of a logarithm. In the other frequency characteristic diagrams, the abscissa indicates frequency while the ordinate indicates gain and phase. In addition, the abscissa is expressed in terms of a logarithm.

Since the rigidity of the control object is low, FIG. 30(a) has a resonance point and an anti-resonance point. In FIG. 30(a), frequency in which resonance is generated is called a resonance frequency, and frequency in which anti-resonance is generated is called an anti-resonance frequency. The frequency characteristics of a transmission function including a system of a feedback loop from the electric motor position instruction θM* to the electric motor position θM become as in FIG. 30(b).

The frequency characteristics of the transmission function from the electric motor position θM to the control object position θL become as in FIG. 30(c) on the basis of Expression (2). The frequency characteristics of the transmission function from the electric motor position instruction θM* to the control object position θL (the response frequency characteristics of the controlling apparatus where no prefilter section 107 is provided) become as in FIG. 30(d), by combining FIG. 30(b) and FIG. 30(c) together. FIG. 30(d) has the gain peak in the anti-resonance frequency fr.

FIG. 31(a) shows a pattern of the electric motor position instruction θM* instructing that the position of the electric motor 102 is changed by a fixed amount. The ordinate indicates the electric motor position instruction θM* (an amount of change in the position of the electric motor 102), and the abscissa indicates time. This is an S-letter instruction that is generally used. FIG. 31(b) shows a differential waveform of the electric motor position instruction θM* of FIG. 31(a) and becomes a trapezoidal pattern. FIG. 32 shows response of the electric motor position deviation ΔθM at this time and response of the control object position deviation ΔθL, which is a difference between the control object position θL and the electric motor position instruction θM*. The period of a position instruction output of FIG. 32 indicates a period during which the electric motor position instruction θM* of FIG. 31(a) is fluctuating, that is, a period during which the differential value of the electric motor position instruction θM* of FIG. 31(b) is not zero.

As shown in FIG. 32, after the position instruction output is completed, the control object position deviation ΔθL greatly vibrates in comparison with the electric motor position deviation ΔθM. If the vibration frequency of the control object position θL is measured, the vibration frequency becomes a frequency in the vicinity of the frequency (anti-resonance frequency) at which the gain peak is produced in the frequency characteristics of the transmission function from the electric motor position instruction θM* to the control object position θL, which is shown in FIG. 30(d). Resulting from low rigidity in the shaft coupling the electric motor 102 to the control object 103, the control object position θL greatly generates vibrations after the position instruction output is completed.

Next, a description is given of frequency characteristics where the prefilter section 107 is provided, that is, frequency characteristics of the transmission function from the position instruction θ* to the control object position θL of FIG. 29. The frequency characteristics of the transmission function from the electric motor position instruction θM* to the control object position θL become as in FIG. 30(d). The frequency characteristics of the prefilter section 107 become as in FIG. 33(a) where it is assumed that ωa=2π·fr is established (fr is an anti-resonance frequency in FIG. 30(a)). The prefilter section 107 has frequency characteristics in which the gain is minimized at the frequency ωa, and gain is increased in line with an increase in frequency at a higher range than ωa. The frequency characteristics of the transmission function from the position instruction θ* to the control object position θL become as in FIG. 33(b) by combining FIG. 30(d) and FIG. 33(a) together.

If FIG. 33(b) is compared with FIG. 30(d) showing the frequency characteristics of the transmission function from the position instruction to the control object position θL where no prefilter section 107 is provided, no gain peak is provided at the anti-resonance frequency in FIG. 33(b). That is, the prefilter section 107 lowers the gain peak at the anti-resonance frequency in the response characteristics of the controlling apparatus.

In the case where the instruction pattern of the position instruction θ* is as in FIG. 31(a), the response of the control object position deviation ΔθL and the electric motor position deviation ΔθM are shown in FIG. 34. If it is compared with FIG. 32 showing a response where no prefilter section 107 is provided, vibration of the control object position θL is decreased after the position instruction output is completed. The response of FIG. 32 is the same as that of FIG. 34 with respect to the construction other than the prefilter section 107 shown in FIG. 29.

As described above, in the prior art controlling apparatus, the prefilter section 107 shown in FIG. 26 lowers the gain peak produced in the frequency characteristics of the transmission frequency from the position instruction θ* to the control object position θL, whereby vibration of the control object position ΔL is decreased, which is generated after the position instruction output is completed, resulting from the gain peak.

FIG. 35 shows response characteristics in the case where the parameter settings of a system having the response characteristics shown in FIG. 32 are partially varied. In the system shown in FIG. 35, in comparison with the system shown in FIG. 32, position proportional gain Kpp of the position controlling section 110 and speed proportional gain Kvp of the speed controlling section 113 are lowered, and vibration is reduced after the position instruction output of the control object position θL is completed. In FIG. 35, the vibration amplitude upon completion of the position instruction output is almost equivalent to that of FIG. 34. However, the response thereof is made slower than that of FIG. 34.

In the controlling apparatus according to the prior art example, the prefilter section 107 can bring about an effect by which vibrations of the control object position θL can be lowered after a position instruction output is completed while maintaining high response performance of the controlling apparatus.

In the prior art example, where it is assumed that a position instruction θ* outputted by the position instruction inputting section 106 of FIG. 29 has a pattern shown in FIG. 31(a), the instruction pattern of the electric motor position instruction θM* passing through the prefilter section 107 (the transmission function has a correction term $(s^2/\omega a^2)$ of the second order differential of the position instruction) becomes as in FIG. 36. In FIG. 31(b) and FIG. 36, points A, B, C and D are points of acceleration fluctuation (second order differentials of the position instruction) of the instruction pattern of FIG. 31(a). The second order differential of the electric motor position instruction θM* radically fluctuates at the points A, B, C and D. FIG. 37 shows a waveform of the torque instruction T* where the system shown in FIG. 29 inputs a position instruction θ* of the instruction pattern of FIG. 31(a).

At the points A, B, C and D, a very large torque instruction T*, which is shown by a broken line circle of FIG. 37, is generated resulting from radical fluctuations of the second order differential of the electric motor position instruction θM*. At the points A, B, C and D, the greater the second order differential of the electric motor position instruction θM* is, that is, the smaller the ωa is, or the greater the acceleration of the position instruction θ* is, the greater the torque instruction T* is generated at the points A, B, C and D. Generally, an upper limit is provided for the torque instruction T* due to limitations in hardware. The torque T* is limited so that the torque does not increase higher than the upper limit. Where a fluctuation of the second order differential of the electric motor position instruction θM* becomes excessive at the points A, B, C and D, the torque instruction T* is limited. If the torque T* is limited, the controlling apparatus is not able to output an adequate torque waveform to suppress vibrations while holding high-speed response. Thus there was a problem in that it takes considerable time for vibration convergence of the control object position θL.

It is therefore an object of the invention to provide a method for controlling an electric motor, by which vibrations of the electric motor and a control object (load) can be suppressed while maintaining high-speed response of an electric motor and a control object without depending on instruction patterns and characteristics of a control object in a controlling apparatus having low mechanical rigidity of a control object and a coupling portion, etc., between an electric motor and a control object, and to provide an apparatus for controlling the same. In detail, it is an object of the invention to provide a method for controlling an electric motor and apparatus for controlling the same, which prevent the torque instruction from being limited when it becomes excessive, without depending on instruction patterns and characteristics of a control object.

It is another object of the invention to provide a method for controlling an electric motor and apparatus for controlling the same, which automatically and optimally suppress vibrations of the electric motor and control object in response to the quantity of state of a control system (unevenness and chronological changes in the characteristics of individual controlling apparatuses (including control objects) and/or differences in the history up to the quantity of state thereof).

BRIEF SUMMARY OF THE INVENTION

In order to achieve the above objects, the invention has the following construction.

A method for controlling an electric motor according to one aspect of the invention comprises an instruction inputting step of inputting an instruction for an electric motor or a control object coupled to the above-described electric motor; a prefilter step of outputting a follow-up instruction value by acting the above-described instruction to a filter concurrently having characteristics of lowering the gain in a prescribed frequency and the frequency in the vicinity thereof, and characteristics of suppressing the gain in a high range; and an instruction follow-up controlling step of controlling instruction follow-up so that the quantity of state of the above-described motor and control object follows up the above-described follow-up instruction value.

An apparatus for controlling an electric motor according to another aspect of the invention comprises an instruction inputting section of inputting an instruction for an electric motor or a control object coupled to the above-described electric motor; a prefilter section of outputting a follow-up instruction value by acting the above-described instruction to a filter concurrently having characteristics of lowering the gain in a prescribed frequency and frequencies in the vicinity thereof, and characteristics of suppressing the gain in a high range; and an instruction follow-up controlling section of controlling instruction follow-up so that the quantity of state of the above-described electric motor or control object follows up the above-described follow-up instruction value.

The method for controlling an electric motor and apparatus for controlling the same according to the invention can bring about an effect of suppressing vibrations of an electric motor and a control object, which result from low rigidity of the control object itself or a coupling shaft between the electric motor and control object. According to the invention, it is possible to suppress vibrations of the electric motor and control object without depending on instruction patterns and characteristics of the control object. The invention achieves a method for controlling an electric motor and apparatus for controlling the same, which prevent a torque instruction from being limited when the torque instruction becomes an excessive value without depending on the instruction pattern and characteristics of the control object.

A method for controlling an electric motor according to still another aspect of the invention comprises an instruction inputting step of inputting an instruction for an electric motor or a control object coupled to the above-described electric motor; a feed-forward type prefilter step of equivalently converting a transmission function of a filter concurrently having the characteristics of lowering the gain in a prescribed frequency or frequencies in the vicinity thereof and characteristics of suppressing the gain in a high range to the sum of a constant term and a feed-forward compensation term, outputting a follow-up instruction value by acting the above-described instruction to the above-described constant term, and outputting a compensation amount of a feed-forward compensation term by acting the above-described instruction to the feed-forward compensation term; and an instruction follow-up controlling step of controlling instruction follow-up so that, on the basis of the above-described compensation amount of the feed-forward compensation term and the above-described follow-up instruction value, the quantity of state of the above-described electric motor or the above-described control object follows up the above-described follow-up instruction value.

An apparatus for controlling an electric motor according to still another aspect of the invention comprises an instruction inputting section of inputting instructions for an electric motor or a control object coupled to the above-described electric motor; a feed-forward type prefilter section of equivalently converting a transmission function of a filter concurrently having the characteristics of lowering the gain in a prescribed frequency or frequencies in the vicinity thereof and characteristics of suppressing the gain in a high range to the sum of a constant term and a feed-forward compensation term, outputting a follow-up instruction value by acting the above-described instruction on the above-described constant term, and outputting a compensation amount of a feed-forward compensation term by acting the above-described instruction to the feed-forward compensation term; and an instruction follow-up controlling section of controlling instruction follow-up so that, on the basis of the above-described compensation amount of the feed-forward compensation term and the above-described follow-up instruction value, the quantity of state of the above-described electric motor or the above-described control object follows up the above-described follow-up instruction value.

A method for controlling an electric motor and apparatus for controlling the same according to the invention can bring about an effect of suppressing vibrations of an electric motor and a control object, which result from low rigidity of the control object itself or a coupling shaft between the electric motor and control object. According to the invention, it is possible to suppress vibrations of the electric motor and control object without depending on instruction patterns or characteristics of the control object. The invention achieves a method for controlling an electric motor and apparatus for controlling the same, which prevent a torque instruction from being limited when the torque instruction becomes an excessive value without depending on the instruction pattern and characteristics of the control object.

The instruction follow-up controlling step (Instruction follow-up controlling section) controls an instruction value based on a constant term as a follow-up target value of an electric motor, suppresses vibrations of a control object (load) on the basis of a compensating amount of a feed-forward compensating term. For example, in the configuration according to Embodiment 1 (FIG. 1), a position instruction $\theta^*$ inputted by the filter section is calculated, and the electric motor position instruction $\theta M^*$ which is the result of calculation is used as a target value for control. Therefore, cancellation of significant digits is generated for components less than 1LSB in the calculation process of the position instruction $\theta^*$. An error of convergence value of the electric motor position arises, resulting from an error of the calculation. According to the invention in the above view point, since the position instruction $\theta^*$ is used for control as a target value as it is (that is, target value is not processed by calculation), no error is generated in the convergence value of the electric motor position due to an error of the calculation. It is not necessary to compensate the error in the convergence value of the electric motor position. According to the invention, in comparison with a case where an error arises in the convergence value, it is possible to control the electric motor at high accuracy. According to the invention, in comparison with a case where an error in the convergence value is compensated, it is possible to shorten the time of calculation for compensation of the error in software processing, and it is possible to decrease or save labor and time required to develop software for compensating errors when developing products.

A method for controlling an electric motor according to still another aspect of the invention comprises an instruction inputting step of inputting an instruction for an electric motor or a control object coupled to the above-described electric motor; an instruction follow-up controlling step of controlling instruction follow-up so that, on the basis of a compensation amount of a feed-forward compensation term and a follow-up instruction value, the quantity of state of the above-described electric motor or the above-described control object follows up the above-described follow-up instruction value; an instruction estimating step of estimating the above-described instruction on the basis of the quantity of state in the above-described instruction follow-up controlling step, and outputting an estimated instruction; an internal configuration type prefilter step of equivalently converting a transmission function of a filter concurrently having the characteristics of lowering the gain in a prescribed frequency or frequencies in the vicinity thereof and characteristics of suppressing the gain in a high range to the sum of a constant term and a feed-forward compensation term, and outputting the above-described compensation amount of a feed-forward compensation term by acting the above-described estimated instruction to the feed-forward compensation term.

An apparatus for controlling an electric motor according to still another aspect of the invention comprises an instruction inputting section of inputting an instruction for an electric motor or a control object coupled to the above-described electric motor; an instruction follow-up controlling section of controlling instruction follow-up so that, on the basis of a compensation amount of a feed-forward compensation term and a follow-up instruction value, the quantity of state of the above-described electric motor or the above-described control object follows up the above-described follow-up instruction value; an instruction estimating section of estimating the above-described instruction on the basis of the quantity of state in the above-described instruction follow-up controlling step, and outputting an estimated instruction; an internal configuration type prefilter section of equivalently converting a transmission function of a filter concurrently having the characteristics of lowering the gain in a prescribed frequency or frequencies in the vicinity thereof and characteristics of suppressing the gain in a high range to the sum of a constant term and a feed-forward compensation term, and outputting the above-described compensation amount of a feed-forward compensation term by acting the above-described estimated instruction to the feed-forward compensation term.

A method for controlling an electric motor and apparatus for controlling the same according to the invention can bring about an effect of suppressing vibrations of an electric motor and a control object, which result from low rigidity of the control object itself or a coupling shaft between the electric motor and control object. According to the invention, it is possible to suppress vibrations of the electric motor and control object without depending on instruction patterns and characteristics of the control object. The invention achieves a method for controlling an electric motor and apparatus for controlling the same, which prevent a torque instruction from being limited when the torque instruction becomes an excessive value without depending on the instruction pattern and characteristics of the control object.

The instruction follow-up controlling step (Instruction follow-up controlling section) uses an instruction value as a follow-up target value of the electric motor, and suppresses vibrations of a control object (load) on the basis of the compensating amount of the feed-forward compensation term. Thereby, no error in the convergence value of the electric motor position resulting from cancellation of significant digits arises, wherein it is not necessary to compensate the error in the convergence value of the electric motor position. The method for controlling an electric motor and apparatus for controlling the same according to the invention brings about high positioning accuracy of an electric motor in comparison with a case where no calculation error is compensated. According to the invention, in comparison with a case where an error in the calculation value is compensated, it is possible to shorten the time of calculation for compensation of the error of the calculation in software processing, and it is possible to decrease or save labor and time required to develop software for compensating errors when developing products. Also, no calculation error compensating circuit is required in a control LSI.

In a controlling method in which the basic software is constructed by, for example, the existing control programs, or in a controlling apparatus in which the basic circuit is constructed by the existing control LSI, there are several limiting conditions (the degree of configurational freedom is limited) when adding a program or a circuit to suppress vibrations of a control object. For example, there are many cases where instruction values inputted by the instruction inputting step (by the instruction inputting section) are not taken out to the periphery (that is, the inputted instruction values are not understandable). The invention does not vary the basic control system. In the invention, an output of the electric motor is compensated by estimating the inputted instruction value, calculating the feed-forward compensating amount on the basis of the estimate value, and adding the feed-forward compensating amount.

The invention achieves a method for controlling an electric motor and apparatus for controlling the same, which effectively suppress vibrations, of an electric motor and a control object, resulting from low rigidity of the control object itself or a coupling shaft connecting between the electric motor and control object, in, for example, a controlling apparatus in which the basis circuit is constructed by the existing control LSI.

In a method for controlling the above-described electric motor according to still another aspect of the invention, the above-described prefilter step, the above-described feed-forward type prefilter step or the above-described internal configuration type prefilter step various the gain particularly in the above-described prescribed frequency among the characteristics of lowering the gain in the prescribed frequency and frequencies in the vicinity thereof.

In an apparatus for controlling the above-described electric motor according to still another aspect of the invention, the above-described prefilter section, the above-described feed-forward type prefilter section or the above-described internal configuration type prefilter section varies the gain particularly in a prescribed frequency among the characteristics of lowering the gain in the prescribed frequency and frequencies in the vicinity thereof.

The method for controlling an electric motor and apparatus for controlling the same according to the invention further improve an effect of suppressing vibrations by varying the gain in the prescribed frequency. The gain of the prescribed frequency may be automatically varied.

In the above-described method for controlling an electric motor according to another aspect of the invention, the above-described prefilter step, the above-described feed-forward type prefilter step or the above-described internal configuration type filter step varies the characteristics of suppressing the gain in the above-described high range in accordance with the operating state.

In the above-described apparatus for controlling an electric motor according to another aspect of the invention, the above-described prefilter section, the above-described feed-forward type prefilter section or the above-described internal configuration type filter section varies the characteristics of suppressing the gain in the above-described high range in accordance with the operating state.

The method for controlling an electric motor and apparatus for controlling the same according to the invention automatically adjust the characteristics of suppressing the gain in a high range in accordance with the operating state of an electric motor or a control object, whereby delay in response of the controlling apparatus can be made slight by suppressing the gain in a high range.

In the above-described method for controlling an electric motor according to another aspect of the invention, the above-described prefilter step, the above-described feed-forward type prefilter step or the above-described internal configuration type filter step automatically determines the characteristics of suppressing the gain in the above-described high range on the basis of at least the parameters for determining the above-described prescribed frequency.

In the apparatus for controlling an electric motor according to another aspect of the invention, the above-described prefilter section, the above-described feed-forward type prefilter section or the above-described internal configuration type filter section automatically determines the characteristics of suppressing the gain in the above-described high range on the basis of at least the parameters for determining the above-described prescribed frequency.

The method for controlling an electric motor and apparatus for controlling the same according to the invention automatically determine the characteristics of suppressing the gain in the prescribed frequency and that in a high range, whereby the maneuverability of the controlling apparatus is further improved.

In the above-described method for controlling an electric motor according to another aspect of the invention, the above-described prefilter step, the above-described feed-forward type prefilter step or the above-described internal configuration type filter step includes a vibration frequency automatically setting step of automatically setting the above-described vibration prescribed frequency.

In the above-described apparatus for controlling an electric motor according to another aspect of the invention, the above-described prefilter section, the above-described feed-forward type prefilter section or the above-described internal configuration type filter section includes a vibration frequency automatically setting section of automatically setting the above-described vibration prescribed frequency.

The method for controlling an electric motor and apparatus for controlling the same according to the invention automatically set a prescribed frequency in respective controlling apparatuses. The method for controlling an electric motor and apparatus for controlling the same according to the invention adaptively carry out optimal control even in the case where the characteristics of the control system change due to chronological changes or environmental changes, and suppress the vibrations of the electric motor and control object, whereby the maneuverability of the controlling apparatus is improved.

In the above-described method for controlling an electric motor according to still another aspect of the invention, the above-described vibration frequency automatically setting step includes a step of detecting vibrations of the above-described control object and a step of determining the prescribed frequency by extracting the vibration frequency from the above-described detected vibrations.

In the above-described apparatus for controlling an electric motor according to another aspect of the invention, the above-described vibration frequency automatically setting section includes a section of detecting vibrations of the above-described control object and a section of determining the prescribed frequency by extracting the vibration frequency from the above-described detected vibrations.

A method for controlling an electric motor and apparatus for controlling the same according to the invention accurately detect a vibration frequency of a control object by detecting the vibration of the above-described control object. The method for controlling an electric motor and apparatus for controlling the same according to the invention optimally lower vibrations of a control object at all times even if the vibration frequency changes, for example, due to fluctuations in the characteristics of the control object.

The method for detecting vibrations of an electric motor or control object is optional. For example, a vibration detecting sensor composed of a pressure-sensitive sensor is adhered to the surface of an electric motor or a control object. Thereby, it is possible to accurately detect the vibration frequency of control object. The maneuverability of the controlling apparatus is further improved.

In the above-described method for controlling an electric motor according to still another aspect of the invention, the above-described vibration frequency automatically setting step determines the above-described prescribed frequency on the basis of the vibration frequency of the above-described electric motor.

In the above-described apparatus for controlling an electric motor according to still another aspect of the invention, the above-described vibration frequency automatically setting section determines the above-described prescribed frequency on the basis of the vibration frequency of the above-described electric motor.

A method for controlling an electric motor and apparatus for controlling the same according to the invention accurately detect the vibration frequency of the electric motor by detecting the vibration of the electric motor. The method for controlling an electric motor and apparatus for controlling the same according to the invention is capable of optimally lowering the vibration of an electric motor at all times even if the vibration frequency changes due to a fluctuation in the characteristics of the electric motor.

In a method for controlling an electric motor according to another aspect of the invention, the above-described vibration frequency automatically setting step, a mathematical expression model of the above-described electric motor and control object is estimated on the basis of response of the above-described electric motor, and the above-described prescribed frequency is determined on the basis of the above-described mathematical expression model.

In an apparatus for controlling an electric motor according to another aspect of the invention, the above-described vibration frequency automatically setting section, a mathematical expression model of the above-described electric motor and control object is estimated on the basis of response of the above-described electric motor, and the above-described prescribed frequency is determined on the basis of the above-described mathematical expression model.

The method for controlling an electric motor and apparatus for controlling the same according to the invention accurately detects the vibration frequency of a control object by estimating a mathematical expression model of the electric motor and control object. The method for controlling an electric motor and apparatus for controlling the same according to the invention can optimally lower the vibrations of a control object at all times even if the vibration frequency changes, for example, due to fluctuations in the characteristics of the control object. The operation performance of the controlling apparatus is further improved. The method for controlling an electric motor and apparatus for controlling the same according to the invention are inexpensive since no vibration detecting section of the control object is used therein.

In the above-described method for controlling an electric motor according to another aspect of the invention, the above-described prescribed frequency is a frequency in the vicinity of an anti-resonance frequency held by a system from the torque outputted by the above-described electric motor to the position or speed of the above-described electric motor.

In the above-described apparatus for controlling an electric motor according to another aspect of the invention, the above-described prescribed frequency is a frequency in the vicinity of an anti-resonance frequency held by a system from the torque outputted by the above-described electric motor to the position or speed of the above-described electric motor.

A method for controlling an electric motor and apparatus for controlling the same according to the invention suppress vibrations of the system until a torque outputted by the electric motor is transmitted to a control object, wherein a controlling method and a controlling apparatus, which have high response performance, are achieved. The frequency in the vicinity of the resonance frequency is a frequency that is the same as the anti-resonance frequency or frequency that is approximate thereto.

The method for controlling an electric motor according to another aspect of the invention comprises an instruction inputting step of inputting an instruction for an electric motor or a control object coupled to the above-described electric motor; and a controlling step of carrying out control so that the quantity of state of the above-described electric motor or the above-described control object follows up the above-described instruction; wherein, in the above-described controlling step, a follow-up instruction value is outputted by acting the above-described instruction to a filter concurrently having the characteristics of lowering the gain in frequencies in the vicinity of the anti-resonance frequency held by a system from the torque of the above-described electric motor to the position or speed of the above-described electric motor and characteristics of suppressing the gain in a high range, and the above-described controlling step carries out control that is identical to or equivalent to the control by which the above-described quantity of state of the above-described electric motor or the above-described control object follows up the above-described follow-up instruction value.

The apparatus for controlling an electric motor according to another aspect of the invention comprises an instruction inputting section of inputting an instruction for an electric motor or a control object coupled to the above-described electric motor; and a controlling section of carrying out control so that the quantity of state of the above-described electric motor or the above-described control object follows up the above-described instruction; wherein, in the above-described controlling section, a follow-up instruction value is outputted by acting the above-described instruction to a filter concurrently having the characteristics of lowering the gain in frequencies in the vicinity of the anti-resonance frequency held by a system from the torque of the above-described electric motor to the position or speed of the above-described electric motor and characteristics of suppressing the gain in a high range, and the above-described controlling section carries out control that is identical to or equivalent to the control by which the above-described quantity of state of the above-described electric motor or the above-described control object follows up the above-described follow-up instruction value.

The method for controlling an electric motor and apparatus for controlling the same according to the invention bring about an effect of suppressing vibrations of an electric motor and a control object, which are generated due to low rigidity of the control object or a coupling shaft connecting the electric motor to the control object. According to the invention, it is possible to suppress the vibrations of an electric motor and a control object itself at all times without depending on an instruction pattern or characteristics of the control object. The invention achieves a method for controlling an electric motor and apparatus for controlling the same, which prevent the torque instruction from being limited due to an excessive value without depending on an instruction pattern and characteristics of a control object.

An apparatus according to still another aspect of the invention has the above-described controlling apparatus. The apparatus according to the invention achieves high response performance.

Novel features of the invention are those described in Claims attached herewith. However, with respect to both the construction and description, the invention is further understood and estimated based on the following detailed description, which will be understood in reference to the accompanying drawings along with other objects and features.

BRIEF DESCRIPTION OF DRAWINGS

FIG. 1 is a block diagram of control, which shows a configuration of a method for controlling an electric motor according to Embodiment 1 of the invention;

FIG. 4($b$) is a characteristic view of frequency from a position instruction $\theta^*$ to a control object position $\theta L$;

FIG. 12 is a configurational view of an equivalent filter section 11 in Embodiment 2 according to the invention;

Figure 2:
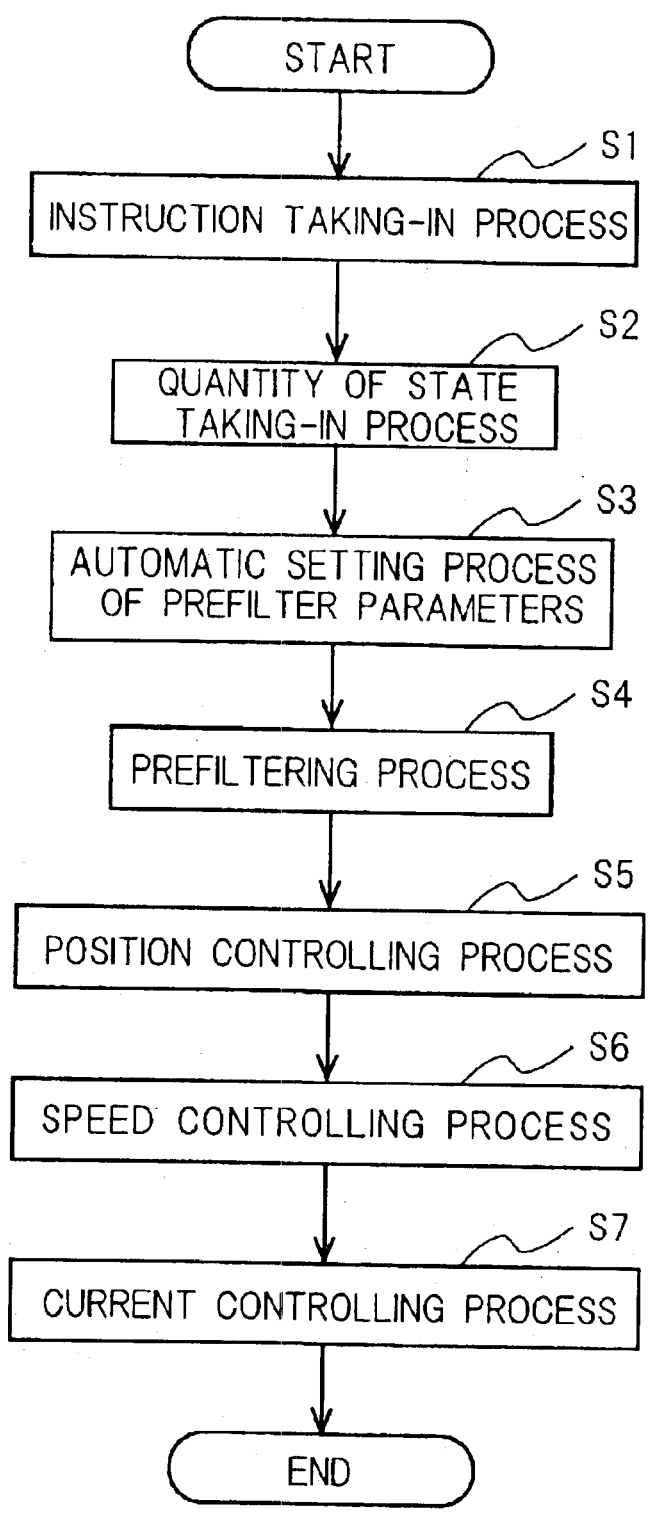
FIG. 2 is a flowchart of Embodiment 1 according to the invention.

Parts or the entirety of the drawings are depicted by brief expressions aiming at illustrations, and it is considered that actual relative sizes and positions of components depicted therein are not necessarily faithfully shown.

DETAILED DESCRIPTION OF THE INVENTION

A description is given of embodiments showing the best mode of carrying out the invention in detail with reference to the accompanying drawings.

<<Embodiment 1>>

Using FIG. 1 through FIG. 9, a description is given of a method for controlling an electric motor and an apparatus for controlling the same according to Embodiment 1 of the invention. FIG. 1 is a view showing a configuration of an apparatus for controlling an electric motor according to Embodiment 1 of the invention. The apparatus for controlling an electric motor according to Embodiment 1 is an apparatus for controlling the position of the head (mechanism section of retaining an electronic component taken out from the cartridge until it is placed on a prescribed position on a printed circuit board) of a mounting unit for automatically packaging an electronic component (for example an IC) taken in from a cartridge on the printed circuit board. The apparatus for controlling an electric motor and method for controlling the same according to the invention are not limited thereto, but may be applicable to any optional apparatus. In the apparatus for controlling an electric motor according to Embodiment 1, the mechanical rigidity of a coupling shaft between an electric motor 2 and a control object 3 may be low. Also, the rigidity of the control object itself may be low.

In FIG. 1, reference number 1 denotes a position instruction implementing section, 2 denotes an electric motor, 3 denotes a control object, 4 denotes a position detecting section, 5 denotes a vibration detecting section, and 6 denotes a servo controller. The servo controller 6 includes a position instruction inputting section 7, a prefilter section 8, and an instruction follow-up controlling section 12. The prefilter filter section 8 includes a filter section 9, and a parameter automatic setting section 10. The instruction follow-up controlling section 12 includes a position deviation calculating section (subtractor) 13, a position controlling section 14, a speed calculating section 15, a speed deviation calculating section (subtractor) 16, a speed controlling section 17, and a current controlling section 18.

The position instruction implementing section 1 implements a position instruction and inputs it into the position instruction inputting section 7 of the servo controller 6. The position instruction inputting section 7 transmits a position instruction θ* to the instruction follow-up controlling section 12 via the prefilter section 8. The controlling apparatus according to Embodiment 1 is an apparatus that controls the electric motor 2 so that the position of a control object 3 (hereinafter called "Control Object Position θL") coupled to the electric motor is made coincident with the position instruction θ*. In FIG. 1, the control object position θL cannot be detected. The position detecting section 4 detects the position (hereinafter called "Electric motor position θM") of the electric motor 2. The servo controller 6 controls the electric motor so that the electric motor position θM follows up the position instruction. Since the control object 3 is coupled to the motor 2, the control object position θL will follow up with the position instruction.

The position instruction inputting section 7 inputs a position instruction, converts it to a unit suitable for internal calculations, and outputs it as the position instruction θ*. The servo controller 6 controls the electric motor 2 so that the electric motor position θM is made coincident with the position instruction θ*, whereby the controlling apparatus according to Embodiment 1 controls the electric motor 2 so that the control object position θL is made coincident with the position instruction θ*. The electric motor position θM and control object position θL are controlled so as to quickly follow up with the position instruction θ*. In the controlling apparatus according to Embodiment 1, in which the control object 3 or a coupling shaft connecting the electric motor 2 and the control object 3 together has low rigidity, the control object position θL is liable to vibrate. In order to suppress vibrations of the control object position θL, the prefilter section 8 inputs a pattern of the position instruction θ* and varies it to the pattern θM* (electric motor position instruction) by which no vibration of the control object position θL is excited. The instruction follow-up controlling section 12 controls the electric motor 2 so that the electric motor position θM detected by the position detecting section 4 follows up the electric motor position instruction θM*. The controlling apparatus quickly follows up an inputted position instruction.

Figure 26:
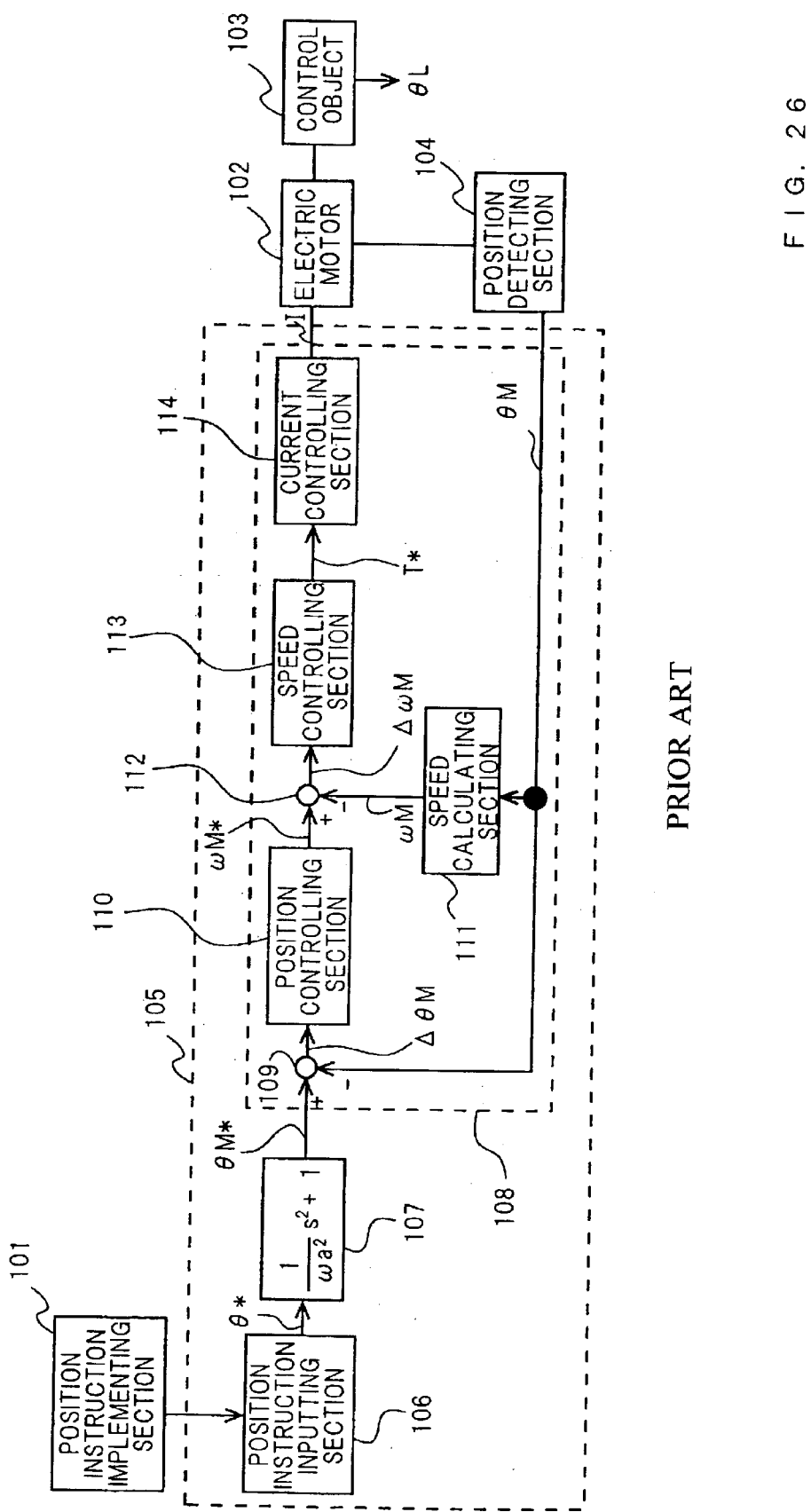
FIG. 26 is a block diagram of control of a prior art method for controlling an electric motor.

In Embodiment of FIG. 1, a point that differs from the prior art apparatus for controlling an electric motor (FIG. 26) resides in that the vibration detecting section 5 is added, and in that the internal structure of the prefilter section 8s is different from the prefilter section 107 of FIG. 26.

The vibration detecting section 5 directly detects vibrations of the control object 3, and transmits the same to the parameter automatic setting section 10 of the prefilter section 8. The configuration of the vibration detecting section 5 is optional. The vibration detecting section 5 of Embodiment 1 is a pressure-sensitive sensor attached to the surface of the control object 3.

The prefilter section 8 is provided with the parameter automatic setting section 10, and the transmission function of the filter section 9 is different from the prefilter section 107. The parameter automatic setting section 10 inputs an output signal of the vibration detecting section 5 and extracts a vibration frequency of the control object 3, which is included therein. The parameter automatic setting section 10 determines characteristics (transmission function) of the filter section 9 on the basis of the extracted vibration frequency.

The effects that can be obtained by differences in the configuration will be described below. The prior art method for controlling an electric motor brings an effect of suppressing vibrations of the electric motor position θM and control object position θL in a control system having low rigidity in the control object 103 or a coupling shaft between the electric motor 102 and control object 103. However, it was necessary to limit the torque since the torque instruction T* becomes excessive due to an instruction pattern implemented by the position instruction implementing section 101 or the characteristics of the control object 103. In this case, the controlling apparatus cannot carry out optimal control, wherein there was a problem in that response to the position instruction is slowed, and the vibration convergence of the control object position θL takes much time.

The filter section 9 of the prefilter section 8 of FIG. 1 inputs a position instruction θ*, automatically converts it to an instruction pattern by which it is difficult for the control object 3 to excite vibrations, and outputs it as the electric motor position instruction θM*. The electric motor position instruction θM* will not exceed the upper limit (that is, will not be limited) without depending on the instruction pattern implemented by the position instruction implementing section 1 and characteristics of the control object 3. The controlling apparatus according to Embodiment 1 carries out a controlling method of optimally suppressing vibrations of the electric motor 2 and control object 3 at all times.

Next, a detailed description is given of actions of the control block of FIG. 1. The position instruction implementing section 1 includes, for example, a PLC (Programmable Logic Controller). The position instruction implementing section 1 implements a position instruction pattern and outputs a position instruction in accordance with the pattern.

The position detecting section 4 detects the position of the electric motor 2 and outputs it as the electric motor position θM.

The servo controller 6 carries out digital control. The servo controller 6 inputs a position instruction coming from the position instruction implementing section 1 and an electric motor position θM coming from M coming from the position detecting section 4 once every fixed cycle, calculates the same and controls the current I flowing in the electric motor 2.

FIG. 2 shows a flow chart of a calculation process of one cycle, which is implemented by the servo controller 6. The servo controller 6 repeats the calculation process shown in FIG. 2 once every fixed calculation cycle (for example, 166 μs). A description is given of the process from the commencement to the termination in FIG. 2, using FIG. 1 through FIG. 5. Subscripts (n) of respective quantity of state expresses a value in the present calculation cycle, and (n−1) expresses a value of the preceding past calculation cycle.

The position instruction inputting section 7 reads a position instruction coming from the position instruction implementing section 1, converts it to a unit system suitable for internal calculations in the servo controller 6, and outputs a position instruction θ*(n) (Instruction reading process in Step S1).

The instruction follow-up controlling section 12 acquires the position of the electric motor 2, which is detected by the position detecting section 4, as θM (n) (Process for acquiring the quantity of state in Step S2).

The parameter automatic setting section 10 of the prefilter section 8 calculates the vibration frequency fr from vibrations of the control object 3, which are detected by the vibration detecting section 5 (Automatic setting process of parameters of the prefilter section in Step S3). $\omega a = 2\pi \cdot fr$ is established. The method for calculating the vibration frequency of the control object 3 by the parameter automatic setting section 10 is optional. For example, the parameter automatic setting section 10 measures the interval of zero cross time of a vibration signal outputted by the vibration detecting section 5, and calculates the vibration frequency on the basis of the measured value. For example, the parameter automatic setting section 10 converts vibration signals outputted by the vibration detecting section 5 to frequency spectra by FFT (Fast Fourier Transformation), and detects the vibration frequency fr. The parameter automatic setting section 10 establishes $\omega a = 2\pi \cdot fr$ on the basis of the calculated vibration frequency fr, and determines $\omega f$ based on $\omega a$.

Figure 3:
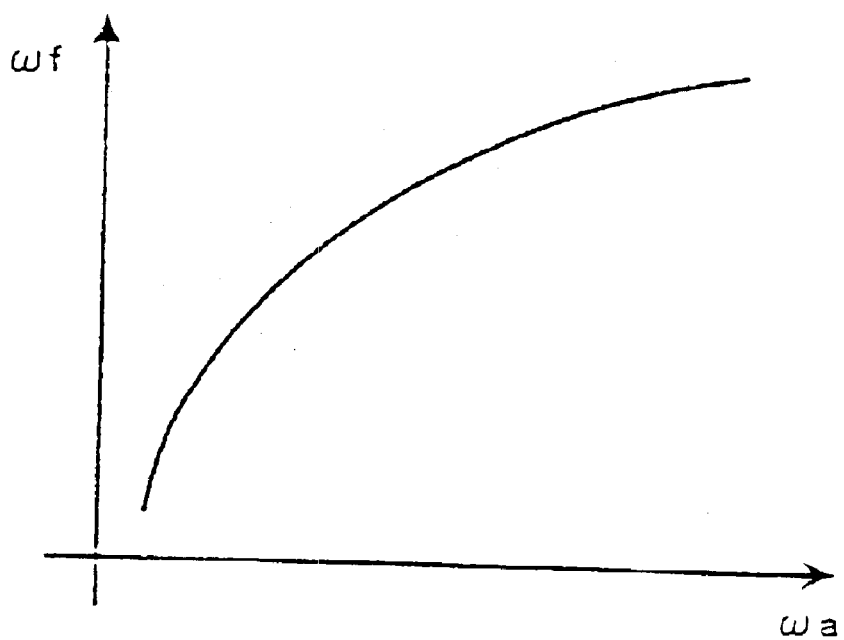
FIG. 3 is a graph showing the relationship between arguments and set value in Embodiment 1 according to the invention.

FIG. 3 is a graph showing the relationship between $\omega a$ and $\omega f$ in the controlling apparatus according to Embodiment 1. The parameter automatic setting section 10 determines $\omega f$ on the basis of $\omega a$, using a table that stores values of plotting $\omega a$ and $\omega f$ on the graph shown in FIG. 3 or a function expressing the graph shown in FIG. 3. A two-dimensional table may be used, in which $\omega a$ and acceleration (second-order differential) of the position instruction θ* are made into arguments.

The attenuation coefficient ζ may be variable. However, it is fixed at 1 herein. The attenuation coefficient ζ is a figure other than 0. A detailed description will be given later of the roles of $\omega f$, the reason why $\omega a$ and acceleration of the position instruction θ* are made into arguments, and a suitable set value of ζ. Thus, the parameter automatic setting section 10 determines the parameters of the filter section 9.

Figure 30:
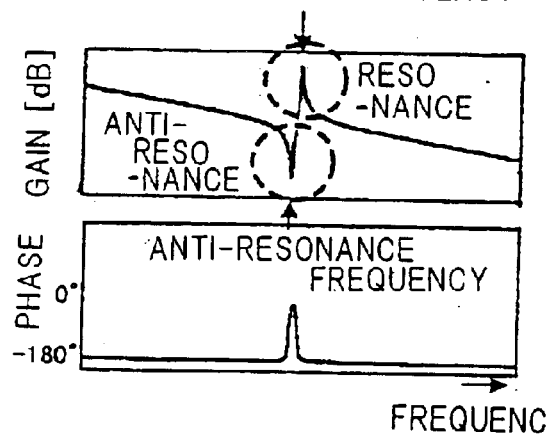
FIG. 30(a) is a characteristic view of frequency of a transmission function from a torque instruction T* to an electric motor position θM according to the prior art method for controlling an electric motor.
FIG. 30(b) is a characteristic view of frequency of a transmission function from an electric motor position instruction θM* to an electric motor position θM according to the prior art method for controlling an electric motor.
FIG. 30(c) is a characteristic view of frequency of a transmission function from an electric motor position θM to a control object position θL according to the prior art method for controlling an electric motor.
FIG. 30(d) is a characteristic view of frequency of a transmission function from an electric motor position instruction θM* to a control object position θL according to the prior art method for controlling an electric motor.
Figure 30:
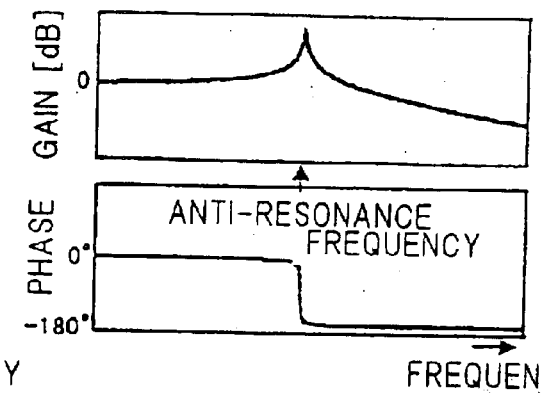
Figure 30:
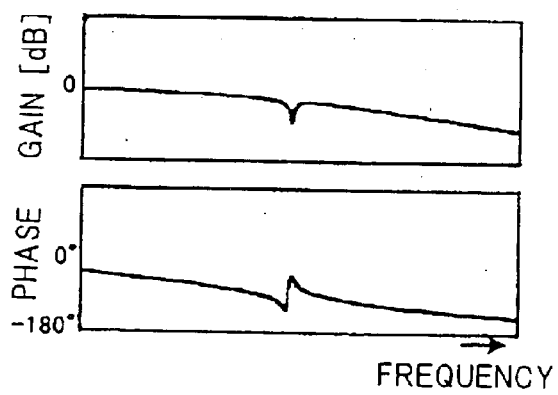
Figure 30:
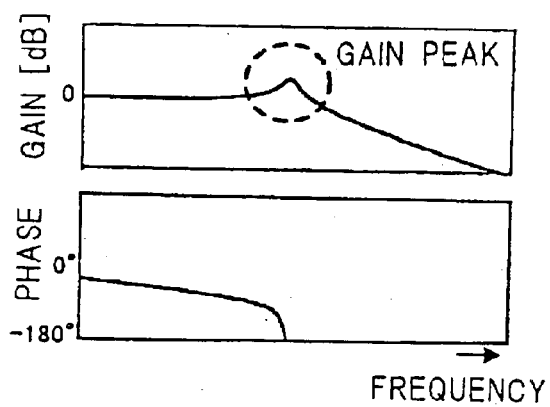

The filter section 9 calculates an electric motor position instruction θM*(n) from the position instruction θ*(n) using ωa and ωf (Prefilter process in Step S4). The filter section 9 has a transmission function shown in FIG. 5. FIG. 4(a) is a view showing the frequency characteristics of a transmission function between input and output of the filter section 9. The frequency characteristics of the filter section 9 are in accordance with the parameters determined in Step S3. The filter section 9 has characteristics of lowering the gain of frequency ωa and frequency in the vicinity thereof. In particular, the gain in a higher range than ωa is low in comparison with the frequency characteristics of the prefilter section 107 of the prior art example shown in FIG. 33(a). The frequency characteristics from the position instruction θ* to the control object position θL become those obtained by combining those of FIG. 30(b) and those of FIG. 4(a), and accordingly become those of FIG. 4(b). In FIG. 4(b), the gain in a higher range than ωa is suppressed in comparison with FIG. 33(b) of the prior art example.

Figure 4:
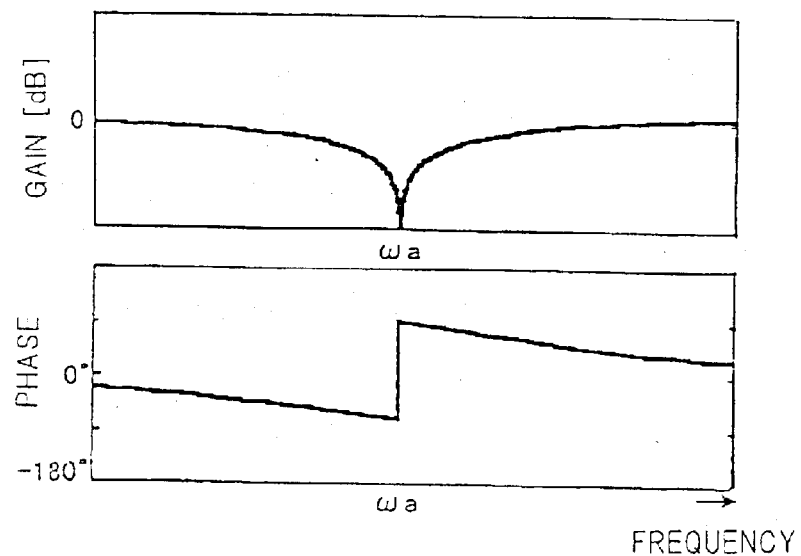
FIG. 4($a$) is a characteristic view of frequency of a filter section 9 in Embodiment 1 according to the invention.
Figure 4:
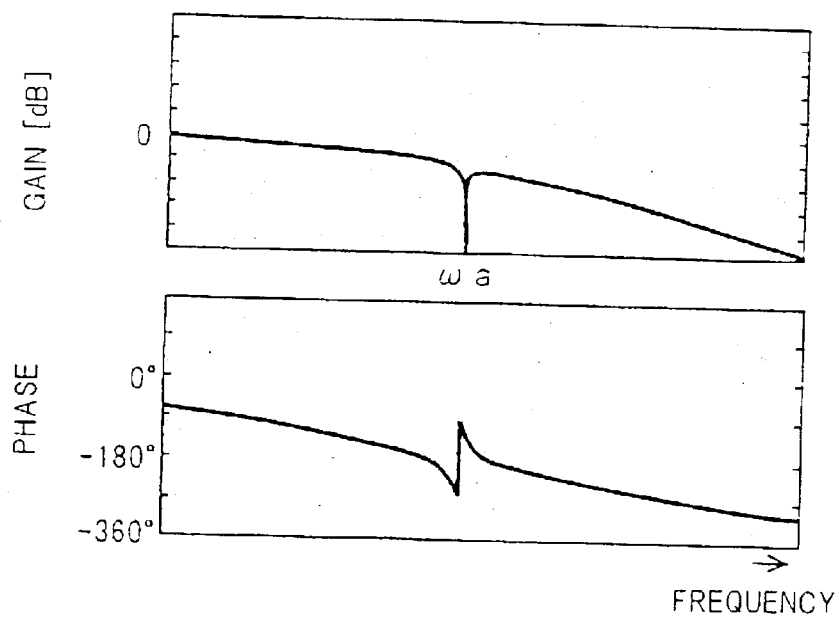
Figure 5:
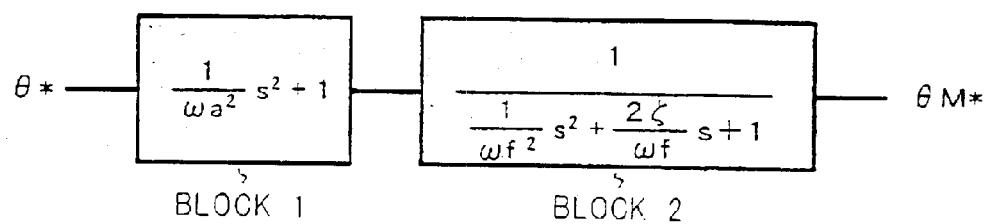
FIG. 5 is a configurational view of the filter section 9 in Embodiment 1 according to the invention.

FIG. 5 is a view showing the internal structure of the filter 9 in terms of a Laplacian (Laplace operator) s. Actually, the configuration shown in FIG. 5 is converted to a digital filter by a method such as bilinear transformation, and the filter section 9 achieves the characteristics of FIG. 4(a) as a digital filter. Effects of Step S4 will be described in detail later.

The position deviation calculation section (Subtractor) 13 and position controlling section 14 carry out a position controlling process (Position controlling process in Step S5). First, the position deviation calculation section 13 carries out a calculation of ΔθM(n)=θM*(n)−θM(n) and calculates the electric motor position deviation ΔθM(n). The position controlling section 14 carries out a calculation of ωM*(n)= Kpp·Δθ*(n), using the position proportional gain Kpp and calculates a speed instruction ωM*(n).

The speed calculation section 15, speed deviation calculation section (Subtractor) 16, and speed controlling section 17 carry out a speed controlling process (Speed Controlling Process in Step S6). First, the speed calculation section 15 calculates the speed ωM(n) of the electric motor 2 on the basis of the electric motor position θM. The method for calculating the speed ωM(n) by the speed calculation section 15 is optional. The speed calculation section 15 calculates the speed ωM(n) by, for example, the method of the differential of the electric motor position θM or speed observer using backward difference and bilinear transformation of the electric motor position θM. Next, the speed deviation calculation section 16 carries out a calculation of ΔωM(n)= ωM*(n)−ωM(n) and calculates the speed deviation ΔωM(n). Next, the speed controlling section 17 carries out a proportional integral calculation of Expressions (3) and (4) using the speed proportional gain Kvp and speed integral time constant Tvi, and calculates the torque instruction T*(n). Reference symbol Xvi(n) denotes a variable for integration calculation.

$$Xvi(n)=Xvi(n-1)+\Delta\omega M(n) \cdot Kvp/Tvi \quad (3)$$

$$T^*(n)=Kvp \cdot \Delta\omega M(n)+Xvi(n) \quad (4)$$

The current controlling section 18 controls the current so that the current with respect to the torque instruction T*(n) flows into the electric motor 2 (Current controlling process in Step S7). Here, the process shown in FIG. 2 is completed as described above.

A description is given of the effect of the prefilter process in Step S4 in the flowchart of FIG. 2, roles of ωf derived in from in Step S3 therein, reason why ωf is derived, using ωa acceleration (second order differential) of the position instruction θ* as arguments, and a suitable set value of ζ in comparison with the prior art example.

First, a description is given of the effects of the prefilter process in Step S4. The filter section 9 shown in FIG. 5 includes a configuration in which a block 1 having the same transmission function as that of the prefilter section 107 (FIG. 26) according to the prior art example and a block 2, which is the secondary filter, are connected to each other in series. The block 1 eliminates the frequency components, which excite vibrations of the control object position θL, from the position instruction θL. An effect of lowering the vibrations of the control object position θL can be obtained by the block 1. Since the detailed principle is the same as that in the prior art example, description thereof is omitted.

Figure 6:
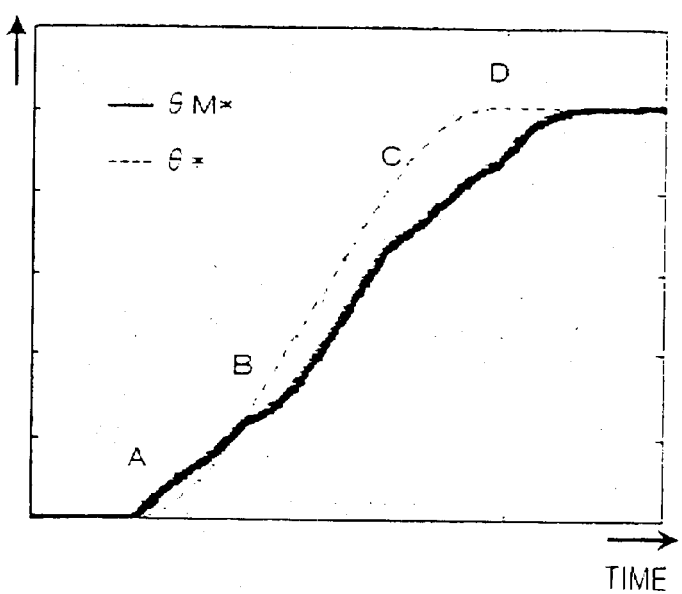
FIG. 6 is a view showing waveforms of the position instruction $\theta^*$ and electric motor position instruction $\theta M^*$ in Embodiment 1 according to the invention.
Figure 7:
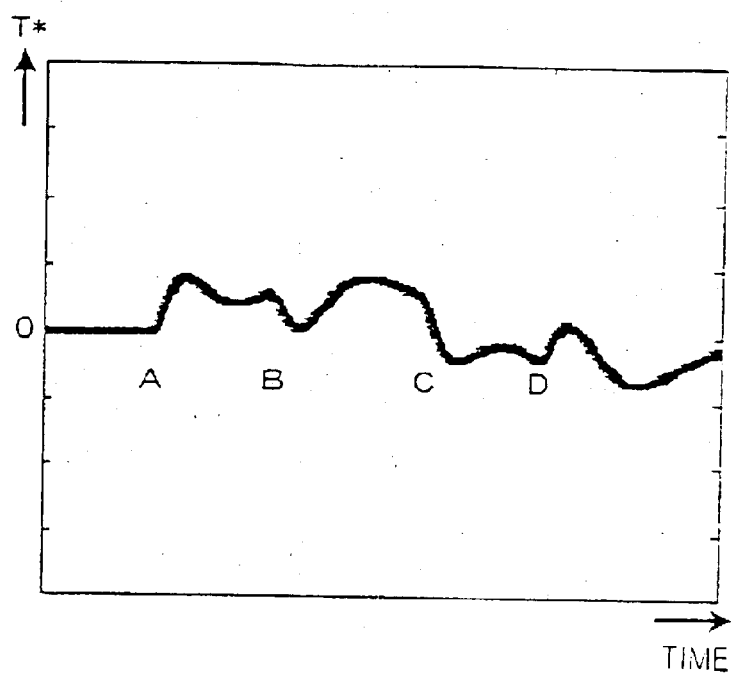
FIG. 7 is a view showing a waveform of a torque instruction $T^*$ in Embodiment 1 according to the invention.
Figure 36:
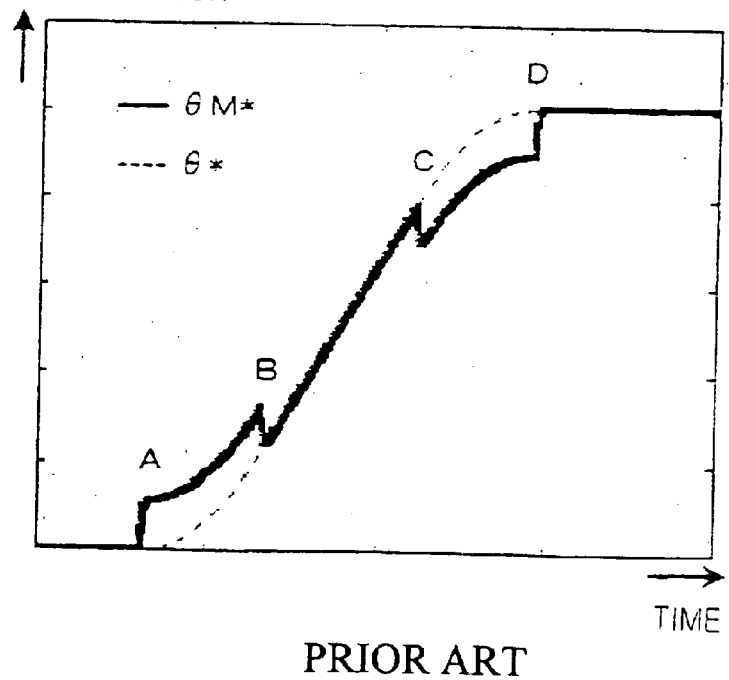
FIG. 36 is a view showing waveforms of position instruction θ* and electric motor position instruction θM* in the prior art method for controlling an electric motor.

The block 2 prevents the torque instruction T* from becoming an excessive value at the point of time when the acceleration (second order differential) of the position instruction θ* fluctuates. FIG. 6 is a view showing waveforms of the position instruction θ* inputted by the prefilter section 8 (FIG. 1) and the electric motor position instruction θM* outputted therefrom (wherein the abscissa indicates time, and the ordinate indicates values of the position instruction θ* and electric motor position instruction θM*). The broken line thereof indicates the position instruction θ*, and the solid line indicates the electric motor position instruction θM*. The waveform of the position instruction θ* is the same as that shown in FIG. 31(a). The first order differential of the position instruction θ* has a waveform shown in FIG. 31(b). At this time, FIG. 7 shows the waveform of the torque instruction T* outputted by the speed controlling section 17 (FIG. 1) (wherein the abscissa indicates time, and the ordinate indicates torque). At points A, B, C and D when the acceleration of the position instruction θ* fluctuates when the position instruction θ* of the same waveform is inputted, the electric motor position instruction θM* (Embodiment 1) shown in FIG. 6 does not radically change in comparison with the electric motor position instruction θM* (FIG. 36) in the prior art example.

Figure 33:
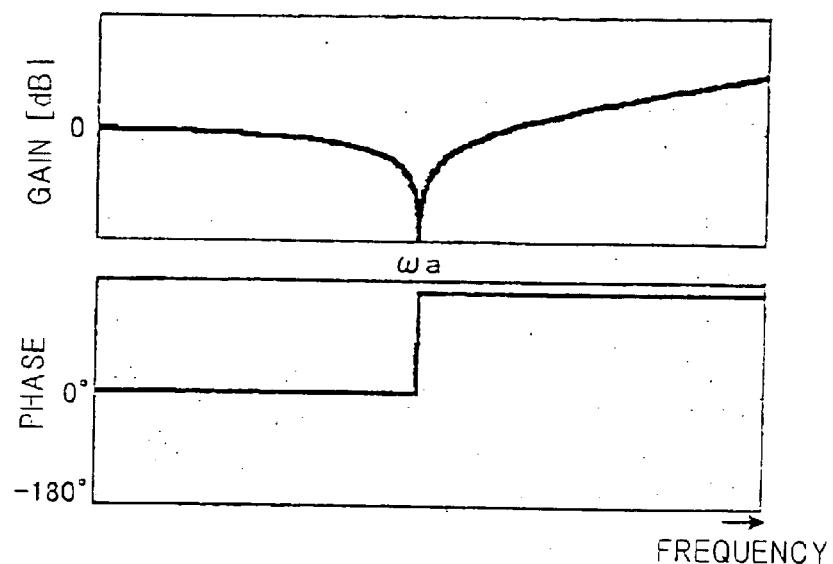
FIG. 33(a) is a characteristic view of frequency of the prefilter section 107 in the prior art method for controlling an electric motor.
FIG. 33(b) is a characteristic view of frequency of a transmission function from a position instruction θ* to a control object position θL in the prior art method for controlling an electric motor.
Figure 33:
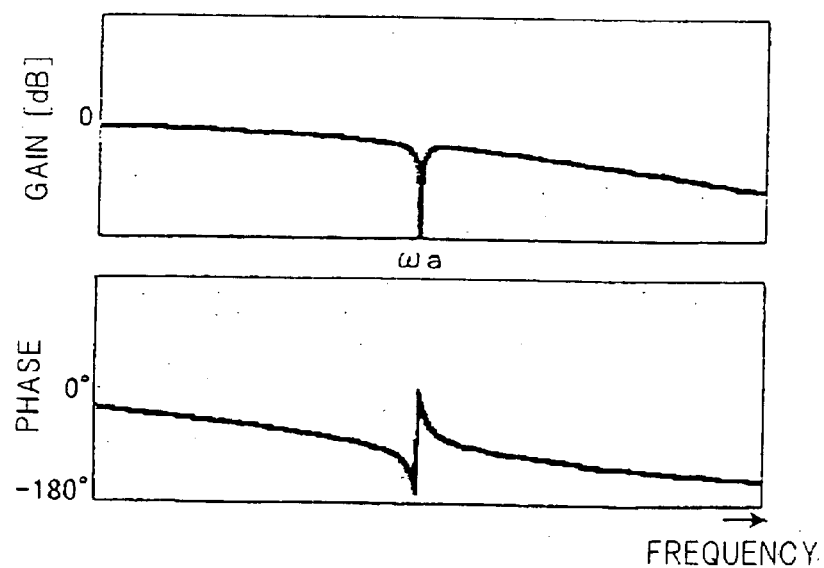
Figure 34:
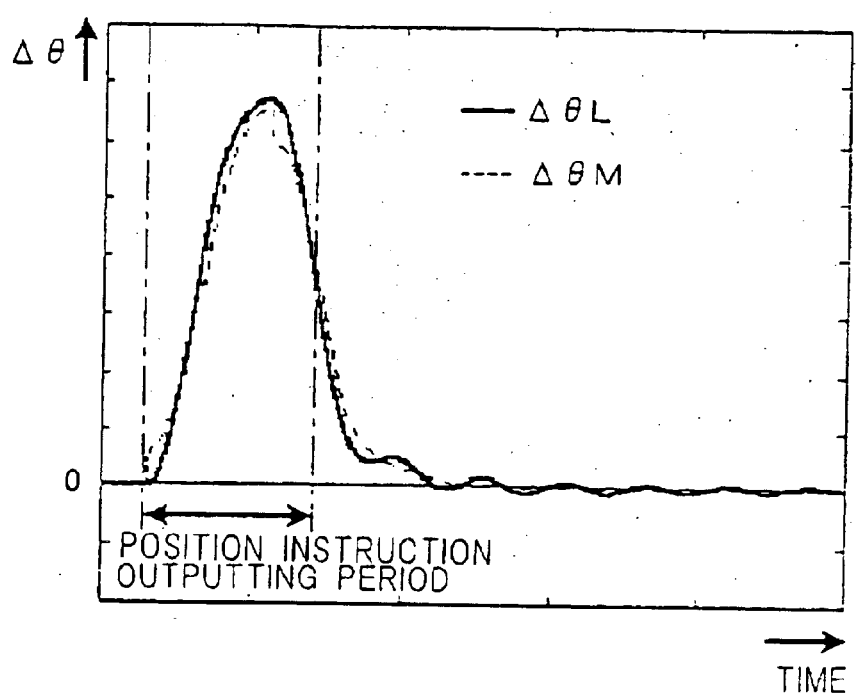
FIG. 34 is a view showing waveforms of the electric motor position deviation ΔθM and control object position deviation ΔθL in the prior art method for controlling an electric motor.

This results from that the gain of the frequency characteristics, particular to a higher range than ωa, in FIG. 4(a) is made lower than the gain shown in FIG. 33(a) as the prior art example.

Figure 37:
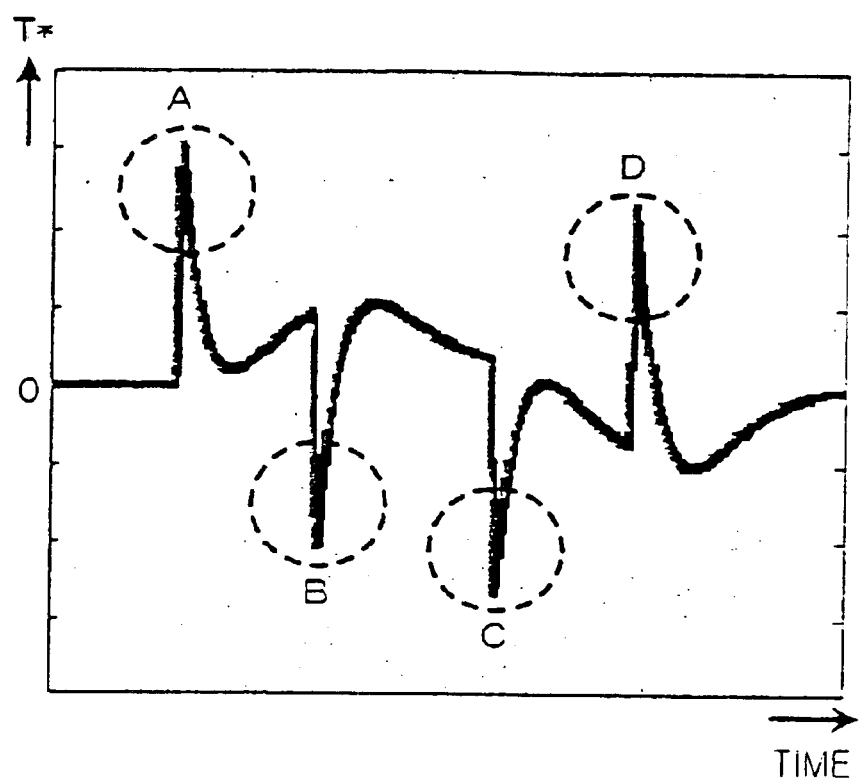
FIG. 37 is a view showing waveforms of T* in the prior art method for controlling an electric motor.

In the prior art example (FIG. 37), the torque instruction T* outputted by the speed controlling section 113 (FIG. 26) became an excessive value at the points A, B, C and D when the acceleration of the position instruction θ* fluctuates and was limited. As shown in FIG. 7, in the present embodiment, the torque instruction T* that the speed controlling section 17 (FIG. 1) outputs does not become an excessive value at the points A, B, C and D when the acceleration of the position instruction θ* fluctuates, and is freed from any limitation. The method for controlling an electric motor and apparatus for controlling the same according to the present embodiment control vibrations of the electric motor and control object at all times by optimally suppressing the vibrations thereof without depending on the instruction pattern and characteristics of the control object.

Next, a description is given of the role of ωf derived in Step S3, and the reason why ωf is derived using ωa and acceleration (second order differential) of the position instruction θ* as arguments. Where the filter section 9 (FIG. 1) inputs the position instruction θ* shown by the broken line in FIG. 6, the block 1 of FIG. 5 outputs a signal having the same waveform as that shown by the solid line in FIG. 36. The block 2 (FIG. 5) inputs a signal having the waveform shown by the solid line in FIG. 36 and outputs the electric motor position instruction θM* shown by the solid line in FIG. 6. As shown by the solid line in FIG. 36, the output signal of the block 1 radically fluctuates at the points A, B, C and D when the acceleration of the position instruction θ* fluctuates. The smaller the ωa is, or the larger the acceleration of the position instruction θ* is, the larger the fluctuation of the output signal of the block 1 becomes at the points A, B, C and D. As has been understood in the block diagram of FIG. 5, the ωf regulates the cut-off frequency of the secondary filter of the block 2.

In accordance with the magnitude in fluctuation of the output signal of the block 1 (FIG. 5) at the points A, B, C and D when the acceleration of the position instruction θ* fluctuates in FIG. 6, the parameter automatic setting section 10 decreases ωf, lowers the cut-off frequency of the secondary filter, and decreases the fluctuation in the electric motor position instruction θM* at the points A, B, C and D when the acceleration of the position instruction θ* fluctuates. Unless the ωf is sufficiently made small, the torque instruction T* radically increases as in FIG. 37 at the points when the acceleration of the position instruction θ* fluctuates, and the torque instruction T* is limited. The controlling apparatus will not become able to carry out normal control. This is the reason that the parameter automatic setting section 10 automatically sets ωf in Step S3 as arguments of ωa and acceleration of the position instruction θ*. The parameter automatic setting portion 10 makes ωf smaller and smaller as ωa becomes smaller and the acceleration of the position instruction θ becomes larger. Thus, since the parameter automatic setting section 10 automatically sets ωf, the method for controlling an electric motor and apparatus for controlling the same according to the present embodiment control the vibrations of the electric motor and control object at all times by optimally suppressing the same without depending on the instruction pattern and characteristics of the control object.

In FIG. 6, although the position instruction θ* shown by the broken line finishes its fluctuation at the point D, the point of terminating the fluctuation of the electric motor position instruction θM* outputted by the prefilter section 8 delays from the point D. This is because of influences by the secondary filter in the block 2 (FIG. 5) of the prefilter section 8. The delay in changes in the electric motor position instruction θM* is not preferable since it causes a delay in the response of the controlling apparatus. (In the prior art example, in comparison with the delay in response caused in the case where the torque instruction T* becomes an excessive value and it is limited, the response of the controlling apparatus according to the present embodiment is much quicker).

Even if the cut-off frequency of the secondary filter in the block 2 is made high in the period other than immediately after the points A, B, C and D where the torque instruction T* is liable to be limited, no torque limit functions. Using the point, the parameter automatic setting section 10 causes ωf to change in accordance with time. The parameter automatic setting section 10 increases ωf in the period immediately after the point D, whereby the termination point of fluctuation in the electric motor position instruction θM* quickens. The parameter automatic setting portion 10 changes over the parameters of the filter section 9, wherein the method for controlling an electric motor and apparatus for controlling the same according to the embodiment achieves high response performance.

Next, a description is given of an adequate set value of the attenuation coefficient ζ. If ζ is made smaller than 1, the frequency characteristics in block 2 of FIG. 5 begin holding a gain peak of gain 0 dB or more in the vicinity of frequency ωf. In this case, since there is a possibility that a vibration in the frequency of the gain peak appears in the control object position θL, it is not preferable to set ζ to 1 or less. The larger the ζ is made, the longer the termination point of fluctuation of the electric motor position instruction θM* becomes (See FIG. 6), wherein the response of the controlling apparatus becomes slow. The termination point of fluctuation is the point in time when the fluctuation is caused to end after the electric motor position instruction θM* begins to fluctuate. Therefore, it is not preferable to make ζ excessively large. Therefore, it is preferable that ζ is set to 1 or so.

Figure 8:
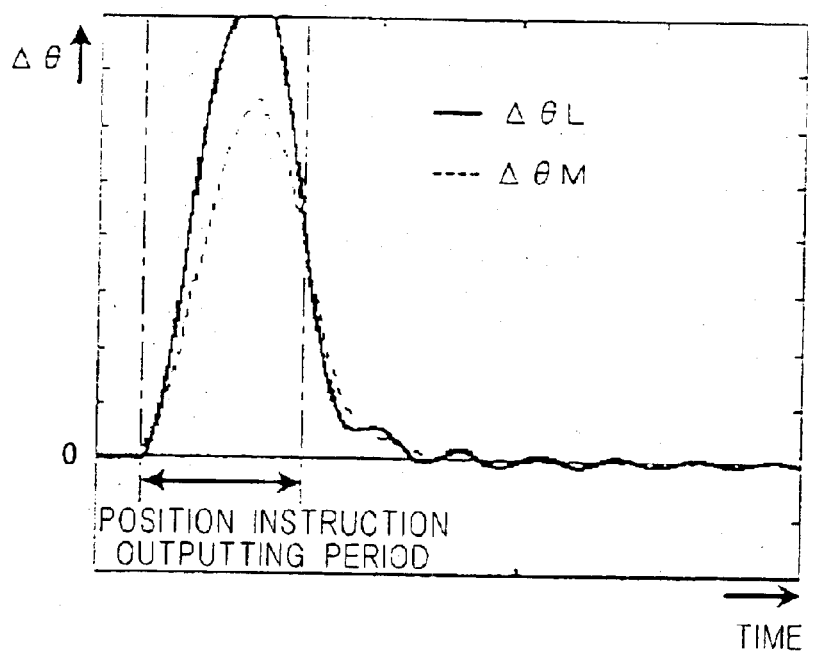
FIG. 8 is a view showing waveforms of an electric motor position deviation $\Delta\theta M$ and control object position deviation $\Delta\theta L$ in Embodiment 1 according to the invention.
Figure 31:
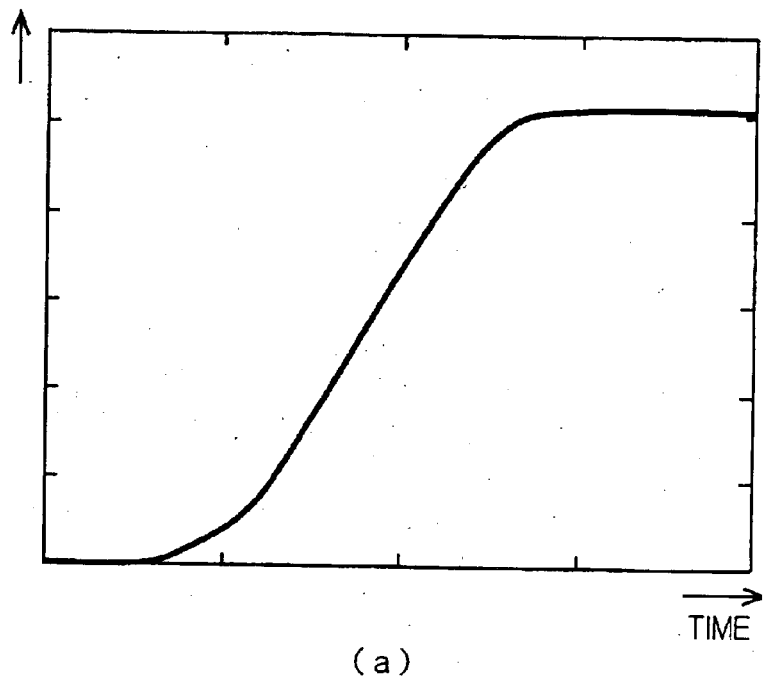
FIG. 31(a) is a view showing an instruction pattern of position instruction θ* in the prior art method for controlling an electric motor.
FIG. 31(b) is a view showing differential waveforms of position instruction θ* in the prior art method for controlling an electric motor.
Figure 31:
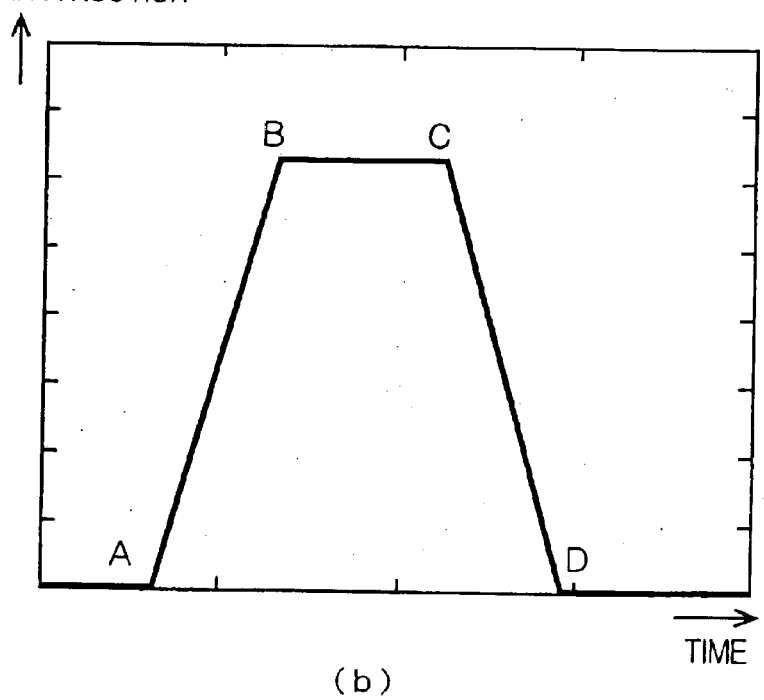

FIG. 8 is a view of waveforms showing the response of the controlling apparatus (FIG. 1) according to Embodiment 1 when a position instruction shown in FIG. 31(a) and (b) is inputted. The broken line indicates the electric motor position deviation ΔθM, and the solid line indicates the control object position deviation ΔθL. In comparing the same with FIG. 32 which shows the response waveforms of the electric motor position deviation ΔθM and control object position deviation ΔθL where no prefilter section 8 is provided, vibrations are suppressed after the period of position instruction output is terminated in the controlling apparatus according to Embodiment 1.

The transmission function of the block 1 of FIG. 5 may be changed to Expression (5) including an attenuation term ζn/ωa·s. By adjusting the attenuation term ζn, it is possible to adjust the gain of the frequency ωa. By adequately determining the attenuation term ζn, vibrations of the electric motor position deviation ΔθM and control object deviation ΔθL can be further suppressed.

$$(1/\omega a^2)\cdot s^2 + (2\zeta n/\omega a)\cdot s + 1 \qquad (5)$$

Figure 32:
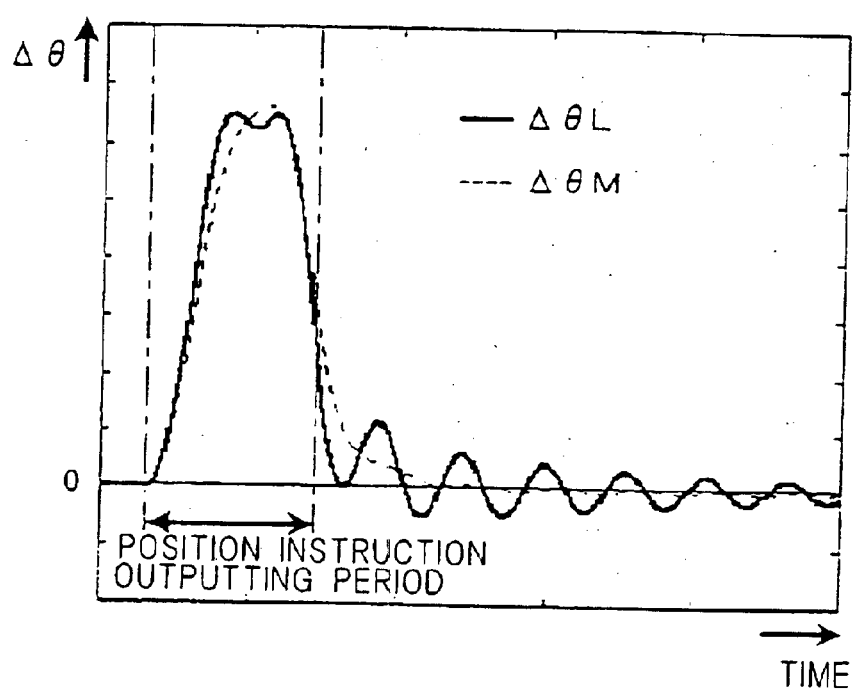
FIG. 32 is a view showing waveforms of electric motor position deviation ΔθM and control object position deviation ΔθL where no prefilter section 107 is provided in the prior art method for controlling an electric motor.
Figure 35:
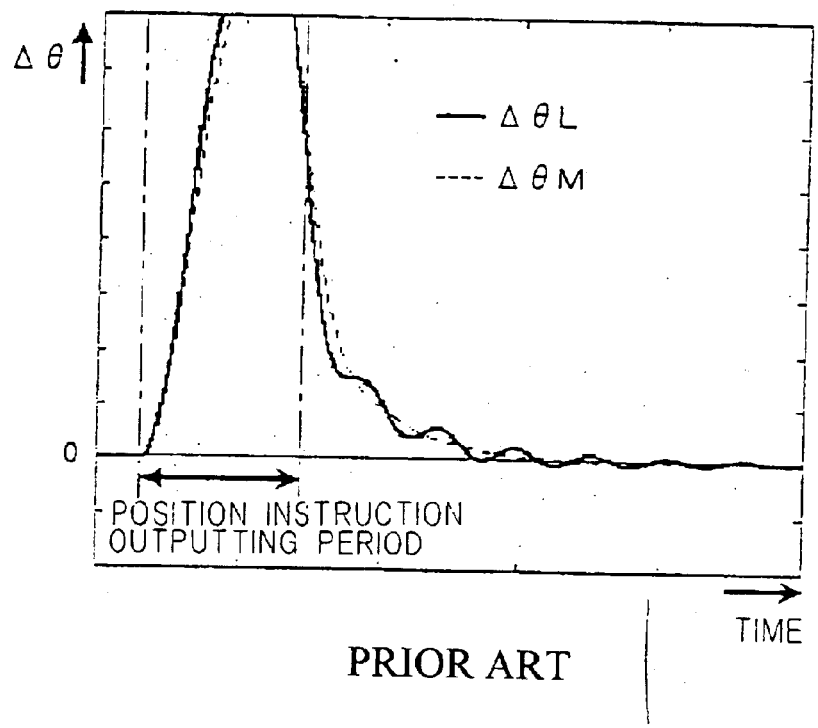
FIG. 35 is a view showing waveforms of electric motor position deviation ΔθM and control object position deviation ΔθL where position proportional gain Kpp and speed proportional gain Kvp are low when no prefilter section 107 is provided in the prior art method for controlling an electric motor.

In the controlling apparatus not having any prefilter section 8 according to the prior art example, FIG. 35 shows the response of the electric motor position deviation ΔθM and control object deviation ΔθL where the vibrations of the control object position deviation ΔθL are reduced by setting the position proportional gain Kpp and speed proportional gain KvP lower than the example shown in FIG. 32. The response of FIG. 8 is quicker than that of FIG. 35. According to the invention, it is possible to reduce the vibrations while maintaining high speed response as in the prior art example. FIG. 7 shows a waveform of the torque instruction T* when the response of FIG. 8 is brought about. The torque instruction T* does not radically increase at the points A, B, C and D when the acceleration of the position instruction θ* fluctuates, and there is no case of applying limitation. The method for controlling an electric motor and apparatus for controlling the same according to the embodiment make adequate responses when the acceleration of the position instruction θ* fluctuates.

Figure 29:
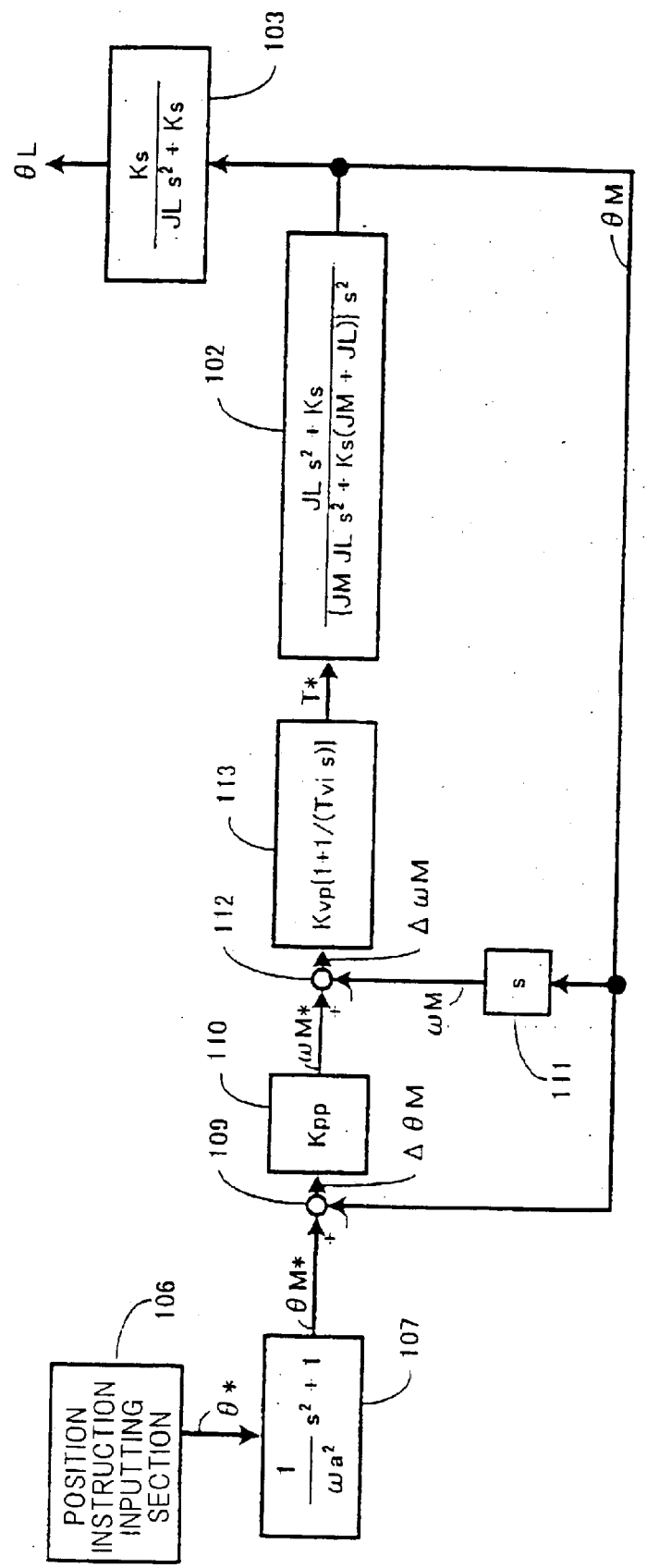
FIG. 29 is a block diagram of control showing a prior art method for controlling an electric motor.

Setting time (time required from the point of time when a position instruction output is completed (fluctuates) to the point of time when the apparatus tip end position (the tip end of the control object 3) is converged to the setting width centering around the target value) is compared with each other by experiments under conditions that the vibration frequency is 1 Hz and setting width is ±125 μm. In the controlling apparatus not having any prefilter, the setting time was 725 ms. In the controlling apparatus (FIG. 29) according to the prior art example, which has the prefilter section 107, the torque was saturated and the vibrations are not converged for a long period of time, wherein a significant setting time could not be measured. In the controlling apparatus (FIG. 1) according to the invention, the setting time was 45 ms. According to the invention, in comparison with the case where no prefilter is provided, the setting time could be decreased to approx. 1/16.

Figure 38:
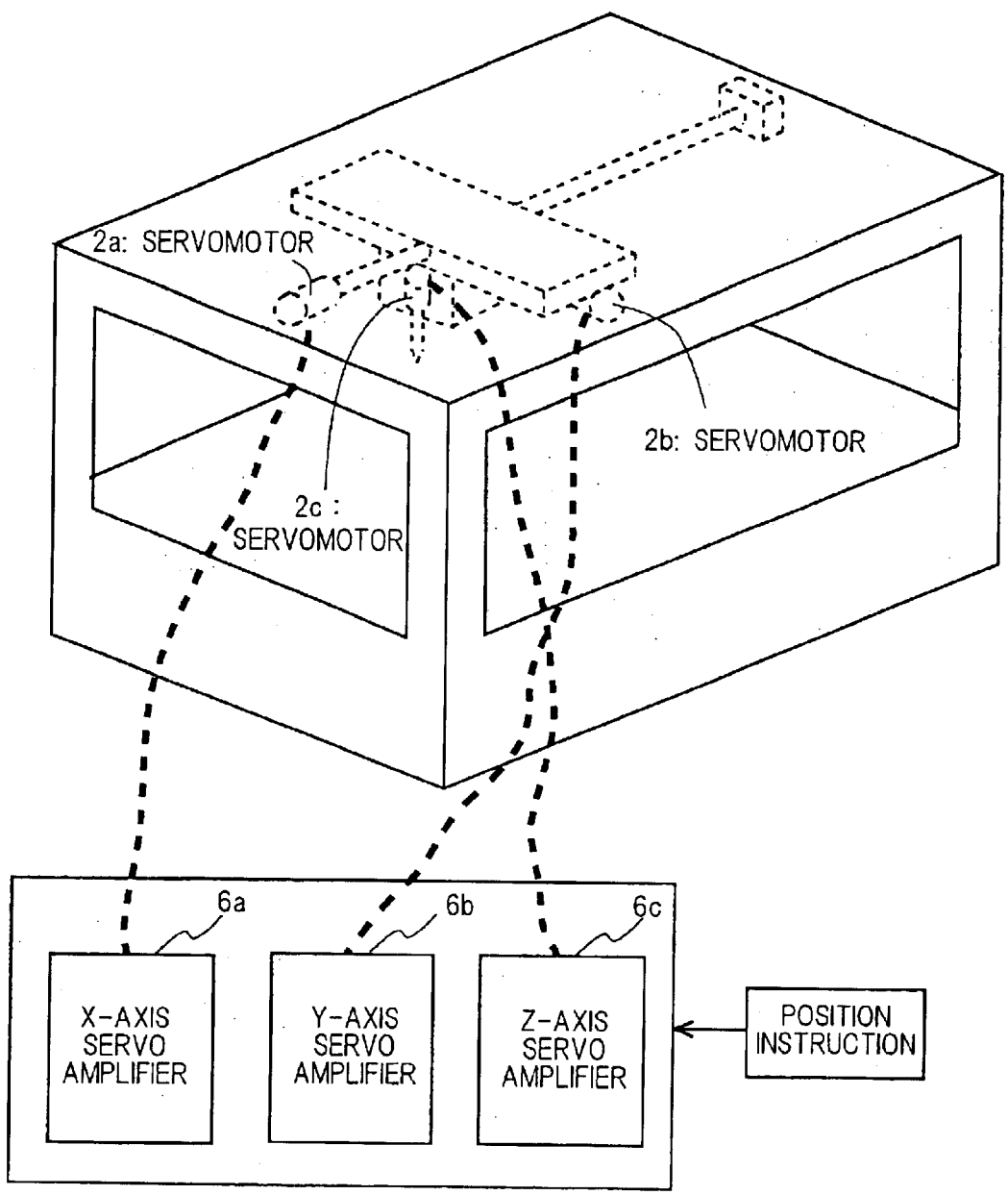
FIG. 38 is a view showing a mounting apparatus loading the invention.

FIG. 38 is a view showing a configuration of a mounting unit in which the controlling apparatus according to the invention is loaded. In FIG. 38, parts which are identical to those of FIG. 1 are given the same reference numbers. In FIG. 38, the mounting unit has servomotors 2a, 2b and 2c. The respective servomotors correspond to the electric motor 2 of FIG. 1. The respective servomotors are, respectively, controlled by servo amplifiers 6a, 6b and 6c.

With the controlling method and apparatus according to the invention, it is possible to suppress the vibrations of an electric motor and control object, which result from that the rigidity of the control object or a coupling shaft connecting the electric motor and the control object together is low. The controlling method and apparatus according to the invention always automatically suppress vibrations of an electric motor and control object without depending on the instruction pattern and characteristics of the control object, and it is possible to automatically prevent the torque instruction T* from becoming an excessive value. By automatically setting all the parameters of the prefilter section 8 of FIG. 1, the response of the controlling apparatus can be made fast, wherein the maneuverability of an apparatus employing the controlling apparatus can be improved. Since the controlling apparatus has a configuration of automatically varying the set value of ωa even if the vibration frequency ωa is changed due to a fluctuation in the characteristics of the control object, it is possible to reduce vibrations at all times without depending on the characteristics of the instruction pattern and control object.

As long as the configuration of the instruction follow-up controlling section 12 of FIG. 1 is such that the electric motor position θM is controlled to follow up with the electric motor position instruction θM*, any other configuration will be able to bring about effects similar to those of the embodiment.

The prefilter section 8 of FIG. 1 may be constructed inside the position instruction implementing section 1.

Figure 9:
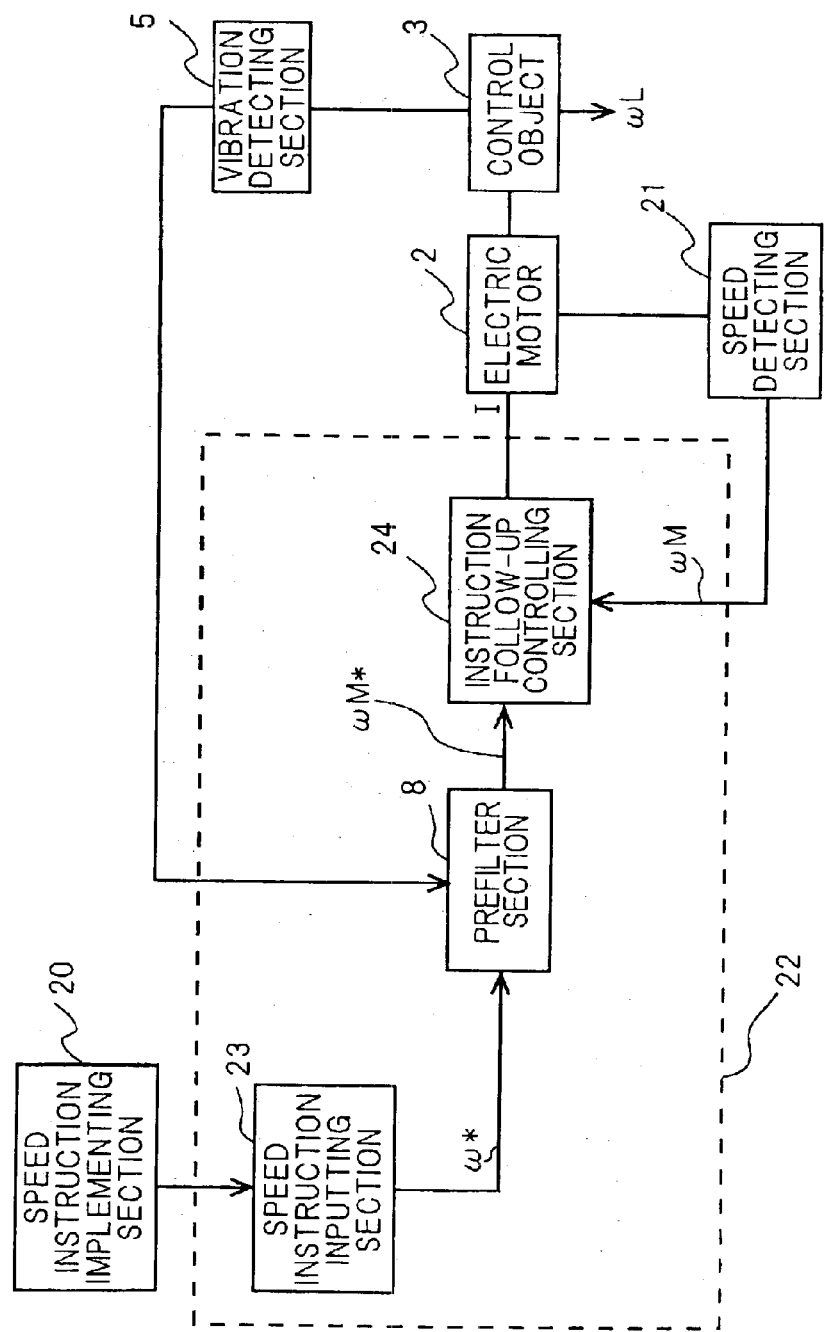
FIG. 9 is a block diagram where a prefilter section 8 according to Embodiment 1 of the invention is applied to a speed control system.

The embodiment described the position controlling system. However, the embodiment is not limited thereto. The invention may be applicable to a speed controlling system as shown in FIG. 9. In FIG. 9, blocks having the same reference numbers as those of FIG. 1 take the same roles as those of FIG. 1. A speed instruction implementing section 20 implements a speed instruction pattern and outputs a speed instruction in accordance with the pattern. A speed detecting section 21 detects the speed of the electric motor 2 and outputs it as ωM. A servo controller 22 carries out digital control. The servo controller 22 takes in a speed instruction coming from the speed instruction implementing section 20 and an electric motor speed ωM from the speed detecting section 21 once every fixed cycle, carries out calculations and controls the current I of the electric motor 2. A speed instruction inputting section 23 inputs a speed instruction coming from the speed instruction implementing section 20, converts it to a unit system suitable for internal calculations of the servo controller 22, and outputs it as the speed instruction ω*. The prefilter section 8 (which has the transmission function in FIG. 5) inputs a speed instruction ω* and outputs an electric motor speed instruction ωM*. The prefilter section 8 extracts the vibration frequency of the control object 3, which is detected by the vibration detecting section 5, and defines parameters of the transmission function of a filter on the basis of the vibration frequency. The instruction follow-up controlling section 24 controls so that the electric motor speed ωM follows up the electric motor speed instruction ωM*. A position detecting section may be provided instead of the speed detecting section 21. In this case, the electric motor speed ωM is calculated by differentiating the position information of the electric motor 2, which is detected by the position detecting section in the servo controller 22. The prefilter section 8 of FIG. 9 may be disposed in the speed instruction implementing section 20.

In the speed controlling apparatus of FIG. 9, it is possible to suppress the vibrations of an electric motor and control object, which result from that the rigidity of the control object or a coupling shaft connecting the electric motor and the control object together is low. The speed controlling apparatus always automatically controls an electric motor adequately without depending on the instruction pattern and characteristics of the control object, and the speed controlling apparatus can automatically prevent the torque instruction from becoming an excessive value. By automatically setting all the parameters of the prefilter section 8 of FIG. 9, the maneuverability of the controlling apparatus can be improved.

The filter section 9 of FIG. 1 may be constructed in a configuration other than the configuration of FIG. 5. It is sufficient that, as shown in FIG. 4(a), the configuration is constructed so that it includes characteristics of lowering the gain in the prescribed frequency ωa (preferably, the vicinity of the anti-resonance frequency fr×2π of the control object 3) or the frequency in the vicinity thereof, and characteristics of suppressing the gain in a high range.

Where the control object position θL of FIG. 1 vibrates at a plurality of vibration frequencies, the filter section 9 is caused to have characteristics of lowering the gains of the plurality of vibration frequencies and frequencies in the vicinity thereof, and suppressing the gain in a high range.

In the flowchart of FIG. 2, the process of taking in the quantity of state in Step S2 may be carried out at any timing from the commencement until before Step S5.

The electric motor is not limited to any specified type. The electric motor may be a DC electric motor, a permanent magnet synchronization electric motor, or an induction motor. The electric motor is not limited to a rotation type motor, but may be a linear motor.

The instruction pattern of the position instruction θ* may not be implemented by the position instruction implementing section 1 but may be implemented by the position instruction inputting section 7 in the servo controller 6. In this case, the position instruction inputting section 7 outputs a position instruction θ once every fixed cycle on the basis of the implemented instruction pattern.

<<Embodiment 2>>

Figure 10:
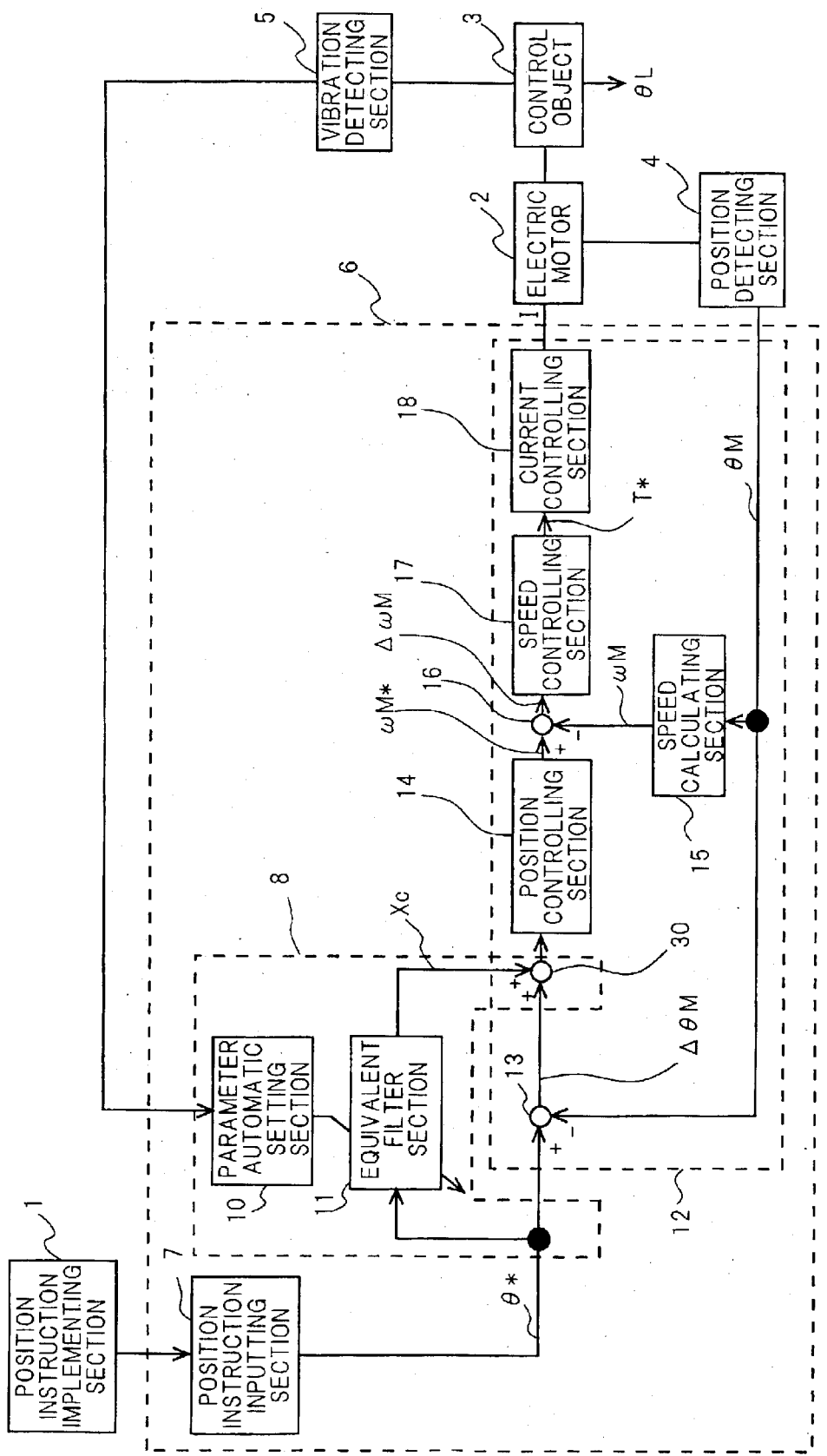
FIG. 10 is a block diagram of control showing a configuration of a method for controlling an electric motor according to Embodiment 2 of the invention.

A description is given of a method for controlling an electric motor and an apparatus for controlling the same according to Embodiment 2 of the invention, using FIG. 10 through FIG. 15. FIG. 10 is a view showing the construction of a control block in the method for controlling an electric motor according to Embodiment 2 of the invention. In FIG. 10, the point that differs from FIG. 1 of Embodiment 1 is the configuration of the prefilter section 8. The prefilter section 8 according to Embodiment 2 includes an equivalent filter section 11 and a compensation value applying section 30 instead of the filter section 9. In FIG. 10, blocks which are identical to those of FIG. 1 have the same roles as those in Embodiment 1.

A description is given of detailed actions of the controlling apparatus of FIG. 10. Since the position instruction implementing section 1 and position detecting section 4 are identical to those of Embodiment 1, the description thereof is omitted. The servo controller 6 carries out digital control.

The servo controller 6 inputs a position instruction coming from the position instruction implementing section 1 and an electric motor position θM coming from the position detecting section 4 once every fixed cycle, carries out a calculation process, and controls the current I of the electric motor 2.

Figure 11:
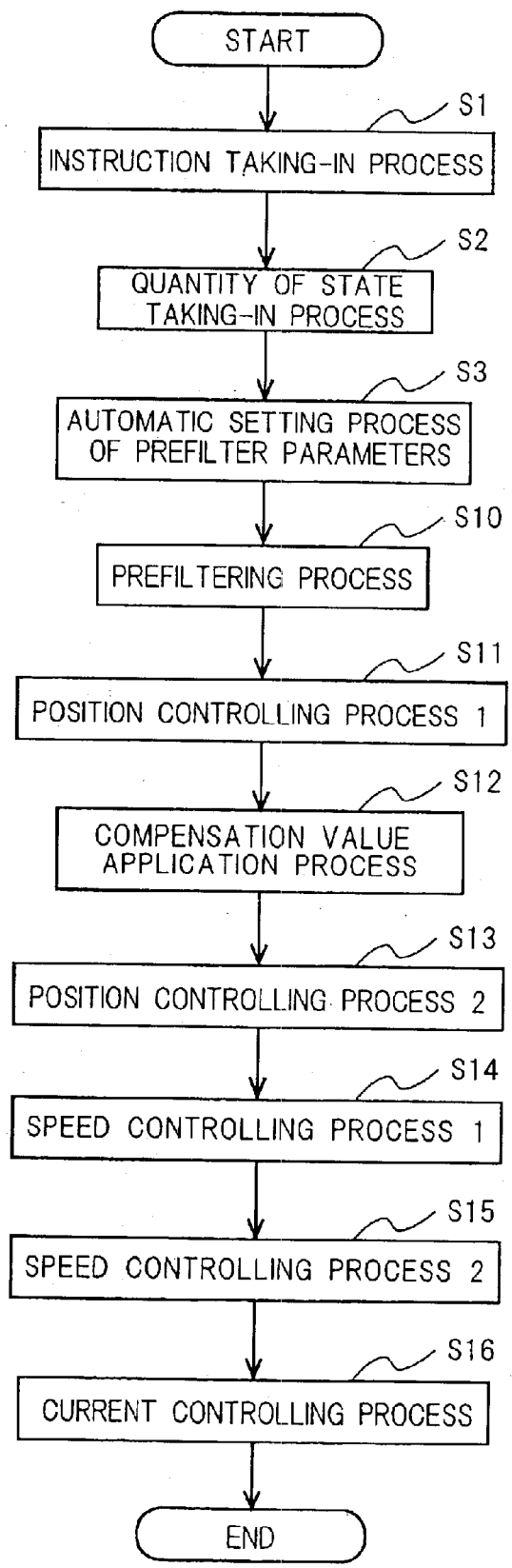
FIG. 11 is a flowchart in Embodiment 2 according to the invention.

FIG. 11 shows a flowchart of a calculation process for one cycle, which is carried out by the servo controller 6. The servo controller 6 repeats a calculation process shown in FIG. 11 once every fixed calculation cycle (for example, 166 μs). A description is given of the process shown in FIG. 11 with reference to FIG. 10 through FIG. 12. In FIG. 11, steps having the same reference numbers as those of FIG. 2 carry out the same process as that in Embodiment 1. Steps S1 through S3 in FIG. 11 carry out the same processes as those in Steps S1 through S3 in FIG. 2. Herein, description thereof is omitted.

The equivalent filter section 11 inputs a position instruction θ* and outputs a compensation value Xc (prefiltering process in Step S10). FIG. 12 shows a transmission function of the equivalent filter section 11, using a Laplacian (a Laplace operator) s. Actually, the transmission function shown in FIG. 12 is converted to a digital filter that is transformed by a method such as a bilinear transformation, and the equivalent filter section 11 carries out a calculation as a digital filter. The digital filter inputs a position instruction θ* outputted by Step S1 and outputs a compensation value Xc. The reason why the configuration of the equivalent filter section 11 is made as in FIG. 12 will be described later.

The position deviation calculating section (differentiator) 13 calculates ΔθM(n)=θ*(n)−θM(n) and outputs an electric motor position deviation ΔθM(n) (Position control process 1 in Step S11). The compensation value applying section (adder) 30 outputs a value that is obtained by adding the output value Xc(n) in Step S10 to the output value ΔθM(n) in Step S11 (Compensation value application process in Step S12). The position controlling section 14 outputs an electric motor speed instruction ωM*(n) that is a value obtained by multiplying the position proportional gain Kpp by the output value (ΔθM(n)+Xc(n)) in Step S12 (Position Controlling Process 2 in Step S13).

The speed deviation calculating section (differentiator) 16 outputs a value ΔωM(n)=ωM*(n)−θM(n) that is obtained by subtracting the electric motor position θM(n) taken in Step S2 from the output value (output value of the position controlling section 14) in Step S13. The speed controlling section 17 carries out a proportional integration calculation of Expressions (3) and (4), using the output value ΔωM(n) in Step S14, and outputs the torque instruction T*(n) (Speed controlling process 2 in Step S15). The current controlling section 18 controls so that the current I with respect to the output value T*(n) in Step S15 flows into the electric motor 2 (Current controlling process in Step S16). The above description is a calculation process equivalent to one cycle of the internal calculations of the servo controller 6 shown in the flowchart of FIG. 11.

The reason why the configuration of the equivalent filter section 11 is made as in FIG. 12 will be described below. The transmission function of the filter section 9 according to Embodiment 1 of FIG. 1 is Expression (6) (FIG. 5).

$$\{(1/\omega a^2)\cdot s^2+1\}/\{(1/\omega f^2)\cdot s^2+2\zeta/\omega f\cdot s+1\} \quad (6)$$

Expression (7) is acquired by converting the expression (6).

$$1+[\{(1/\omega a^2-1/\omega f^2)\cdot s^2-(2\zeta/\omega f)\cdot s\}/\{(1/\omega f^2)\cdot s^2+(2\zeta/\omega f)\cdot s+1\}] \quad (7)$$

Figure 13:
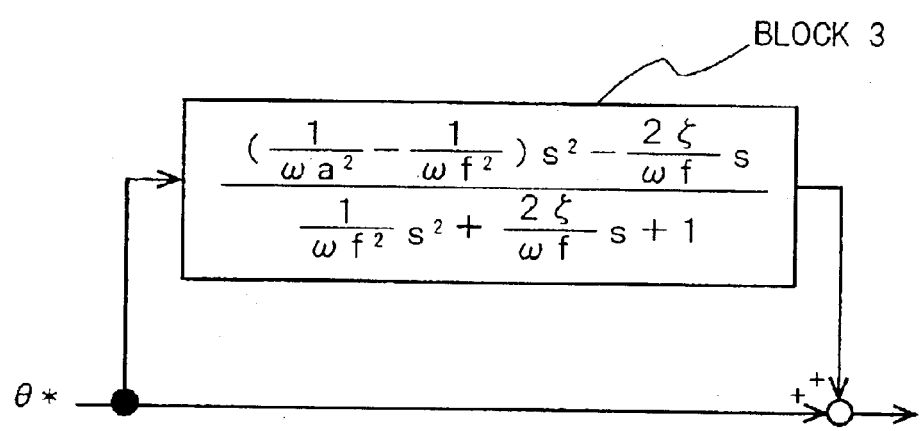
FIG. 13 is a configurational view in which the filter section 9 in Embodiment 1 according to the invention is equivalently converted.
Figure 14:
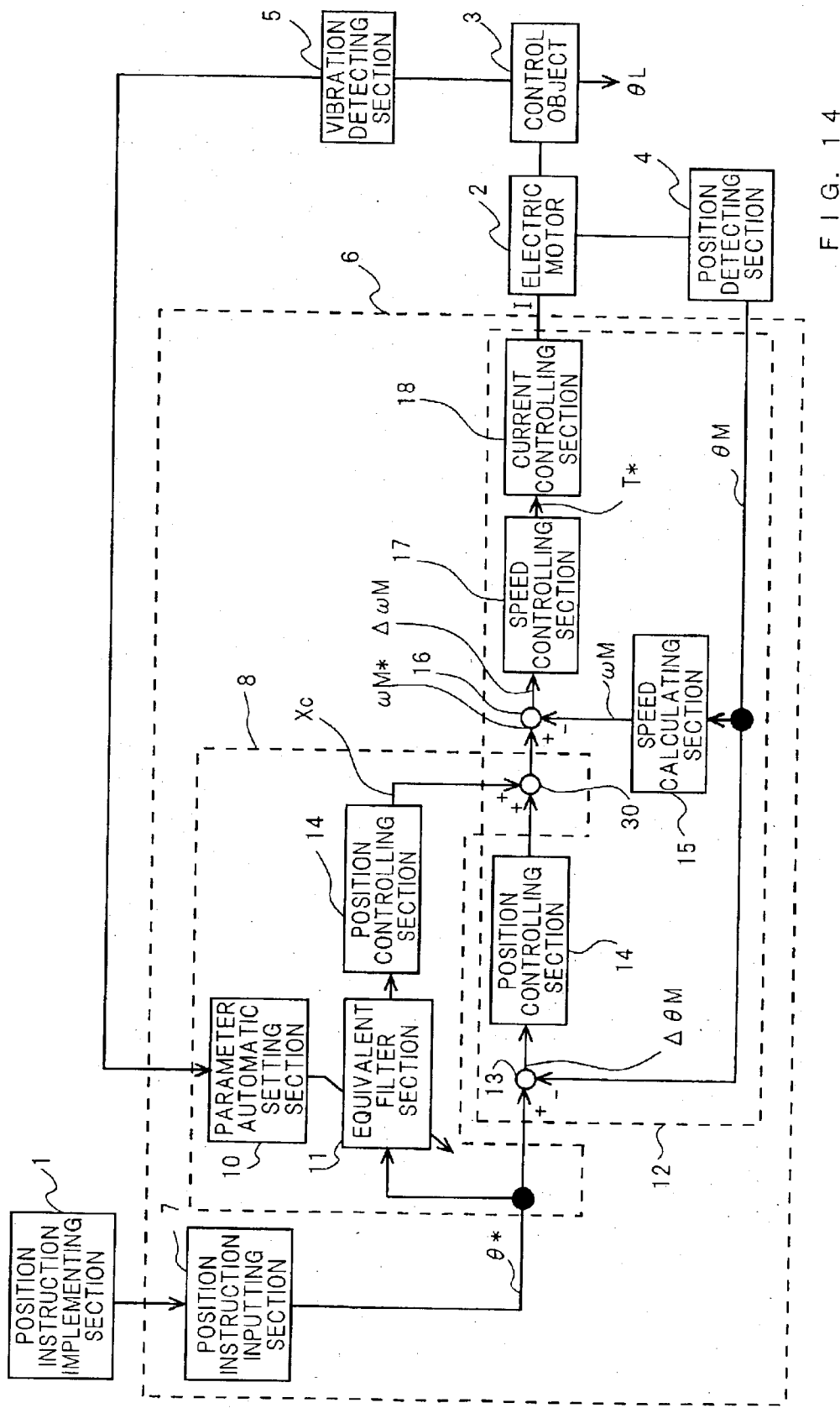
FIG. 14 is a configurational view equivalent to FIG. 10 in Embodiment 2 according to the invention.
Figure 15:
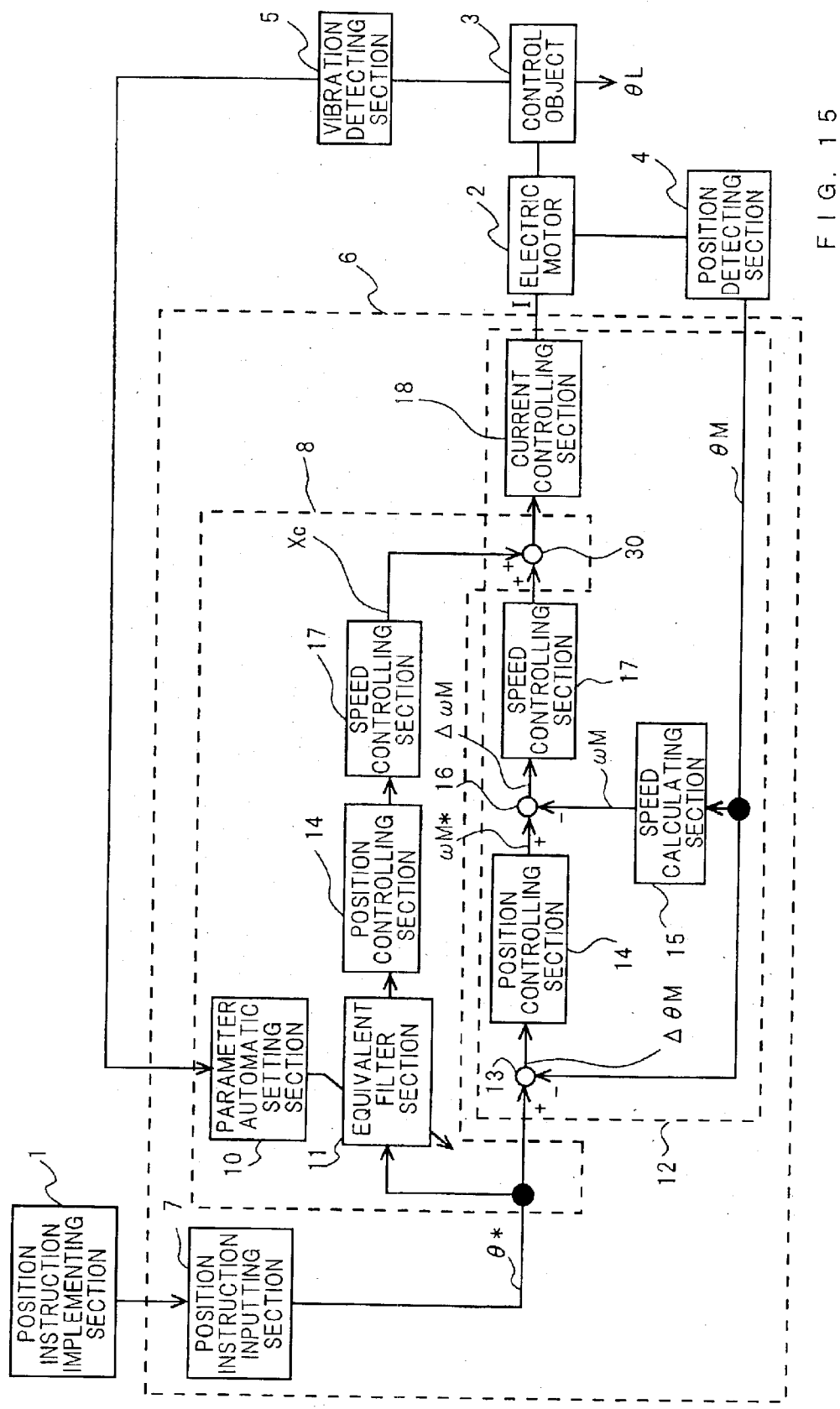
FIG. 15 is a configurational view equivalent to FIG. 10 in Embodiment 2 according to the invention.

Based thereon, FIG. 13 is obtained by equivalently converting FIG. 5. The block 3 of FIG. 13 is equivalent to FIG. 12. Therefore, the configuration of Embodiment 1 of FIG. 1 is equivalent to the configuration of the present embodiment of FIG. 10. Embodiment 2 is equivalent to Embodiment 1, wherein the same effects can be brought about.

In Embodiment 2, in comparison with Embodiment 1, the convergence value of θM does not shift from the convergence value of the position instruction θ*. In Embodiment 2, the compensation value Xc of the prefilter section 8 is added to the electric motor position deviation ΔθM in the subsequent compensation value applying section 30 of the position deviation calculation section 13. The position deviation calculation section 13 carries out a calculation of ΔθM=θ*−θM. The instruction follow-up controlling section 12 controls so that the electric motor position deviation ΔθM becomes 0. Since the controlling apparatus controls the electric motor position θM while using the position instruction θ* as a target value as it is, the convergence value (stop position) of the position instruction θ* is made coincident with the convergence value of the electric motor position θM. Accordingly, in the present embodiment, the convergence value of θM does not shift from that of position instruction θ*.

In Embodiment 1 of FIG. 1, the position deviation calculating section (subtractor) 13 carries out a calculation of ΔθM=θM*−θM. The instruction follow-up controlling section 12 controls so that the motor position deviation ΔθM becomes 0. There may be a case where the convergence value (Stop position) of the motor position instruction θM* differs from the convergence value of the position instruction θ* due to cancellation of significant digits, which arises in the calculation of the filter section 9 of FIG. 1.

Since the convergence value of the position instruction θ* is different from that of the motor position θM, the convergence value of θM shifts from the convergence value of the position instruction θ*. In Embodiment 1, it was necessary to carry out a process of compensating the shift in order to make the convergence value of the position instruction θ* coincident with the convergence value of the motor position instruction θM* at all times. However, in Embodiment 2, no process of compensating the shift is required.

Based on the above description, Embodiment 2 can bring about the effects equivalent to those of Embodiment 1. The controlling method and controlling apparatus according to Embodiment 2 suppress vibrations of the electric motor 2 and control object 3, which result from a low rigidity of the control object or the coupling shaft between the electric motor and control object. The controlling method and controlling apparatus according to Embodiment 2 automatically suppress the vibrations of the electric motor and control object at all times without depending on the characteristics of the instruction pattern or the control object. The torque instruction T* is automatically prevented from becoming an excessive value. By automatically setting all the parameters of the equivalent filter section 11 of FIG. 10, the maneuverability of the controlling apparatus can be improved. The controlling method and controlling apparatus according to Embodiment 2 adaptively vary the parameters of the filter to reduce the vibrations at all times even if the vibration frequency is changed due to a fluctuation in the characteristics of the control object.

In the present embodiment, by securing a feed-forward configuration by equivalently converting the filter 9 of FIG. 1, no shift arises due to cancellation of significant digits in the calculations. Since no compensation is required for shift, the calculation time by the software can be shortened, and labor required for preparation of software can be reduced, or the shift compensating circuit may be removed, wherein labor required for development of LSIs can be reduced, and the chip area thereof can be made smaller.

The compensation value applying section 30 of FIG. 10 may apply a compensating value to any place in the main signal channel as long as the section 30 is constructed after the position deviation calculation section 13. For example, FIG. 10 may be equivalently converted to FIG. 14 or FIG. 15. The controlling apparatus of FIG. 14 or FIG. 15 can bring about the same effects as those of FIG. 10. In the flowchart (controlling method) of the controlling apparatus of FIG. 14, processes of the equivalent filter section 11 and the position controlling section 14 are carried out in Step S10 of FIG. 11 to calculate, and the compensating value Xc, and step S12 (compensating value application process) in FIG. 11 is carried out between Step S13 and Step S14. In the flow chart (controlling method) of the controlling apparatus in FIG. 15, processes of the equivalent filter section 11, position controlling section 14 and speed controlling section 17 are carried out in Step S10 in FIG. 11 to calculate the compensating value Xc. And, Step S12 (compensating value application process) in FIG. 11 is carried out between Step S15 and Step S16.

In the embodiment, the configuration of FIG. 5 is equivalently converted to FIG. 13 by Expression (7). In the invention, the transmission function is not limited to the transmission function shown in FIG. 5. An optional transmission function may be used, which includes characteristics of lowering the gain of a prescribed frequency as in FIG. 4(a) and frequencies in the vicinity thereof and characteristics of suppressing the gain in a high range. As in the case of Expression (7), such a transmission function is equivalently converted in the form of 1+Ge(s), and the Ge(s) can be made into the feed-forward configuration, whereby effects similar to those of the embodiment can be brought about.

The process for automatically setting the prefilter parameters in Step S3 in FIG. 11 may be carried out at any time as long as it is terminated before the prefilter process in Step S10. The prefilter process in Step S10 may be carried out at any optional time as long as it is finished before the compensating value application process in Step S12.

As long as the instruction follow-up controlling section 12 of FIG. 10 controls so that the motor position θM follows up the position instruction θ*, any other configuration the instruction follow-up controlling section 12 of FIG. 10 can bring about effects similar to those of the present embodiment.

The prefilter section 8 of FIG. 10 may be disposed in the position instruction implementing section 1.

In the embodiment, although a description was given of the position controlling system, the invention may be applicable to the speed control system as in the description of Embodiment 1. In this case, the prefilter section may be disposed in the speed instruction implementing section that implements a speed instruction pattern and outputs a speed instruction.

If the transmission function of the equivalent filter section 11 is made into Ge(s) in a case where the control object position θL of FIG. 10 vibrates with a plurality of vibration frequencies, the transmission function 1+Ge(s) is rendered to include characteristics of lowering the gain in a plurality of vibration frequencies and frequencies in the vicinity thereof and suppressing the gain in a high range.

In the flowchart of FIG. 11, the process in Step S2 may be carried out at any timing from commencement to Step S11.

The electric motor is not limited to a certain specified type. That is, the electric motor may be a DC motor, a permanent type synchronization motor, or an induction motor. Also, the motor is not limited to a rotation type motor, but it may be a linear motor.

The instruction pattern of the position instruction θ* may not be implemented by the position instruction implementing section 1 but by the position instruction inputting section 7 in the servo controller 6. In this case, the position instruction inputting section 7 outputs a position instruction θ* once every fixed cycle on the basis of the implemented instruction pattern.

<<Embodiment 3>>

Figure 16:
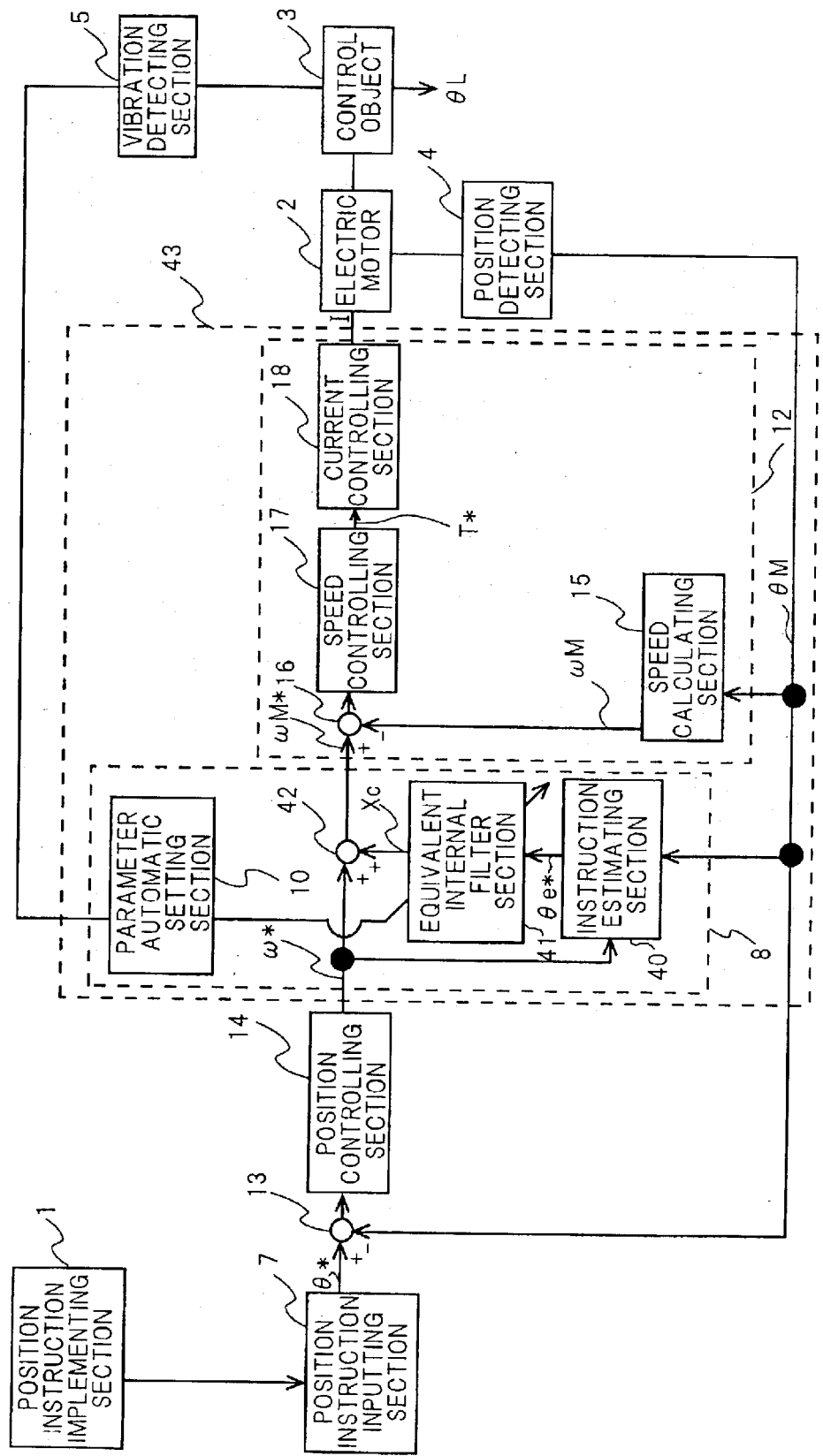
FIG. 16 is a block diagram of control showing a configuration of a method for controlling an electric motor according to Embodiment 3 of the invention.

A description is given of a method for controlling an electric motor and an apparatus for controlling the same according to Embodiment 3 of the invention, using FIG. 16 through FIG. 21. FIG. 16 is a block diagram showing the configuration of an apparatus for controlling an electric motor according to Embodiment 3 of the invention. In FIG. 16, the point that differs from FIG. 1 showing Embodiment 1 resides in the configuration of the prefilter section 8. The prefilter section 8 according to Embodiment 3 includes an instruction estimating section 40, an equivalent internal filter section 41, and a compensating value applying section (Adder) 42 instead of the filter section 9. Further, the position instruction inputting section 7, position deviation calculating section 13, and position controlling section 14 are constructed outside the servo controller 43. These blocks that are disposed outside the servo controller 43 may be provided with, for example, the existing LSIs or the existing software whose processing contents are not disclosed. The processes in these blocks cannot be varied, and only specified signals of output signals of the blocks can be read (that is, can be utilized in the controlling method and controlling apparatus according to the invention). These points are different from the configuration shown in FIG. 1. In FIG. 16, blocks having the same reference numbers as those of FIG. 1 take the same roles as those in Embodiment 1.

A detailed description is given of the controlling apparatus shown in FIG. 16. The position instruction implementing section 1 and position detecting section 4 are identical to those in Embodiment 1, wherein the description thereof is omitted. Also, the position instruction inputting section 7, position deviation calculating section 13, and position controlling section 14 have the same roles as those in Embodiment 1, wherein description thereof is omitted. However, different from Embodiment 1 these components are provided outside the servo controller 43. The actions of the blocks cannot be varied. The servo controller 43 inputs only a speed instruction ω* that is outputted by the position controlling section 14. The servo controller 43 cannot input any information (for example, a position instruction θ*) other than the speed instruction ω* from the upper rank.

Figure 17:
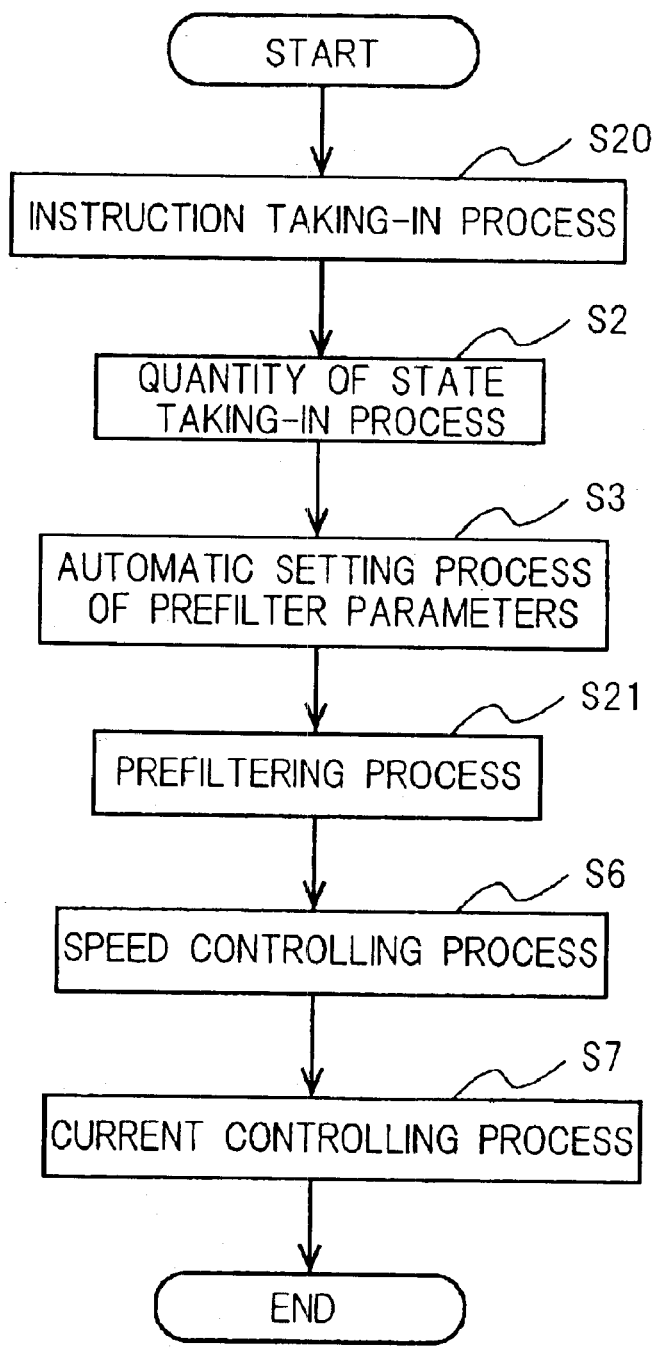
FIG. 17 is a flowchart in Embodiment 3 according to the invention.

The servo controller 43 carries out digital control. The servo controller 43 takes in a speed instruction ω* from the position controlling section 14 and an electric motor position θM coming from the position detecting section 4 once every fixed cycle, carries out a calculation process, and controls the current I of the electric motor 2. FIG. 17 shows a flowchart of a calculation process of one cycle, which is carried out by the servo controller 43. The servo controller 43 repeats the calculation process shown in FIG. 17 once every fixed calculation cycle (for example, 166 μs). A description is given of the process of FIG. 17, using FIG. 16 through FIG. 18. In steps whose numbers are the same as those of FIG. 2, the same processes as those of FIG. 2 are carried out.

The servo controller 43 takes in a speed instruction ω that is outputted by the position controlling section 14, and makes it into ω*(n) (instruction take in process in Step S20). Since Step S2 and Step S3 are the same as those in Embodiment 1, the description thereof is omitted. The instruction estimating section 40, equivalent internal filter section 41 and compensating value applying section 42 carry out a calculation, and apply a compensating value Xc to the speed instruction ω* (prefiltering process in Step S21).

The instruction estimating section 40 estimates and calculates an estimation position instruction θe*, using the following expression (8), on the basis of the speed instruction ω* and the motor position θM.

$$\theta e(n)=\omega^*(n)/Kpp+\theta M(n) \tag{8}$$

Figure 18:
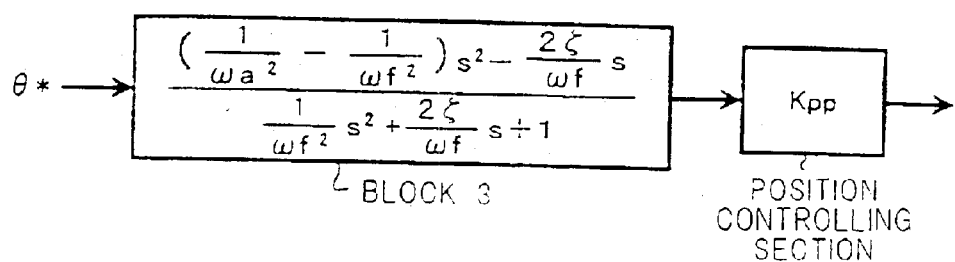
FIG. 18 is a configurational view of an equivalent internal filter section 41 in Embodiment 3 according to the invention.
Figure 19:
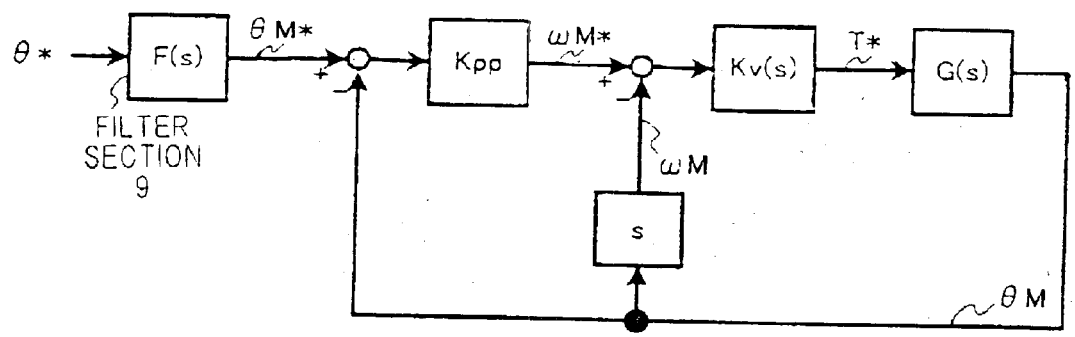
FIG. 19 is a block diagram expressing the configuration of FIG. 1 in Embodiment 1 according to the invention, using a Laplacian (Laplace operator).

FIG. 18 shows a transmission function of the internal block of the equivalent internal filter section 41. The transmission function has the same configuration as in the block 3 of FIG. 13, that is, the configuration obtained by multiplying the configuration of the second term, which is obtained by equivalently converting the prefilter 9 of FIG. 1 using Expression (7), by the proportional gain Kpp of the position controlling section. Actually, the transmission function of FIG. 18 is converted to a digital filter transformed by a method of bilinear transformation, etc., and the equivalent internal filter section 41 carries out a calculation as a digital filter. The digital filter inputs an estimation position instruction θe* calculated by Expression (8) and outputs the compensating value Xc. FIG. 18 operates based on the same principle as that in Embodiment 2 (FIG. 14), excepting a difference in whether the input is a position instruction θ* or an estimation position instruction θe*. By the configuration of FIG. 18, a vibration suppressing effect similar to that of Embodiment 2 can be obtained. The compensating value applying section (Adder) 42 adds the speed instruction ω* to the compensating value Xc outputted by the equivalent internal filter section 41, and outputs it as ωM*. The reason why the configuration of the equivalent internal filter section 41 is made as in FIG. 18 will be described later.

Since Step S6 and Step S7 are the same as those in Embodiment 1, description thereof is omitted. The above description is a calculation process of one cycle of the servo controller 43, which is shown in the flowchart of FIG. 17.

Figure 20:
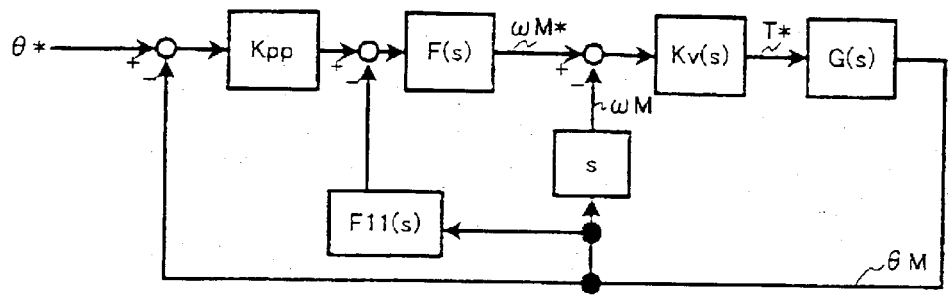
FIG. 20 is a configurational view equivalent to FIG. 19 in Embodiment 3 according to the, invention.
Figure 20:
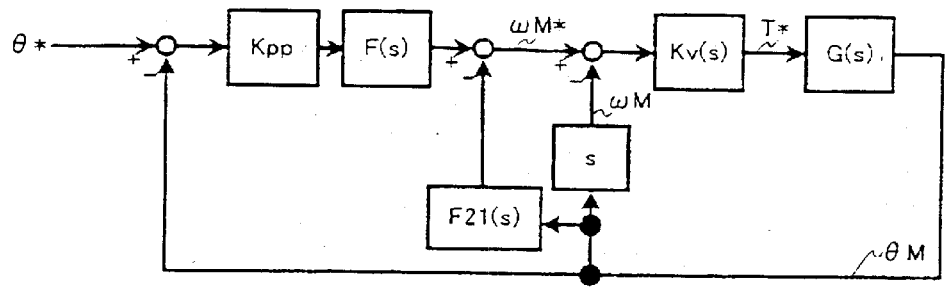
Figure 20:
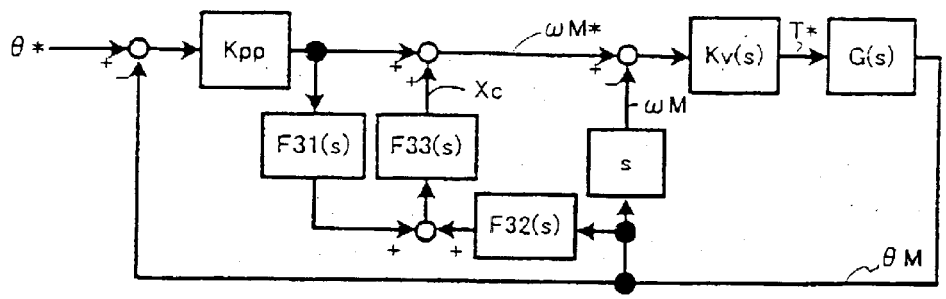

The reason why the equivalent internal filter section 41 is configured as in FIG. 18 is described below. The configuration of Embodiment 1 of FIG. 1 is shown by a block diagram using a Laplacian (Laplace operator) in FIG. 19. Reference symbol F of FIG. 19 denotes Expression (6) expressing the transmission function of the filter section 9, G(s) denotes the transmission function of the electric motor 102 of FIG. 29 regarding transmission from the torque instruction T* to the electric motor position θM, and s denotes a Laplacian (Laplace operator). FIG. 20 is a block diagram obtained by equivalently converting FIG. 19. In FIG. 20, reference symbols F11, F21, F31, F32 and F33 denote Expressions (9) through (13), respectively.

$$F11(s)=Kpp\cdot\{(1/\omega f^2-1/\omega a^2)\cdot s^2+(2\zeta/\omega f)\cdot s\}/\{(1/\omega a^2)\cdot s^2+1\} \tag{9}$$

$$F21(s)=Kpp\cdot\{(1/\omega f^2-1/\omega a^2)\cdot s^2+(2\zeta/\omega f)\cdot s\}/\{(1/\omega f^2)\cdot s^2+(2\zeta/\omega f)\cdot s+1\} \tag{10}$$

$$F31(s)=1/Kpp \tag{11}$$

$$F32(s)=1 \tag{12}$$

$$F33(s)=Kpp\cdot\{(1/\omega a^2-1/\omega f^2)\cdot s^2-(2\zeta/\omega f)\cdot s\}/\{(1/\omega f^2)\cdot s^2+(2\zeta/\omega f)\cdot s+1\} \tag{13}$$

Since, in FIG. 20(*a*), block F11 has a gain peak in the frequency characteristics, the control system is liable to become unstable when being packaged (For example, the output signal of Block F11 is limited, where the control made by the controlling apparatus becomes unstable). In FIG. 20(*b*), block F(s) enters the position control loop in series. Since the block F(s) eliminates feedback information in a high range, the response performance of the controlling apparatus is lowered.

FIG. 20(*c*) shows the configuration of the present embodiment. In the configuration shown in FIG. 20(*c*), since there is no block having a gain peak as in FIG. 20(*a*), stability of the control system can be secured when being packaged. Also, since the compensating amount Xc of suppressing vibrations can be calculated independently from the feedback information, the response performance of the position control loop is not lowered as in FIG. 20(*b*).

Even where the degree of freedom in varying the configuration of the instruction implementing section and control block is limited as in Embodiment 3 (for example, where the internal block of the existing LSI is used as it is and no specification can be changed with respect to the block), it is possible to obtain an effect of suppressing vibrations without spoiling the stability and response performance of the control system by the configuration of FIG. 20(*c*) obtained by equivalently converting the prefilter 8 of FIG. 1.

Based on the above description, the present embodiment can suppress vibrations of the electric motor 2 and control object 3, which result from a low rigidity of the control object or the coupling shaft between the electric motor and control object. The controlling method and controlling apparatus according to Embodiment 2 automatically suppress the vibrations of the electric motor and control object at all times without depending on the instruction pattern or the characteristics of the control object 3. The torque instruction T* is automatically prevented from becoming an excessive value. By automatically setting all the parameters of the prefilter section 8 in FIG. 16, the maneuverability of the controlling apparatus is improved. The controlling method and controlling apparatus according to Embodiment 3 adaptively vary the values of the parameters to reduce the vibrations at all times even if the vibration frequency is changed due to a fluctuation in the characteristics of the control object.

In the embodiment, a shift due to cancellation of significant digits can be prevented by securing the internal configuration type by equivalently converting the filter 9 in FIG. 1, wherein since it is not necessary to compensate the shift, the calculation time made by the software can be shortened, and labor required for preparation of software can be reduced, or since no circuit for compensating the shift is required, labor required for development of LSI can be reduced, and the chip area of the LSI can be made smaller.

According to the invention, even where there is a limit in the degree of freedom with respect to variation of the configuration of the instruction implementing section and control block, an effect of suppressing vibrations can be obtained without spoiling the stability and response performance of the control system.

Figure 21:
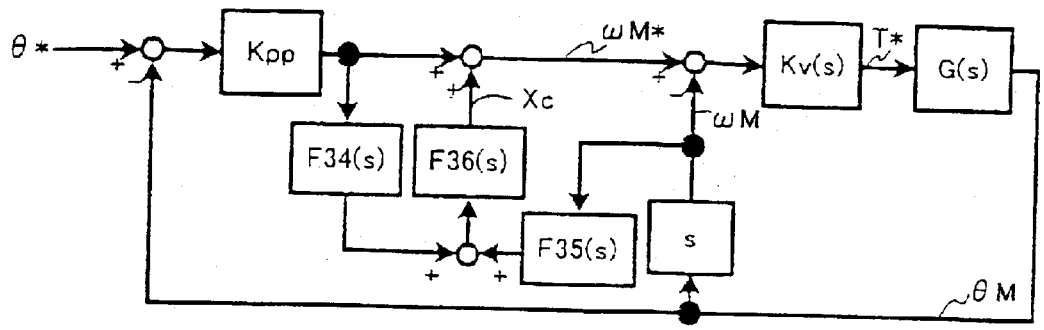
FIG. 21 is a configurational view equivalent to FIG. 20($c$) in Embodiment 3 according to the invention.
Figure 21:
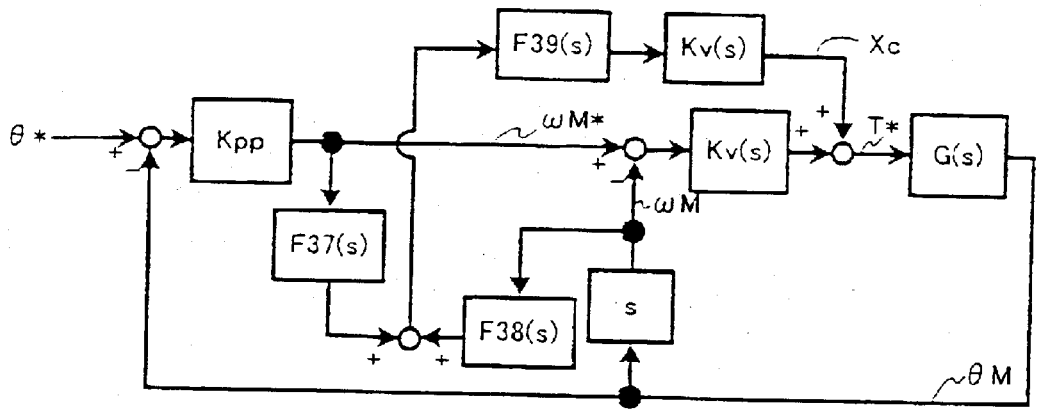
Figure 21:
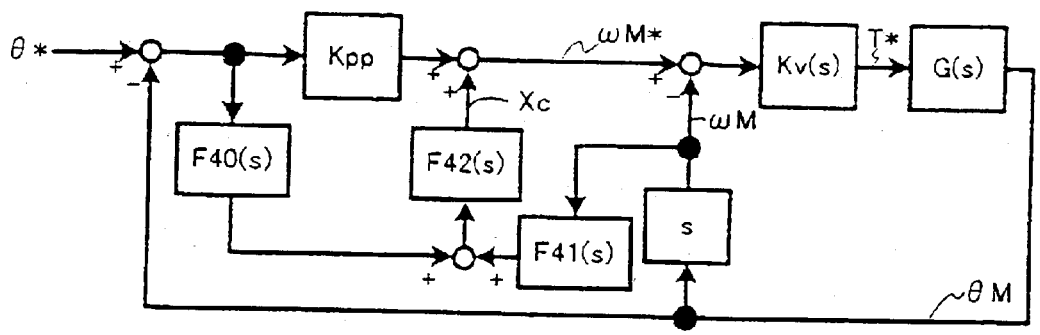

In FIG. 20(*c*), the estimation instruction θ e* may be calculated from the motor speed ωM as in FIG. 21(*a*). As long as the type can calculate the compensating value Xc independently from the stability and response performance of the feedback loop itself, FIG. 20(*c*) may be equivalently converted. For example, FIG. 20(*c*) may be equivalently converted as in FIG. 21(*b*) and FIG. 21(*c*). In this case, reference symbols F34, F35 and F36 are made into Expressions (14) through (16).

$$F34(s)=1/Kpp\cdot s \tag{14}$$

$$F35(s)=1 \tag{15}$$

$$F36(s)=Kpp\cdot\{(1/\omega a^2-1/\omega f^2)\cdot s-2\zeta/\omega f\}/\{(1/\omega f^2)\cdot s^2+(2\zeta/\omega f)\cdot s+1\} \tag{16}$$

As long as the configurations in FIG. 20(c) and FIG. 21 are not changed, Expressions F31, F32, F33 and F34, F35, F36 may be equivalently converted to other expressions. For example, F34, F35 and F36 may be equivalently converted to Expressions (17) through (19).

$$F34(s)=s \quad (17)$$

$$F35(s)=Kpp \quad (18)$$

$$F36(s)=\{(1/\omega a^2-1/\omega f^2)\cdot s-2\zeta/\omega f\}/\{(1/\omega f^2)\cdot s^2+(2\zeta/\omega f)\cdot s+1\} \quad (19)$$

The configuration of the filter section 9 in FIG. 1 before being equivalently converted to FIG. 20 and FIG. 21 is not limited to the configuration of Expression (6). It may have an optional configuration including the characteristics of lowering the gain of a prescribed frequency as in FIG. 4(a) and frequencies in the vicinity thereof and characteristics of suppressing the gain in a high range.

Where the control object position θL in FIG. 16 vibrates with a plurality of vibration frequencies, the filter section 9 has characteristics of lowering the gain in the plurality of frequencies and frequencies in the vicinity thereof and suppressing the gain in a high range.

The electric motor is not limited to a certain specified type. The electric motor may be a DC motor, a permanent magnet synchronization motor, or an induction motor. The electric motor is not limited to a rotation type motor, but may be a linear motor.

<<Embodiment 4>>

Figure 22:
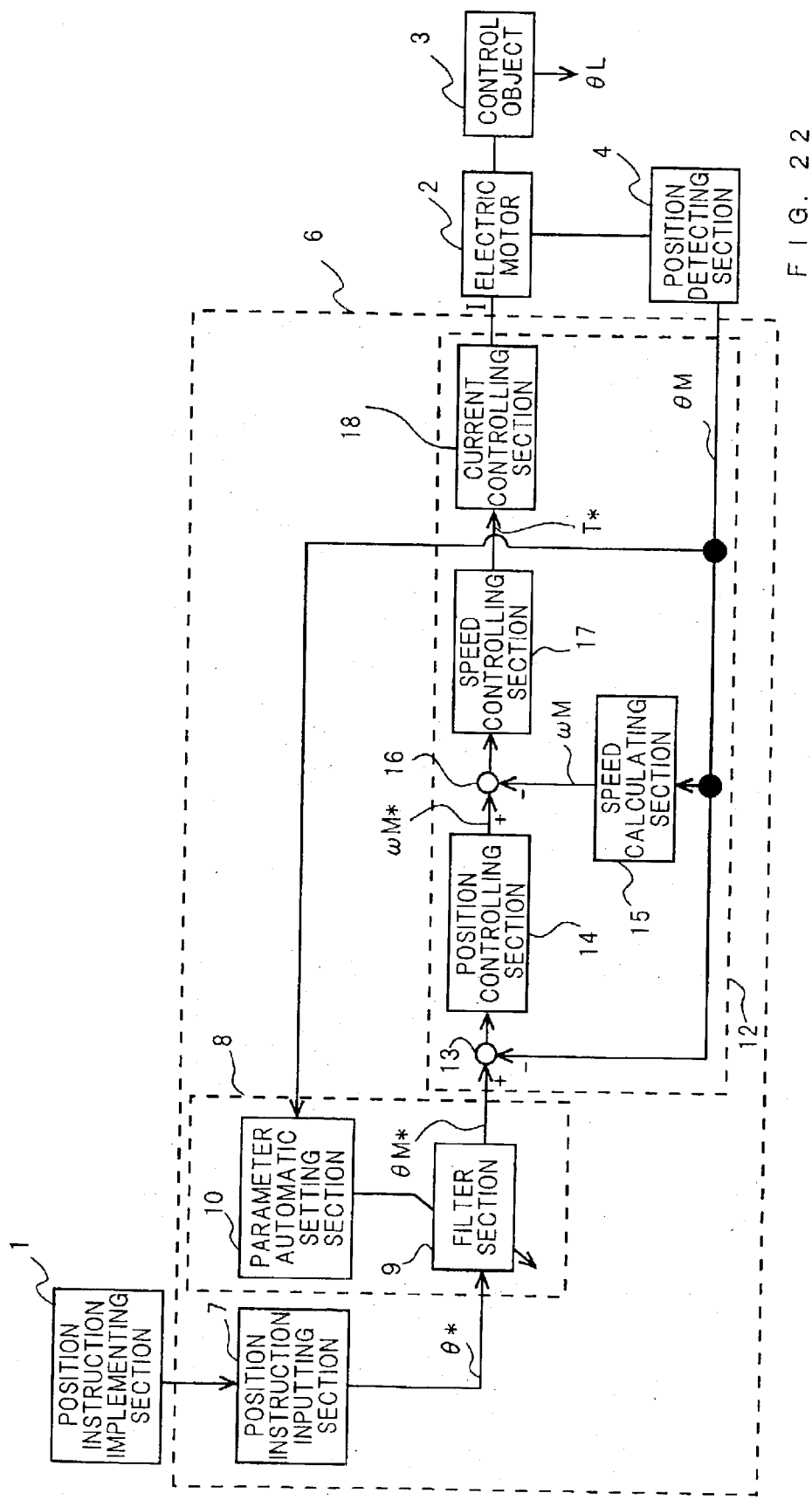
FIG. 22 is a block diagram of control showing a configuration of a method for controlling an electric motor according to Embodiment 4 of the invention.
Figure 23:
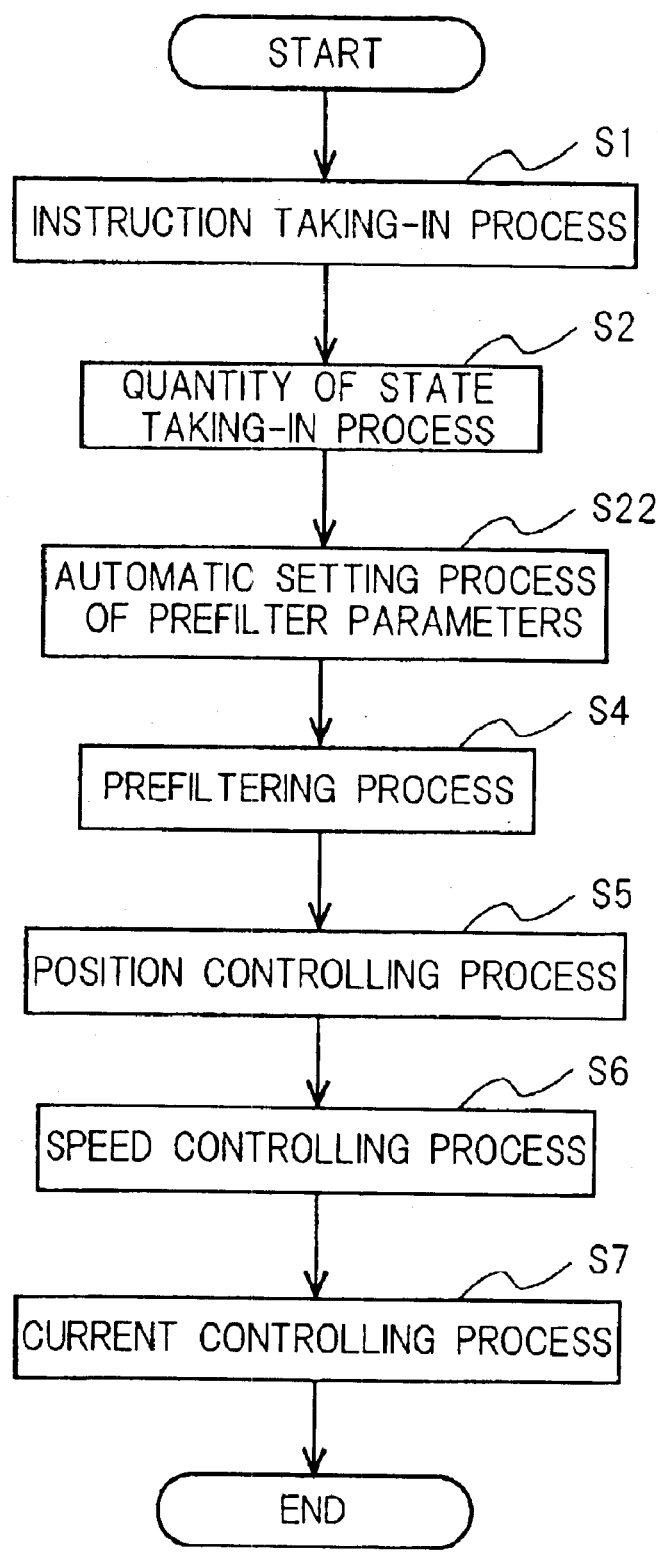
FIG. 23 is a flowchart in Embodiment 4 according to the invention.

A description is given of a method for controlling an electric motor and an apparatus for controlling the same according to Embodiment 4 of the invention, using FIG. 22 and FIG. 23. FIG. 22 is a block diagram showing the configuration of a controlling apparatus of Embodiment 4 according to the invention.

A description is given of the points at which the present embodiment differs from Embodiment 1 of FIG. 1. In the controlling apparatus according to the present embodiment of FIG. 22, the method by which the parameter automatic setting section 10 calculates the vibration frequency ωa of the control object (load) 3 is different from Embodiment 1 (FIG. 1). The controlling apparatus according to the embodiment does not include the vibration detecting section 5 (FIG. 1). The parameter automatic setting section 10 acquires ω a on the basis of the motor position θM. That is, Embodiment 4 is different from Embodiment 1 at this point. Since the controlling apparatus according to the present embodiment does not require the vibration detecting section 5 of FIG. 1, it is more inexpensive than that according to Embodiment 1.

In the embodiment, it is necessary that vibration components of the same frequency as that of the vibration of the control object position θL are detected at the motor position θM. For example, where the inertia of the control object 3 is very small in comparison with the inertia of the electric motor 2, the vibration components of the same frequency as that of the vibration of the control object position θL hardly excite, and no vibration of the control object position θL can be detected from the motor position θM, the configuration of Embodiment 4 cannot be applied thereto. This is because the vibration frequency ωa of the control object position θL cannot be detected from the motor position θM. At this point, Embodiment 4 differs from Embodiment 1, wherein there is a limit in the range of application thereof.

In Embodiment 4, it is assumed that vibration components of the same frequency as that of the vibrations at the control object position θL can be detected by the motor position θM. A description is given of detailed actions of the controlling apparatus of FIG. 22. Since the position instruction implementing section 1 and position detecting section 4 are the same as those in Embodiment 1, description thereof is omitted. The servo controller 6 carries out digital control. The servo controller 6 inputs a position instruction coming from the position instruction implementing section 1 and an electric motor position θM coming from the position detecting section 4 once every fixed cycle, carries out a calculation control and controls the current I of the electric motor 2. FIG. 23 shows a flowchart of a calculation process of one cycle, which is carried out by the servo controller 6. The servo controller 6 repeats the calculation process, shown in FIG. 23, once every fixed calculation cycle (for example 166 μs). A description is given of the process of FIG. 23, using FIG. 22. Since, in FIG. 23, processes other than Step S22 are identical to those in Embodiment 1, description thereof is omitted.

In the process for automatically setting parameters of the prefilter in Step S22, the parameter automatic setting section 10 calculates the vibration frequency ωa of the control object position θL on the basis of the motor position θM detected by the position detecting section 4. The parameter automatic setting section 10 measures an interval of zero cross time of the motor position deviation ΔθM, for example, after a change in the position instruction θ* is terminated, and calculates the vibration frequency of the motor position θM. The ωa may be calculated by using the quantity of state such as the motor speed deviation ΔωM or torque instruction T* in the instruction follow-up controlling section 12 instead of the motor position deviation Δθ. Since the vibration frequency of the motor position θM is theoretically identical to the vibration frequency of the control object position θL, the calculated vibration frequency of the motor position θM is made into the vibration frequency fr of the control object position θL. That is, ωa=2π·fr is established.

The parameter automatic setting section 10 determines ωf on the basis of the calculated ωa. The ωf determines the cut-off frequency of the filter section 9 (FIG. 22) having the characteristics of lowering the gain in a high range. When determining ωf, a table or a calculation expression based on the graph, which determines the relationship between ωa and ωf shown in, for example, FIG. 3, may be used. The ωf may be determined by using a two-dimensional table in which ωa and acceleration of the position instruction θ* are made into arguments. The attenuation coefficient ζ is fixed at 1. Since the role of ωa, role of ωf, the reason ωf is determined by using the ωa and acceleration of the position instruction θ* as arguments, and detailed description of an adequate set value of ζ were described in Embodiment 1, description thereof is omitted herein.

Based on the above description, the present embodiment can suppress vibrations of the electric motor 2 and control object 3, which result from a low rigidity of the control object or the coupling shaft between the electric motor and control object. The controlling method and controlling apparatus according to Embodiment 4 automatically suppress the vibrations of the electric motor and control object at all times without depending on the instruction pattern of the characteristics of the control object 3. The torque instruction T* is automatically prevented from becoming an excessive value. By automatically setting all the parameters of the prefilter section 8, the maneuverability of the controlling apparatus can be improved. The controlling method and controlling apparatus according to Embodiment 4 adaptively vary the parameters of the filter to reduce the vibrations at all times even if the vibration frequency is changed due to a fluctuation in the characteristics of the control object.

Since the controlling method and controlling apparatus according to the present embodiment does not require any vibration detecting section 5 of FIG. 1 in Embodiment 1, Embodiment 4 is more inexpensive than Embodiment 1.

In FIG. 22, as long as the instruction follow-up controlling section 12 controls so that the motor position θM follows up the motor position instruction θM*, any other configuration of the instruction follow-up controlling section 12 may be acceptable. With such a configuration, effects similar to those of the embodiment can be obtained.

Although the description was given of the position controlling system in the embodiment, the invention may be applicable to the speed controlling system as in the description of Embodiment 1. In this case, the prefilter section 8 may be disposed in the speed instruction implementing section that implements a speed instruction pattern and outputs a speed instruction.

As long as the filter 9 of FIG. 22 has the characteristics of lowering the gain in a prescribed frequency ωa as in FIG. 4(a) and frequencies in the vicinity thereof characteristics of suppressing the gain in a high range, the configuration of the filter may be optional.

The prefilter section 8 of FIG. 22 may be disposed in the position instruction implementing section 1.

Where the control object position θL of FIG. 22 vibrates at a plurality of vibration frequencies, the filter section 9 is caused to have characteristics of lowering the gains of the plurality of vibration frequencies and frequencies in the vicinity thereof, and suppressing the gain in a high range.

In the flowchart of FIG. 23, the process in Step S2 may be carried out before Step S1.

The electric motor is not limited to a certain specified type. That is, the electric motor may be a DC motor, a permanent type synchronization motor, or an induction motor. Also, the motor is not limited to a rotation type motor, but it may be a linear motor.

The instruction pattern of the position instruction θ* may not be implemented by the position instruction implementing section 1 but by the position instruction inputting section 7 in the servo controller 6. In this case, the position instruction inputting section 7 outputs a position instruction θ* once every fixed cycle on the basis of the implemented instruction pattern.

<<Embodiment 5>>

Figure 24:
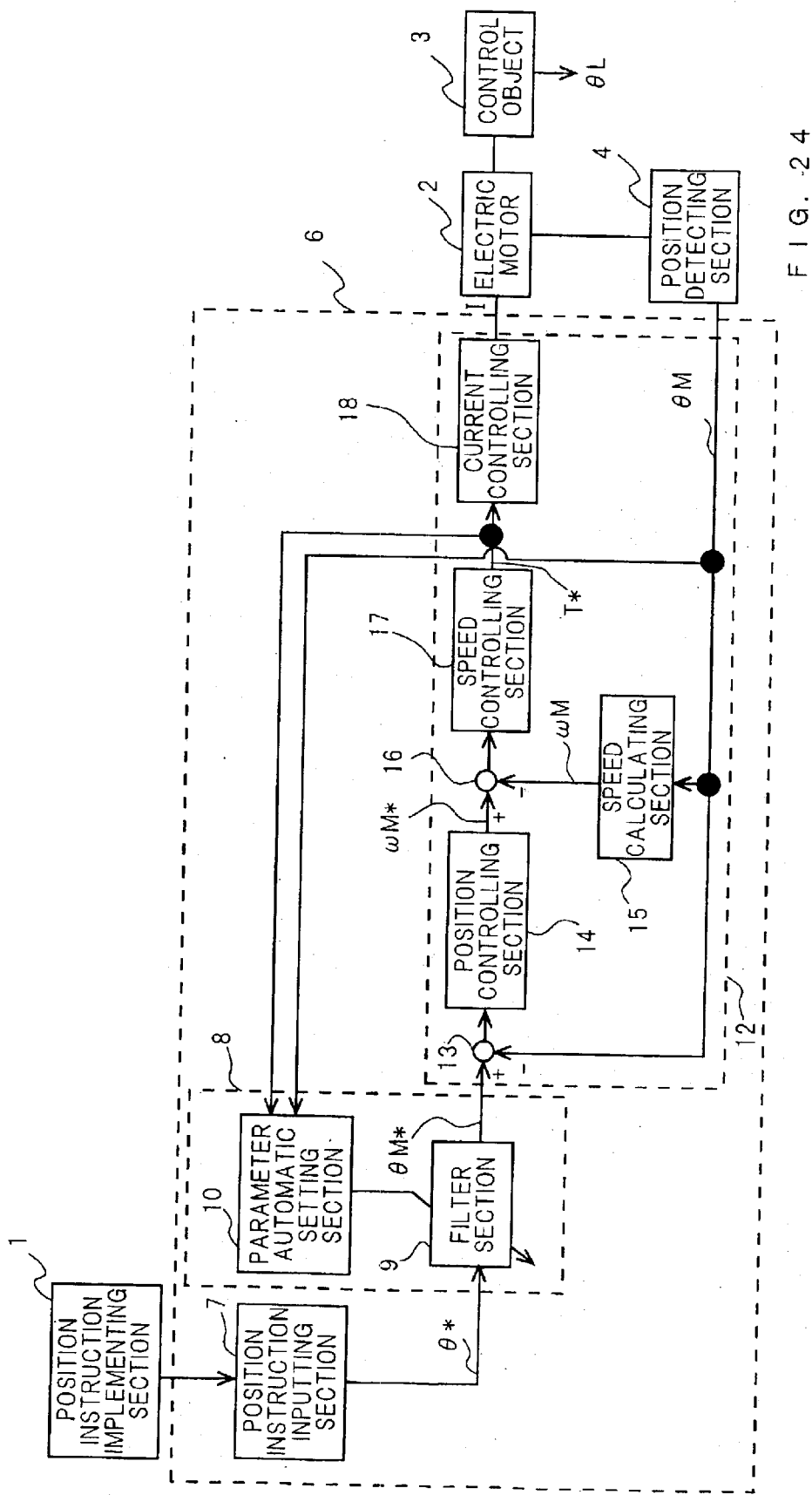
FIG. 24 is a block diagram of control showing a configuration of a method for controlling an electric motor according to Embodiment 5 of the invention.
Figure 25:
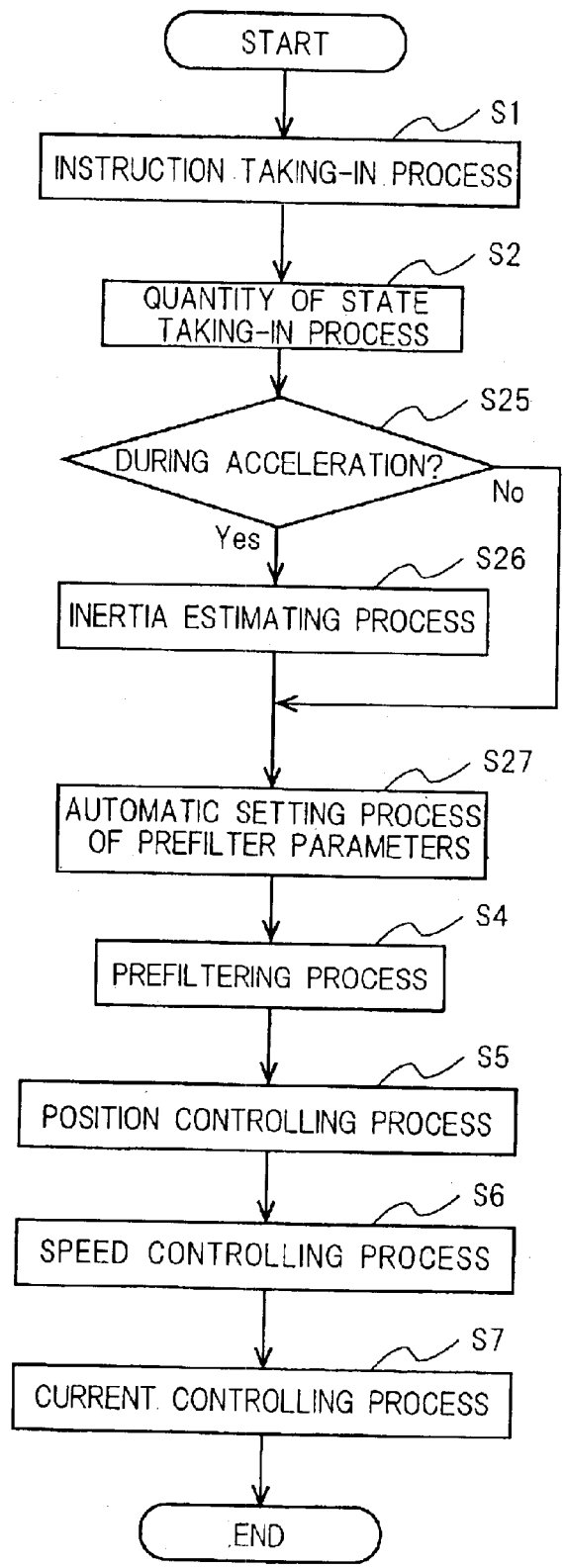
FIG. 25 is a flowchart in Embodiment 5 according to the invention.

A description is given of a method for controlling an electric motor and an apparatus for controlling the same according to Embodiment 5 of the invention, using FIG. 24 and FIG. 25. FIG. 25 is a block diagram showing the configuration of a controlling apparatus of Embodiment 5 according to the invention.

A description is given of the points at which the present embodiment differs from Embodiment 1 of FIG. 1.

In the controlling apparatus according to the present embodiment of FIG. 24, the method by which the parameter automatic setting section 10 calculates the vibration frequency ωa of the control object (load) 3 is different from Embodiment 1 (FIG. 1). The controlling apparatus according to the embodiment does not include the vibration detecting section 5 (FIG. 1). In the embodiment, the parameter automatic setting section 10 acquires a vibration frequency ωa of the control object position θL from the quantity of state used for a calculation in the servo controller 6, using a mathematical expression model of the electric motor 2 and control object 3.

A description is given of detailed actions of the controlling apparatus of FIG. 24. Since the position instruction implementing section 1 and position detecting section 4 are identical to those of Embodiment 1, the description thereof is omitted. The servo controller 6 carries out digital control. The servo controller 6 inputs a position instruction coming from the position instruction implementing section 1 and an electric motor position θM coming from the position detecting section 4 once every fixed cycle, carries out a calculation process and controls the current I of the electric motor 2.

FIG. 25 shows a flowchart of a calculation process of one cycle, which is executed by the servo controller 6. The servo controller 6 repeats the calculation process shown in FIG. 25 once every fixed calculation cycle (for example, 166 μs). A description is given of the process of FIG. 25, using FIG. 24. Since processes other than Steps S25, S26 and S27 are the same as those in Embodiment 1, description thereof is omitted.

In Step S25, the parameter automatic setting section 10 judges whether or not the electric motor 2 is accelerating its speed. If during acceleration, the process advances to an inertia estimation process in Step S26. If not during acceleration, the process advances to an automatic setting process of the prefilter parameters in Step S27. In the inertia estimation process in Step S26, the parameter automatic setting section 10 estimates the inertia JL of the control object 3 on the basis of the motor position θM and torque instruction T*, which are the quantity of state in the servo controller 6. The parameter automatic setting section 10 carries out calculations of Expressions (20) through (24).

$$\omega Mc(n)=\theta M(n)-\theta M(n-1) \quad (20)$$

$$aM(n)=Ku \cdot (\omega Mc(n)-\omega Mc(n-1)) \quad (21)$$

$$aMf(n)=aMf(n-1)+Kf \cdot (aM(n)-aMf(n-1)) \quad (22)$$

$$J(n)=aMf(n)/T^*(n-1) \quad (23)$$

$$JL(n)=J(n)-JM \quad (24)$$

Reference symbol ωMc denotes a speed calculation value, aM denotes an acceleration calculation value, aMf denotes an acceleration calculation value-after filtering, Kf denotes a filter constant, Ku denotes a unit system conversion coefficient, J denotes the inertia in which the electric motor 2 and control object 3 are combined, and constant JM denotes the inertia of the electric motor 2. In the process of automatically setting the prefilter parameters in Step S27, the parameter automatic setting section 10 calculates the vibration frequency fr of the control object 3. That is, ωa=2π·fr is established. Expression (25) is used for the calculation.

$$\omega a(n)=(Ks/JL(n))^{1/2} \quad (25)$$

Constant Ks denotes a spring constant. The reason why Expression (25) is used for the calculation of ωa will be described later. The frequency ωf is determined on the basis of the calculated ωa. ωf is determined by the table or calculation expression based on the graph such as FIG. 3, for example, in which the relationship between the ωa and ωf is determined. The ωf may be determined by using a two-dimensional table in which ωa and acceleration of the position instruction θ* are made into arguments. The attenuation coefficient ζ is fixed at 1. Since the role of ωa, role of ωf, the reason why ωf is determined by using the ωa and acceleration of the position instruction θ* as arguments, and detailed description of an adequate set value of ζ were described in Embodiment 1, description thereof is omitted herein.

Figure 27:
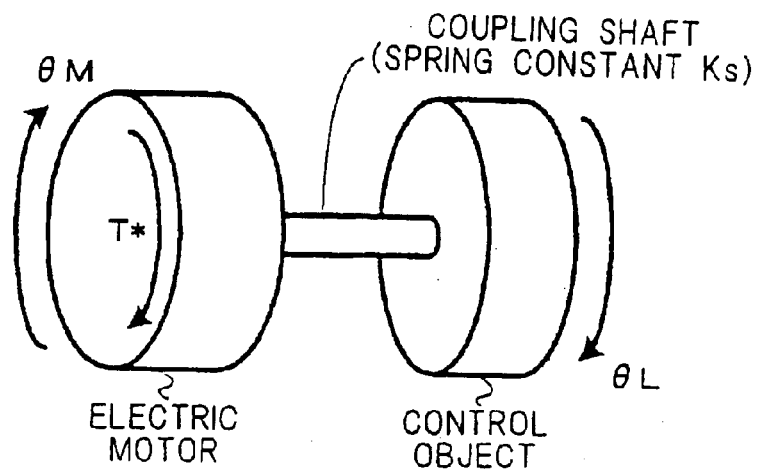
FIG. 27 is a model view showing an apparatus having low rigidity.
Figure 28:
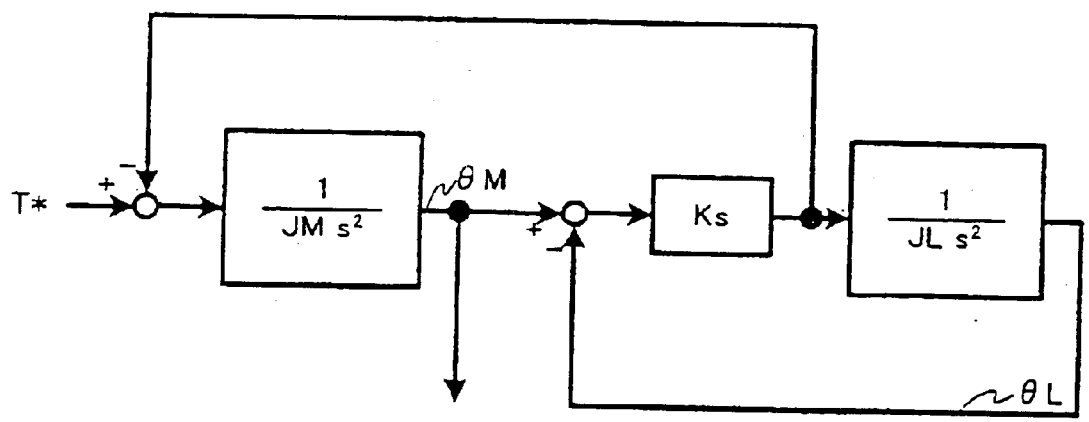
FIG. 28 is a block diagram having made an apparatus having low rigidity into a mathematical expression model.

The reason why Expression (25) is used for calculation of the vibration frequency ωa of the control object 3 is described below. Where the electric motor 2 and control object 3 are made into a mathematical expression model by using the model shown in FIG. 27 as in the description of the prior art example, the block diagram becomes FIG. 28. Reference symbol JM denotes the inertia of the electric motor 2, JL denotes the inertia of the control object 3, and Ks denotes a spring constant of the coupling shaft between the electric motor 2 and control object 3. The inertia of the coupling shaft is ignored because it is very slight in comparison with JM and JL. The frequency characteristics from the torque instruction T* to the motor position θM become as in FIG. 30(*a*). As described in the prior art example, the vibration frequency ωa (=2π·fr) of the control object 3 exists around the anti-resonance frequency of FIG. 30(*a*). The vibration frequency ωa is derived by the following expression (26) based on the block diagram of FIG. 28.

$$\omega a = (Ks/JL)^{1/2} \qquad (26)$$

Calculation of ωa of Expression (25) is based on Expression (26).

Based on the above description, the present embodiment can suppress vibrations of the electric motor 2 and control object 3, which result from a low rigidity of the control object (object) or the coupling shaft between the electric motor and control object. The controlling method and controlling apparatus according to Embodiment 5 automatically suppress the vibrations of the electric motor and control object at all times without depending on the instruction pattern of the characteristics of the control object 3. The torque instruction T* is automatically prevented from becoming an excessive value. By automatically setting all the parameters of the prefilter section 8, the maneuverability of the controlling apparatus can be improved. The controlling method and controlling apparatus according to Embodiment 5 adaptively vary the parameters of the filter to reduce the vibrations at all times even if the vibration frequency is changed due to a fluctuation in the characteristics of the control object.

Since the controlling method and controlling apparatus according to the present embodiment does not require any vibration detecting section 5 of FIG. 1 in Embodiment 1, Embodiment 5 is more inexpensive than Embodiment 1.

The vibration frequency ωa of the control object 3 is calculated in Steps S25, S26 and S27 in FIG. 25. The estimation method of ωa is not limited to Expressions (20) through (25). As long as, on the basis of a simplified mathematical expression model of the electric motor 2 and control object 3, the ωa is obtained by using the quantity of state in the servo controller 6, any optional method may be employed.

As long as, in FIG. 24, the instruction follow-up controlling section 12 controls so that the motor position θM follows up the motor position instruction θM*, any other configuration of the instruction follow-up controlling section 12 may be employed. In such a configuration, effects similar to those of the present embodiment can be brought about.

In the embodiment, although a description was given of the position controlling system, the invention may be applicable to the speed control system as in the description of Embodiment 1. In this case, the prefilter section may be disposed in the speed instruction implementing section that implements a speed instruction pattern and outputs a speed instruction.

As long as the filter 9 of FIG. 24 has the characteristics of lowering the gain in a prescribed frequency ωa as in FIG. 4(*a*) and frequencies in the vicinity thereof and characteristics of suppressing the gain in a high range, configuration of the filter may be optional.

The prefilter section 8 of FIG. 24 may be disposed in the position instruction implementing section 1.

Where the control object position θL of FIG. 24 vibrates at a plurality of vibration frequencies, the filter section 9 is caused to have characteristics of lowering the gains of the plurality of vibration frequencies and frequencies in the vicinity thereof, and suppressing the gain in a high range.

In the flow chart of FIG. 25, the process in Step S2 may be carried out before Step S1.

The electric motor is not limited to a certain specified type. That is, the electric motor may be a DC motor, a permanent magnet type synchronization motor, or an induction motor. Also, the motor is not limited to a rotation type motor, but it may be a linear motor.

The instruction pattern of the position instruction θ* may not be implemented by the position instruction implementing section 1 but by the position instruction inputting section 7 in the servo controller 6. In this case, the position instruction inputting section 7 outputs a position instruction θ* once every fixed cycle on the basis of the implemented instruction pattern.

According to the present invention, since a prefilter concurrently has the characteristics of lowering the gain of a prescribed frequency ωa and the frequencies in the vicinity thereof and characteristics of suppressing the gain in a high range, it is possible to obtain an effect of suppressing vibrations of an electric motor and a control object (load), which result from low rigidity of the control object or the coupling shaft between the motor and the control object.

According to the invention, it is possible to suppress vibrations of an electric motor and control object without depending on the instruction pattern and characteristics of the control object, and an advantageous effect can be brought about, by which a method for controlling an electric motor and an apparatus for controlling the same that automatically prevent the torque instruction T* from becoming an excessive value can be achieved.

According to the invention, the transmission function of a filter concurrently having the characteristics of lowering the gain of a prescribed frequency ωa and frequencies in the vicinity thereof, and characteristics of suppressing the gain in a high range is equivalently converted to make the filter into a feed-forward type prefilter, wherein an advantageous effect can be brought about, by which a method for controlling an electric motor and an apparatus for controlling the same can be achieved, which does not produce any convergence error in the electric motor position due to cancellation of significant digits, does not require any compensation of a calculation error, but can achieve high positioning accuracy.

According to the invention, an estimation instruction is generated by estimating an instruction based on the quantity of state in the feedback loop, the transmission function of a filter concurrently having the characteristics of lowering the gain of a prescribed frequency ωa and the frequencies in the vicinity thereof and characteristics of suppressing the gain in a high range is equivalently converted to the sum of a constant term and a feed-forward compensating term, the internal compensation amount is determined by acting on the estimation instruction onto the feed-forward compensating term, and an internal configuration type prefilter is constructed, which inputs the internal compensation amount into the feedback loop. In this case, even if the degree of freedom of varying configuration of the instruction implementing section and the controlling block is limited, an advantageous effect can be brought about, by which a method for controlling an electric motor and an apparatus for controlling the same capable of suppressing vibrations without spoiling the stability and response performance of the controlling system can be achieved.

According to the invention, an advantageous effect can be brought about, by which a method for controlling an electric motor and an apparatus for controlling the same that further improve the effect of suppressing vibrations can be achieved.

According to the invention, by varying the characteristics of suppressing the gain in a high range of the prefilter, feed-forward type prefilter or the internal configuration type prefilter in accordance with a period during which the torque instruction T* is likely to become an excessive value and a period during which it is not likely to become an excessive value, an advantageous effect can be brought about, by which a method for controlling an electric motor and an apparatus for controlling the same, which are able to lower delay in the response due to the characteristics of suppressing the gain in a high range, can be achieved.

According to the invention, since the prefilter, feed-forward type prefilter or the internal configuration type prefilter automatically determine the characteristics of suppressing the gain in a high range on the basis of at least a prescribed frequency ωa, an advantageous effect can be brought about, by which a method for controlling an electric motor and an apparatus for controlling the same, which automatically secure satisfactory response performance, can be achieved.

According to the invention, since the prefilter, feed-forward type prefilter or the internal configuration type prefilter automatically set a prescribed frequency ωa, an advantageous effect can be brought about, wherein a method for controlling an electric motor and an apparatus for controlling the same can be achieved, which are capable of lowering vibrations at all times in a stabilized state even if the vibration frequency is varied due to a fluctuation in the characteristics in the control object.

The invention detects vibrations of a control object and determines a prescribed frequency ωa on the basis of the vibration frequency. Therefore, an advantageous effect can be brought about, wherein a method for controlling an electric motor and an apparatus for controlling the same can be achieved, which are capable of automatically carrying out optimal response and bringing about high response performance.

According to the invention, since a prescribed frequency ωa is determined on the basis of the vibration frequency of an electric motor when automatically setting the vibration frequency, an advantageous effect can be brought about, wherein an inexpensive method for controlling an electric motor and an inexpensive apparatus for controlling the same can be achieved without using a vibration detecting section of the control object.

According to the invention, a mathematical expression model of an electric motor and a control object is estimated when automatically setting the vibration frequency, and a prescribed frequency ωa is determined on the mathematical expression model. Therefore, an advantageous effect can be brought about, wherein an inexpensive method for controlling an electric motor and an inexpensive apparatus for controlling the same can be achieved without using a vibration detecting section of the control object.

According to the invention, since the prefilter concurrently has the characteristics of lowering the gain of a frequency ωa in the vicinity of the anti-resonance frequency that the system from a torque outputted by the electric motor to the motor position has, and frequencies in the vicinity thereof, and suppressing the gain in a high range, a method for controlling an electric motor and an apparatus for controlling the same can be achieved, which suppress the vibrations of the control object and have high response performance.

A method for controlling an electric motor and an apparatus for controlling the same according to the invention are applicable to any apparatus, in which vibrations are liable to occur due to low mechanical rigidity, such as, for example, a wire bonder, die bonder, mounting unit, offset press, multi-axis robot, and machine tool, etc., where an apparatus employing an electric motor is made into a control object.

Although the invention has been described with some detail with respect to preferred embodiments thereof, the present disclosed contents of the preferred embodiments may be subjected to change in the detailed configuration, wherein combinations of respective elements and variations of the order may be achieved without departing from the spirit of the claims realized herewith and the ideas of the invention.

What is claimed is:

1. A method for controlling an electric motor, comprising the steps of:
   transmitting an instruction for an electric motor or a control object coupled to said electric motor;
   outputting a follow-up instruction value by a prefilter acting on said instruction, the prefilter concurrently having characteristics of lowered gain at a prescribed frequency and frequencies in the vicinity thereof, and characteristics of limiting the gain in a high range; and
   providing a controlling instruction follow-up so that a quantity of state of said electric motor or control object follows up said follow-up instruction value.

2. The method for controlling an electric motor as set forth in claim 1, further including the step of varying the gain particularly at said prescribed frequency and frequencies in the vicinity thereof in accordance with the prescribed frequency.

3. The method for controlling an electric motor as set forth in claim 1, further including the step of varying the characteristics of limiting the gain in said high range in accordance with the operating state of said electric motor.

4. The method for controlling an electric motor as set forth in claim 1, further including the step of automatically determining the characteristics of limiting the gain in said high range on the basis of at least parameters for determining said prescribed frequency.

5. The method for controlling an electric motor as set forth in claim 1, further including the step of automatically setting said prescribed frequency to a vibration frequency.

6. The method for controlling an electric motor as set forth in claim 5, further including the step of detecting vibrations of said control object and determining the prescribed frequency by extracting the vibration frequency from said detected vibrations.

7. The method for controlling an electric motor as set forth in claim 5, wherein said prescribed frequency is determined on the basis of a vibration frequency of said electric motor.

8. The method for controlling an electric motor as set forth in claim 5, further including the step of estimating a mathematical expression model of said electric motor and control object on the basis of a response of said electric motor, and said prescribed frequency is determined on the basis of said mathematical expression model.

9. The method for controlling an electric motor as set forth in claim 1, wherein said prescribed frequency is a frequency in the vicinity of an anti-resonance frequency held by a system from the torque outputted by said electric motor to achieve the position or speed of said electric motor.

10. A method for controlling an electric motor, comprising the steps of:
- transmitting an instruction for an electric motor or a control object coupled to said electric motor;
- receiving said instructing in a feed-forward type prefilter, the feed forward type prefilter having a transmission function of a filter concurrently having the characteristics of lowered gain at a prescribed frequency or frequencies in the vicinity thereof and characteristics of limiting the gain in a high range, the feed forward type prefilter summing a constant term and a feed-forward compensation term, and providing a follow-up instruction value by said instruction acting on said constant term and said feed forward compensation term, and
- providing a controlling instruction follow-up value so that, a quantity of state of said electric motor or said control object follows up said follow-up instruction value.

11. The method for controlling an electric motor as set forth in claim 10, further including the step of varying the gain particularly at said prescribed frequency and frequencies in the vicinity thereof in accordance with the prescribed frequency.

12. The method for controlling an electric motor as set forth in claim 10, further including the step of varying the characteristics of limiting the gain in said high range in accordance with the operating state of said electric motor.

13. The method for controlling an electric motor as set forth in claim 10, further including the step of automatically determining the characteristics of limiting the gain in said high range on the basis of at least parameters for determining said prescribed frequency.

14. The method for controlling an electric motor as set forth in claim 10, further including the step of automatically setting said prescribed frequency to a vibration frequency.

15. The method for controlling an electric motor as set forth in claim 14, further including the step of detecting vibrations of said control object and determining the prescribed frequency by extracting the vibration frequency from said detected vibrations.

16. The method for controlling an electric motor as set forth in claim 14, wherein said prescribed frequency is determined on the basis of a vibration frequency of said electric motor.

17. The method for controlling an electric motor as set forth in claim 14, further including the step of estimating a-mathematical expression model of said electric motor and control object on the basis of a response of said electric motor, and said prescribed frequency is determined on the basis of said mathematical expression model.

18. The method for controlling an electric motor as set forth in claim 10, wherein said prescribed frequency is a frequency in the vicinity of an anti-resonance frequency held by a system from the torque outputted by said electric motor to achieve the position or speed of said electric motor.

19. A method for controlling an electric motor, comprising the steps of:
- inputting an instruction for an electric motor or a control object coupled to said electric motor;
- providing a follow-up controlling instruction so that, on the basis of a compensation amount of a feed-forward compensation term and a follow-up instruction value, a quantity of state of said electric motor or said control object follows up said follow-up instruction value;
- estimating said instruction on the basis of the quantity of state, and outputting an estimated instruction;
- receiving the estimated instruction by an internal configuration type prefilter, the internal configuration type prefilter having a transmission function of a filter concurrently having the characteristics of lowered gain at a prescribed frequency or frequencies in the vicinity thereof and characteristics of limiting the gain in a high range, the internal configuration type prefilter comprising a constant term and a feed-forward compensation term, and outputting said compensation amount of a feed-forward compensation term by applying said estimated instruction to the feed-forward compensation term.

20. The method for controlling an electric motor as set forth in claim 19, further including the step of varying the gain particularly at said prescribed frequency and frequencies in the vicinity thereof in accordance with the prescribed frequency.

21. The method for controlling an electric motor as set forth in claim 19, further including the step of varying the characteristics of limiting the gain in said high range in accordance with the operating state of said electric motor.

22. The method for controlling an electric motor as set forth in claim 19, further including the step of automatically determining the characteristics of limiting the gain in said high range on the basis of at least parameters for determining said prescribed frequency.

23. The method for controlling an electric motor as set forth in claim 19, further including the step of automatically setting said prescribed frequency to a vibration frequency.

24. The method for controlling an electric motor as set forth in claim 23, further including the step of detecting vibrations of said control object and determining the prescribed frequency by extracting the vibration frequency from said detected vibrations.

25. The method for controlling an electric motor as set forth in claim 23, wherein said prescribed frequency is determined on the basis of vibration frequency of said electric motor.

26. The method for controlling an electric motor as set forth in claim 23, further including the step of estimating a mathematical expression model of said electric motor and control object on the basis of a response of said electric motor, and said prescribed frequency is determined on the basis of said mathematical expression model.

27. The method for controlling an electric motor as set forth in claim 19, wherein said prescribed frequency is a frequency in the vicinity of an anti-resonance frequency held by a system from the torque outputted by said electric motor to achieve the position or speed of said electric motor.

28. A method for controlling an electric motor, comprising the steps of:
- inputting an instruction for an electric motor or a control object coupled to said electric motor; and
- carrying out control so that a quantity of state of said electric motor or said control object follows up said instruction;
- wherein, a follow-up instruction value is outputted by acting on said instruction to a prefilter concurrently having the characteristics of lowered gain at frequencies in the vicinity of the anti-resonance frequency held by a system from the torque of said electric motor to a position or speed of said electric motor and characteristics of limiting the gain in a high range, and said controlling step carries out control that is identical to or equivalent to the control by which a quantity of state of said electric motor or said control object follows up said follow-up instruction value.

29. An apparatus for controlling an electric motor, comprising:
an instruction inputting section for transmitting an instruction for an electric motor or a control object coupled to said electric motor;
a prefilter section of outputting a follow-up instruction value by acting on said instruction, said prefilter section having a prefilter concurrently having characteristics of lowered gain at a prescribed frequency and frequencies in the vicinity thereof, and characteristics of limiting the gain in a high range; and
an instruction follow-up controlling section providing a controlling instruction follow-up so that a quantity of a state of said electric motor or control object follows said follow-up instruction value.

30. The apparatus for controlling an electric motor as set forth in claim 29, wherein said prefilter section varies the gain particularly at the prescribed frequency and frequencies in the vicinity thereof in accordance with the prescribed frequency.

31. The apparatus for controlling an electric motor as set forth in claim 29, wherein said prefilter section varies the characteristics of limiting the gain in said high range in accordance with the state of the electric motor.

32. The apparatus for controlling an electric motor as set forth in claim 29, wherein said prefilter section automatically determines the characteristics of limiting the gain in said high range on the basis of at least parameters for determining said prescribed frequency.

33. The apparatus for controlling an electric motor as set forth in claim 29, wherein said prefilter section includes a vibration frequency automatically setting section for automatically setting said prescribed frequency.

34. The apparatus for controlling an electric motor as set forth in claim 33, wherein said vibration frequency automatically setting section includes a section for detecting vibrations of said control object and a section for determining the prescribed frequency by extracting a vibration frequency from said detected vibrations.

35. The apparatus for controlling an electric motor as set forth in claim 33, wherein said vibration frequency automatically setting section determines said prescribed frequency on the basis of a vibration frequency of said electric motor.

36. The apparatus for controlling an electric motor as set forth in claim 33, wherein, in said vibration frequency automatically setting section, a mathematical expression model of said electric motor and control object is estimated on the basis of a response of said electric motor, and said prescribed frequency is determined on the basis of said mathematical expression model.

37. The apparatus for controlling an electric motor as set forth in claim 29, wherein said prescribed frequency is a frequency in the vicinity of an anti-resonance frequency held by a system from the torque outputted by said electric motor to achieve the position or speed of said electric motor.

38. An apparatus for controlling an electric motor, comprising:
an instruction inputting section for transmitting an instruction for an electric motor or a control object coupled to said electric motor;
a feed-forward type prefilter section equivalent to a prefilter concurrently having the characteristics of lowered gain at a prescribed frequency or frequencies in the vicinity thereof and characteristics of limiting the gain in a high range, said feed-forward type prefilter section summing a constant term and a feed-forward compensation term, and providing a follow-up instruction value by said instruction acting on said constant term and said feed forward compensation term; and
an instruction follow-up controlling section providing a controlling instruction follow-up value so that, a quantity of state of said electric motor or said control object follows said follow-up instruction value.

39. The apparatus for controlling an electric motor as set forth in claim 38, wherein said feed-forward type prefilter section varies the gain particularly at the prescribed frequency and frequencies in the vicinity thereof in accordance with the prescribed frequency.

40. The apparatus for controlling an electric motor as set forth in claim 38, wherein said feed-forward type prefilter section varies the characteristics of limiting the gain in said high range in accordance with the state of the electric motor.

41. The apparatus for controlling an electric motor as set forth in claim 38, wherein said feed-forward type prefilter section automatically determines the characteristics of limiting the gain in said high range on the basis of at least parameters for determining said prescribed frequency.

42. The apparatus for controlling an electric motor as set forth in claim 38, wherein said feed-forward type prefilter section includes a vibration frequency automatically setting section for automatically setting said prescribed frequency.

43. The apparatus for controlling an electric motor as set forth in claim 42, wherein said vibration frequency automatically setting section includes a section for detecting vibrations of said control object and a section for determining the prescribed frequency by extracting a vibration frequency from said detected vibrations.

44. The apparatus for controlling an electric motor as set forth in claim 42, wherein said vibration frequency automatically setting section determines said prescribed frequency on the basis of a vibration frequency of said electric motor.

45. The apparatus for controlling an electric motor as set forth in claim 42, wherein, in said vibration frequency automatically setting section, a mathematical expression model of said electric motor and control object is estimated on the basis of a response of said electric motor, and said prescribed frequency is determined on the basis of said mathematical expression model.

46. The apparatus for controlling an electric motor as set forth in claim 38, wherein said prescribed frequency is a frequency in the vicinity of an anti-resonance frequency held by a system from the torque outputted by said electric motor to achieve the position or speed of said electric motor.

47. An apparatus for controlling an electric motor, comprising:
an instruction inputting section for transmitting an instruction for an electric motor or a control object coupled to said electric motor;
an instruction follow-up controlling section for providing a controlling instruction follow-up so that, on the basis of a compensation amount of a feed-forward compensation term and a follow-up instruction value, a quantity of state of said electric motor or said control object follows up said follow-up instruction value;
an instruction estimating section of estimating said instruction on the basis of the quantity of state, and outputting an estimated instruction;
an internal configuration type prefilter section equivalent to a prefilter concurrently having the characteristics of lowered gain at a prescribed frequency or frequencies in the vicinity thereof and characteristics of limiting the gain in a high range, said internal configuration type prefilter summing a constant term and a feed-forward compensation term, and outputting said compensation amount of a feed-forward compensation term by applying said estimated instruction to the feed-forward compensation term.

48. The apparatus for controlling an electric motor as set forth in claim 47, wherein said internal configuration type prefilter section varies the gain particularly at the prescribed frequency and frequencies in the vicinity thereof in accordance with the prescribed frequency.

49. The apparatus for controlling an electric motor as set forth in claim 47, wherein said internal configuration type prefilter section varies the characteristics of limiting the gain in said high range in accordance with the state of the electric motor.

50. The apparatus for controlling an electric motor as set forth in claim 47, wherein said internal configuration type prefilter section automatically determines the characteristics of limiting the gain in said high range on the basis of at least parameters for determining said prescribed frequency.

51. The apparatus for controlling an electric motor as set forth in claim 47, wherein said internal configuration type prefilter section includes a vibration frequency automatically setting section for automatically setting said prescribed frequency.

52. The apparatus for controlling an electric motor as set forth in claim 51, wherein said vibration frequency automatically setting section includes a section for detecting vibrations of said control object and a section for determining the prescribed frequency by extracting the vibration frequency from said detected vibrations.

53. The apparatus for controlling an electric motor as set forth in claim 51, wherein said vibration frequency automatically setting section determines said prescribed frequency on the basis of a vibration frequency of said electric motor.

54. The apparatus for controlling an electric motor as set forth in claim 51, wherein in said vibration frequency automatically setting section, a mathematical expression model of said electric motor and control object is estimated on the basis of a response of said electric motor, and said prescribed frequency is determined on the basis of said mathematical expression model.

55. The apparatus for controlling an electric motor as set forth in claim 47, wherein said prescribed frequency is a frequency in the vicinity of an anti-resonance frequency held by a system from the torque outputted by said electric motor to achieve the position or speed of said electric motor.

56. An apparatus for controlling an electric motor, comprising:

an instruction inputting section for transmitting an instruction for an electric motor or a control object coupled to said electric motor; and a controlling section of carrying out control so that a quantity of state of said electric motor or said control object follows up said instruction;

wherein, in said controlling section, a follow-up instruction value is outputted by acting on said instruction to a prefilter concurrently having the characteristics of lowered gain at frequencies in the vicinity of the anti-resonance frequency held by a system from the torque of said electric motor to the position or speed of said electric motor and characteristics of limiting the gain in a high range, and said controlling section carries out control that is identical to or equivalent to the control by which a quantity of state of said electric motor or said control object follows up said follow-up instruction value.

* * * * *

UNITED STATES PATENT AND TRADEMARK OFFICE
CERTIFICATE OF CORRECTION

PATENT NO. : 6,936,990 B2
DATED : August 30, 2005
INVENTOR(S) : Ichiro Oyama et al.

It is certified that error appears in the above-identified patent and that said Letters Patent is hereby corrected as shown below:

<u>Title page,</u>
Item [75] Inventors, change the addresses of the inventors as follows:
The address of the first and second inventors should read -- Osaka-shi (JP) --;
The address of the third inventor should read -- Ibaraki-shi (JP) --;
The address of the fourth inventor should read -- Katano-shi (JP) --;
The address of the fifth inventor should read -- Daito-shi (JP) --;
The address of the sixth inventor should read -- Mino-shi (JP) --;

<u>Column 39,</u>
Line 8, "instructing" should read -- instruction --;

<u>Column 40,</u>
Line 39, before "vibration frequency", insert -- a --.

Signed and Sealed this

Fourth Day of April, 2006

JON W. DUDAS
*Director of the United States Patent and Trademark Office*